US011050592B2

(12) United States Patent
Murakami et al.

(10) Patent No.: US 11,050,592 B2
(45) Date of Patent: *Jun. 29, 2021

(54) COMMUNICATION APPARATUS AND COMMUNICATION METHOD

(71) Applicant: PANASONIC INTELLECTUAL PROPERTY CORPORATION OF AMERICA, Torrance, CA (US)

(72) Inventors: Yutaka Murakami, Kanagawa (JP); Kiyotaka Kobayashi, Kanagawa (JP); Masayuki Orihashi, Kyoto (JP); Akihiko Matsuoka, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/709,360

(22) Filed: Dec. 10, 2019

(65) Prior Publication Data

US 2020/0112463 A1 Apr. 9, 2020

Related U.S. Application Data

(63) Continuation of application No. 16/296,568, filed on Mar. 8, 2019, now Pat. No. 10,547,479, which is a
(Continued)

(30) Foreign Application Priority Data

Jul. 2, 2003 (JP) .................................. 2003-190683
May 14, 2004 (JP) .................................. 2004-173224

(51) Int. Cl.
*H04L 27/00* (2006.01)
*H04B 7/0417* (2017.01)
(Continued)

(52) U.S. Cl.
CPC ....... *H04L 27/0008* (2013.01); *H04B 7/0413* (2013.01); *H04B 7/0417* (2013.01);
(Continued)

(58) Field of Classification Search
CPC . H04L 27/0008; H04L 5/0046; H04L 1/0006; H04L 1/06; H04L 1/08;
(Continued)

(56) References Cited

U.S. PATENT DOCUMENTS 5,832,044 A 11/1998 Sousa
6,615,271 B1 9/2003 Lauck
(Continued)

FOREIGN PATENT DOCUMENTS

CN 1354610 6/2002
EP 1 207 645 5/2002
(Continued)

OTHER PUBLICATIONS

PCT International Search Report dated Dec. 7, 2004.
(Continued)

*Primary Examiner* — Tanmay K Shah
(74) *Attorney, Agent, or Firm* — Seed IP Law Group LLP

(57) ABSTRACT

Modulated signal A is transmitted from a first antenna, and modulated signal B is transmitted from a second antenna. As modulated signal B, modulated symbols S2(i) and S2(i+1) obtained from different data are transmitted at time i and time i+1 respectively. In contrast, as modulated signal A, modulated symbols S1(i) and S1(i)' obtained by changing the signal point arrangement of the same data are transmitted at time i and time i+1 respectively. As a result the reception quality can be changed intentionally at time i and time i+1, and therefore using the demodulation result of modulated signal A of a time when the reception quality is good enables
(Continued)

both modulated signals A and B to be demodulated with good error rate performances.

8 Claims, 56 Drawing Sheets

Related U.S. Application Data continuation of application No. 15/902,371, filed on Feb. 22, 2018, now Pat. No. 10,277,436, which is a continuation of application No. 15/404,910, filed on Jan. 12, 2017, now Pat. No. 9,935,799, which is a continuation of application No. 14/709,858, filed on May 12, 2015, now Pat. No. 9,584,196, which is a continuation of application No. 14/278,979, filed on May 15, 2014, now Pat. No. 9,065,499, which is a continuation of application No. 13/964,993, filed on Aug. 12, 2013, now Pat. No. 8,767,864, which is a continuation of application No. 13/586,442, filed on Aug. 15, 2012, now Pat. No. 8,532,219, which is a continuation of application No. 13/052,833, filed on Mar. 21, 2011, now Pat. No. 8,270,521, which is a continuation of application No. 12/824,047, filed on Jun. 25, 2010, now Pat. No. 7,929,635, which is a continuation of application No. 10/562,932, filed as application No. PCT/JP2004/009774 on Jul. 2, 2004, now Pat. No. 7,773,694.

(51) Int. Cl.
| | | |
|---|---|---|
| H04L 1/00 | (2006.01) | |
| H04L 1/06 | (2006.01) | |
| H04L 1/08 | (2006.01) | |
| H04L 27/34 | (2006.01) | |
| H04L 5/00 | (2006.01) | |
| H04B 7/0413 | (2017.01) | |
| H04B 7/06 | (2006.01) | |
| H04W 52/42 | (2009.01) | |

(52) U.S. Cl.
CPC ............ *H04L 1/0006* (2013.01); *H04L 1/06* (2013.01); *H04L 1/08* (2013.01); *H04L 5/0046* (2013.01); *H04L 27/3405* (2013.01); *H04B 7/0669* (2013.01); *H04L 1/0026* (2013.01); *H04L 1/0618* (2013.01); *H04W 52/42* (2013.01)

(58) Field of Classification Search
CPC . H04L 27/3405; H04L 1/0026; H04L 1/0618; H04B 7/0413; H04B 7/0417; H04B 7/0669; H04W 52/42
USPC ........................................................ 375/295
See application file for complete search history.

(56) References Cited

U.S. PATENT DOCUMENTS

| | | | |
|---|---|---|---|
| 6,650,617 B1 | 11/2003 | Belotserkovsky | |
| 6,937,592 B1 * | 8/2005 | Heath, Jr. | H04W 16/14 370/342 |
| 7,154,936 B2 | 12/2006 | Bjerke | |
| 7,233,810 B2 | 6/2007 | Medlock | |
| 7,773,694 B2 | 8/2010 | Murakami | |
| 7,848,454 B2 | 12/2010 | Murakami | |
| 7,965,761 B2 | 6/2011 | Shattil | |
| 7,965,791 B2 | 6/2011 | Yano | |
| 8,270,521 B2 | 9/2012 | Murakami | |
| 8,315,225 B2 | 11/2012 | Xu | |
| 8,767,864 B2 | 7/2014 | Murakami | |
| 9,065,499 B2 | 6/2015 | Murakami | |
| 9,584,196 B2 | 2/2017 | Murakami | |
| 9,935,799 B2 | 4/2018 | Murakami | |
| 10,277,436 B2 | 4/2019 | Murakami | |
| 2002/0168026 A1 | 11/2002 | Khoini-Poorfard | |
| 2002/0172293 A1 | 11/2002 | Kuchi | |
| 2002/0191535 A1 | 12/2002 | Sugiyama | |
| 2002/0196842 A1 | 12/2002 | Onggosanusi | |
| 2003/0103584 A1 | 6/2003 | Bjerke | |
| 2003/0156659 A1 | 8/2003 | Hanaoka | |
| 2003/0157905 A1 | 8/2003 | Holmqvist | |
| 2004/0001555 A1 | 1/2004 | Taffin | |
| 2004/0049725 A1 | 3/2004 | Golitschek | |
| 2004/0187069 A1 | 9/2004 | Pietraski | |
| 2005/0111563 A1 | 5/2005 | Tseng | |
| 2005/0193310 A1 | 9/2005 | Obuchi | |
| 2005/0265470 A1 | 12/2005 | Kishigami | |
| 2006/0128433 A1 | 6/2006 | Liang | |
| 2007/0064831 A1 | 3/2007 | Bjerke | |
| 2007/0189282 A1 | 8/2007 | Lohr | |
| 2008/0225965 A1 | 9/2008 | Pi | |
| 2009/0067543 A1 | 3/2009 | Hsiao | |
| 2010/0177746 A1 | 7/2010 | Gorokhov | |
| 2010/0189038 A1 | 7/2010 | Chen | |
| 2010/0203887 A1 | 8/2010 | Kim | |
| 2010/0232373 A1 | 9/2010 | Nory | |
| 2010/0260059 A1 | 10/2010 | Zhang | |
| 2010/0260151 A1 | 10/2010 | Onggosanusi | |
| 2011/0122825 A1 | 5/2011 | Lee | |
| 2011/0194523 A1 | 8/2011 | Chung | |
| 2011/0237270 A1 | 9/2011 | Noh | |
| 2011/0269459 A1 | 11/2011 | Koo | |
| 2011/0286349 A1 | 11/2011 | Tee | |
| 2011/0292903 A1 | 12/2011 | Jongren | |
| 2011/0299449 A1 | 12/2011 | Kwon | |
| 2011/0317641 A1 | 12/2011 | Noh | |
| 2012/0027110 A1 | 2/2012 | Han | |
| 2016/0072612 A1 | 3/2016 | Seo | |

FOREIGN PATENT DOCUMENTS

| | | |
|---|---|---|
| EP | 1 229 669 | 8/2002 |
| JP | 2004-23727 | 1/2004 |
| JP | 2007-502557 | 2/2007 |
| WO | 02/067491 | 8/2002 |
| WO | 03/049397 | 6/2003 |

OTHER PUBLICATIONS

Chinese Office action dated Mar. 6, 2009.
Japanese Office Action dated Sep. 24, 2009.
Decision of Patent Grant dated Dec. 22, 2009, in the corresponding Japanese Patent Application.
Supplementary European Search Report dated Dec. 6, 2011.
Y. Teng, et al., "Performance Analysis of SDM-OFDM System with Adaptive Modulation Method over MIMO Channels," The Institute of Electronics, Information and Communication Engineers, RCS2003-41, vol. 103, No. 66, May 16, 2003, pp. 75-82.
V. Tarokh, et al., "Space-Time Block Codes from Orthogonal Designs," IEEE Transactions on Information Theory, vol. 45, No. 5, Jul. 1999, pp. 1456-1467.
S. Alamouti, "A Simple Transmit Diversity Technique for Wireless Communications," IEEE Journal on Select Areas in Communications, vol. 16, No. 8, Oct. 1998, pp. 1451-1458.
S. Hara, et al., "Overview of Multicarrier CDMA," IEEE Communications Magazine, XP-000858431, Dec. 1997, pp. 126-133.
Y. Murakami, et al., "Performance Analysis of MIMO Systems under Rician Fading Channels," The Institute of Electronics, Information and Communication Engineers, NS2003-67, RCS2003-90, Jul. 2003, pp. 1-6 with English Abstract.
G. Ungerboeck, "Channel Coding with Multilevel/Phase Signals," IEEE Transactions on Information Theory, vol. IT-28, No. 1, Jan. 1982, pp. 55-67.
K. Miyashita, et al., "Eigenbeam-Space Division Multiplexing (E-SDM) in a MIMO Channel," The Institute of Electronics, Information and Communication Engineers, RCS2002-53, May 2002, pp. 13-18.

(56) References Cited

OTHER PUBLICATIONS

H. Kubo, et al., "MIMO Communication Systems employing Per Transmit Antenna Differential Mapping (PADM)," Technical Report of IEICE, Nov. 2003, pp. 145-150 with English Translation.

H. Gamal, et al., "Universal Space-Time Coding," IEEE Transactions on Information Theory, vol. 49, No. 5, XP 011074756, May 2003, pp. 1097-1119.

Y. Murakami, et al., "Design of Transmission Technique Utilizing Linear Combination Diversity in Consideration of LOS Environments in MIMO Systems," IEICE Trans. Fundamentals, vol. E88-A, No. 11, Nov. 2005, pp. 3127-3133.

Y. Murakami, et al., "Performance Evaluation of Transmission Technique Utilizing Linear Combination Diversity in MIMO Spatial Multiplexing Systems," IEICE Trans. Commun., vol. E91-B, No. 5, May 2008, pp. 1511-1520.

Y. Murakami, et al., "Investigation on Coding Considering LOS Environments in MIMO Systems," The Institute of Electronics, Information and Communication Engineers, RCS2004-58, May 2004, pp. 13-18.

Y. Murakami, et al., "Investigation on Parameter of Phase Rotation in Transmission Technique Utilizing LC-diversity for MIMO Systems," The Institute of Electronics Information and Communication Engineers, A-P2004-146, RCS2004-167, Oct. 2004, pp. 79-85.

G. Foschini, "Layered Space-Time Architecture for Wireless Communication in a Fading Environment When Using Multi-Element Antennas," Lucent Technologies, Bell Labs Technical Journal, vol. 1, No. 2, Oct. 1996, pp. 41-59.

X. Zhu, et al., "Performance Analysis of Maximum Likelihood Detection in a MIMO Antenna System," IEEE Transactions on Communications, vol. 50, No. 2, Feb. 2002, pp. 187-191.

P. Driessen, et al., "On the Capacity Formula for Multiple Input-Multiple Output Wireless Channels: A Geometric Interpretation," IEEE Transactions On Communications, vol. 47. No. 2, Feb. 1999, pp. 173-176.

D. Gesbert, et al., "Outdoor MIMO Wireless Channels: Models and Performance Prediction," IEEE Transactions on Communications, vol. 50, No. 12, Dec. 2002, pp. 1926-1934.

V. Tarokh, et al., "Space-Time Codes for High Data Rate Wireless Communication: Performance Criterion and Code Construction," IEEE Transactions on Information Theory, vol. 44, No. 2, Mar. 1998, pp. 744-765.

V. Tarokh, et al., "Space-Time Block Coding for Wireless Communications: Performance Results," IEEE Journal on Selected Areas in Communications, vol. 17, No. 3, Mar. 1999, pp. 451-460.

A. van Zelst, et al., "Space Division Multiplexing (SDM) for OFDM systems," Proceedings of IEEE VTC2000—Spring, May 2000, vol. 2, pp. 1070-1074.

R. Heath Jr., et al., "Antenna Selection for Spatial Multiplexing Systems Based on Minimum Error Rate," Proceedings of IEEE ICC2001, Jun. 2001, pp. 2276-2280.

H. Jafarkhani, "A Quasi-Orthogonal Space-Time Block Code," IEEE Transactions on Communications, vol. 49, No. 1, Jan. 2001, pp. 1-4.

N. Hassanpour, et al., "Super-Quasi-Orthogonal Space-Time Trellis Codes," Proceedings of IEEE ICC 2003, May 2003, pp. 2613-2617.

C. Yuen, et al., "Full-Rate Full-Diversity STBC with Constellation Rotation," Proceedings of IEEE VTC2003—Spring, May 2003, pp. 296-300.

H. Su, et al., "Space-Time Turbo Codes with Full Antenna Diversity," IEEE Transactions on Communications, vol. 49, No. 1, Jan. 2001, pp. 47-57.

Y. Murakami, et al., "Performance Analysis of MIMO Systems Employing Eigenvalue under Rayleigh Fading Channels," The Institute of Electronics, Information and Communication Engineers, IT2003-9, May 2003, pp. 45-50.

D. Gesbert, et al., "MIMO Wireless Channels: Capacity and Performance Prediction," Proceedings of IEEE Globecom2000, Nov. 2000, pp. 1083-1088.

J. Kermoal, et al., "Experimental Investigation of Correlation Properties of MIMO Radio Channels for Indoor Picocell Scenarios," Proceedings of IEEE VTC2000—Fall, Sep. 2000, pp. 14-21.

P. Soma, et al., "Analysis and Modeling of Multiple-Input Multiple-Output (MIMO) Radio Channel Based on Outdoor Measurements Conducted at 2.5GHz for Fixed BWA Applications," Proceedings of IEEE ICC, Apr. 2002, pp. 272-276.

K. Kobayashi, et al., "Performances under Rayleigh/Rician Fading Channels with W-EP Soft-Decision Decoder in MIMO Systems," The Institute of Electronics, Information and Communication Engineers, RCS2003-265, Jan. 2004, pp. 127-132.

S. Hori, et al., "A New Branch Metric Generation Method for Soft-Decision Viterbi Decoding in Coded OFDM-SDM Systems Employing MLD over Frequency Selective MIMO Channels," IEICE Trans. Fundamentals, vol. E85-A, No. 7, Jul. 2002, pp. 1675-1684.

A. Naguib, et al., "Space Time Coding and Signal Processing for High Data Rate Wireless Communications," IEEE Signal Processing Magazine, vol. 17, No. 3, May 2000, pp. 76-92.

Y. Murakami, et al., "Performance Analysis of Receiving Antenna Selection by Eigenvalue in MIMO Systems," Proceedings of WPMC2003, vol. 3, Oct. 2003, I 410-414.

E. Telatar, "Capacity of Multi-antenna Gaussian Channels," European Transaction on Telecommunication, vol. 10, No. 6, Nov.-Dec. 1999, pp. 585-595.

Y. Murakami, et al., "Performance of Transmission Technique Utilizing Linear Combination Diversity in MIMO Spatial Multiplexing Systems," The 30$^{th}$ Symposium on Information Theory and Its Applications, SITA2007, Nov. 27-30, 2007, pp. 458-463.

L. Collin, et al., "Optimal Minimum Distance-Based Precoder for MIMO Spatial Multiplexing Systems," IEEE Transactions on Signal Processing, vol. 52, No. 3, Mar. 2004, pp. 617-627.

B. Bjerke, et al., "Multiple-Antenna Diversity Techniques for Transmission over Fading Channels," Proceedings of IEEE WCNC1999, Sep. 1999, pp. 1038-1042.

J. Boutros, et al., "Good Lattice Constellations for Both Rayleigh Fading and Gaussian Channels," IEEE Transactions on Information Theory, vol. 42, No. 2, Mar. 1996, pp. 502-518.

F. Farrokhi, et al., "Link-Optimal Space-Time Processing with Multiple Transmit and Receive Antennas," IEEE Communications Letters, vol. 5, No. 3, Mar. 2001, pp. 85-87.

International Search Report dated Jun. 15, 2010.

3GPP TSG RAN WG1 Meeting #55bis, "Further Discussions on the Downlink Coordinated Transmission—Impact on the Radio Interface," Huawei, et al., R1-090129, Jan. 12-16, 2009, pp. 1-8.

* cited by examiner

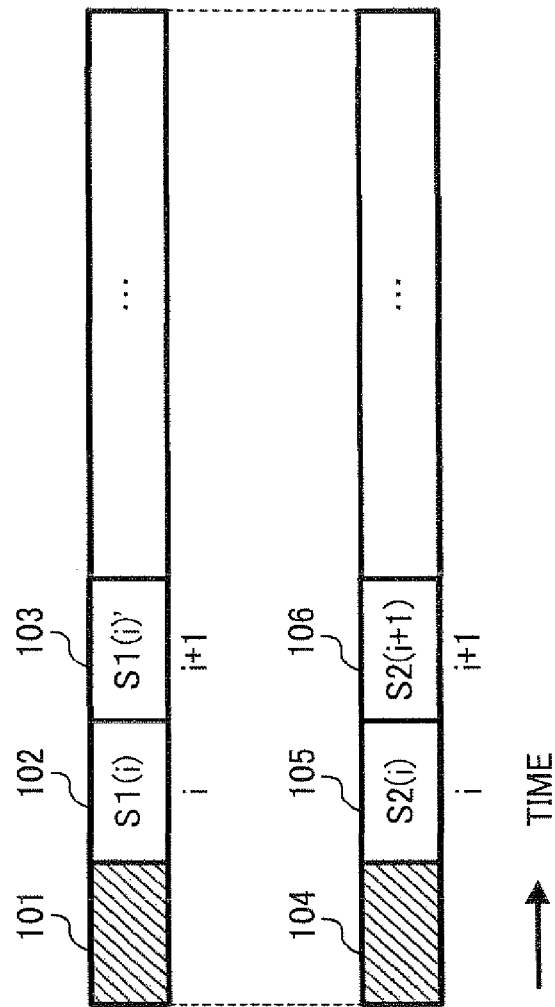
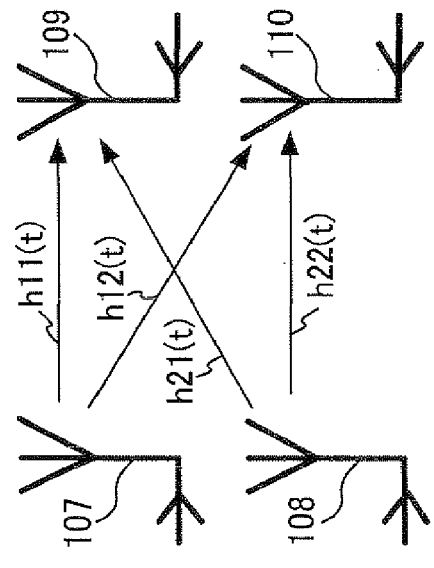
FIG.2A
FIG.2B (PRIOR ART)

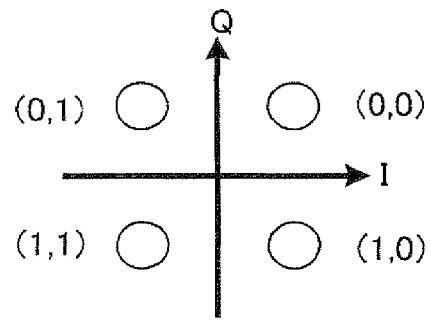
FIG.3A  S1(i) SIGNAL POINT ARRANGEMENT
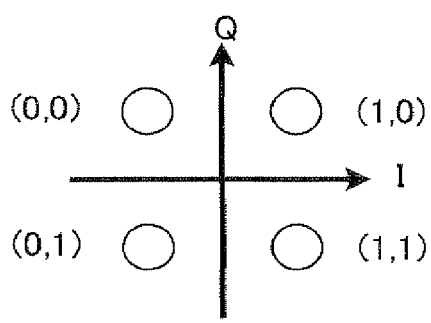
FIG.3B  S1(i)' SIGNAL POINT ARRANGEMENT
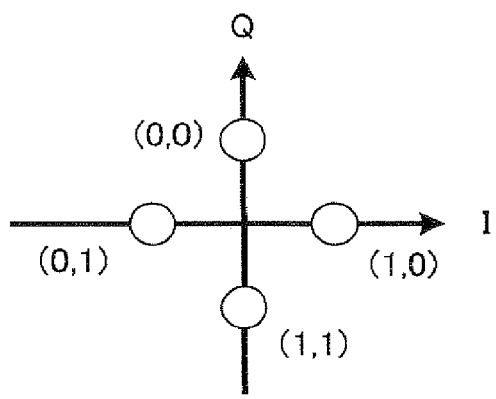
FIG.3C  S1(i)' SIGNAL POINT ARRANGEMENT

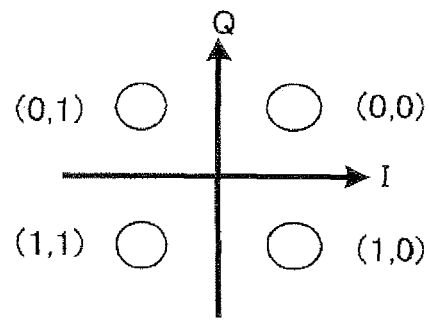
FIG.11A  S1(i) SIGNAL POINT ARRANGEMENT
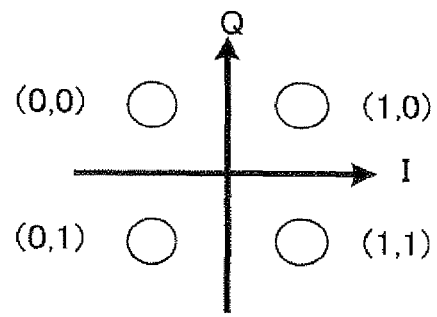
FIG.11B  S1(i)' SIGNAL POINT ARRANGEMENT
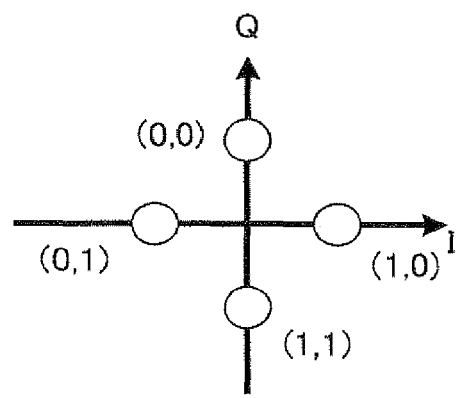
FIG.11C  S1(i)" SIGNAL POINT ARRANGEMENT

MODULATED SIGNAL A
FRAME CONFIGURATION

MODULATED SIGNAL B
FRAME CONFIGURATION

▨ 2801 : RADIO WAVE PROPAGATION
       ENVIRONMENT ESTIMATION SYMBOL
☐ 2802 : DATA SYMBOL

MODULATED SIGNAL A FRAME CONFIGURATION

MODULATED SIGNAL B FRAME CONFIGURATION

▨ 2801 : RADIO WAVE PROPAGATION ENVIRONMENT ESTIMATION SYMBOL

☐ 2802 : DATA SYMBOL

▨ 2801 : RADIO WAVE PROPAGATION ENVIRONMENT ESTIMATION SYMBOL

☐ 2802 : DATA SYMBOL

▨ 2801 : RADIO WAVE PROPAGATION ENVIRONMENT ESTIMATION SYMBOL

☐ 2802 : DATA SYMBOL

MODULATED SIGNAL A
FRAME CONFIGURATION

MODULATED SIGNAL B
FRAME CONFIGURATION

2801 : RADIO WAVE PROPAGATION
ENVIRONMENT ESTIMATION SYMBOL

2802 : DATA SYMBOL

MODULATED SIGNAL A
FRAME CONFIGURATION

MODULATED SIGNAL B
FRAME CONFIGURATION

▨ 2801 : RADIO WAVE PROPAGATION ENVIRONMENT ESTIMATION SYMBOL

☐ 2802 : DATA SYMBOL

MODULATED SIGNAL A
FRAME CONFIGURATION

MODULATED SIGNAL B
FRAME CONFIGURATION

▨ 2801 : RADIO WAVE PROPAGATION
       ENVIRONMENT ESTIMATION SYMBOL

☐ 2802 : DATA SYMBOL

MODULATED SIGNAL A
FRAME CONFIGURATION

MODULATED SIGNAL B
FRAME CONFIGURATION

▨ 2801 : RADIO WAVE PROPAGATION
    ENVIRONMENT ESTIMATION SYMBOL

☐ 2802 : DATA SYMBOL

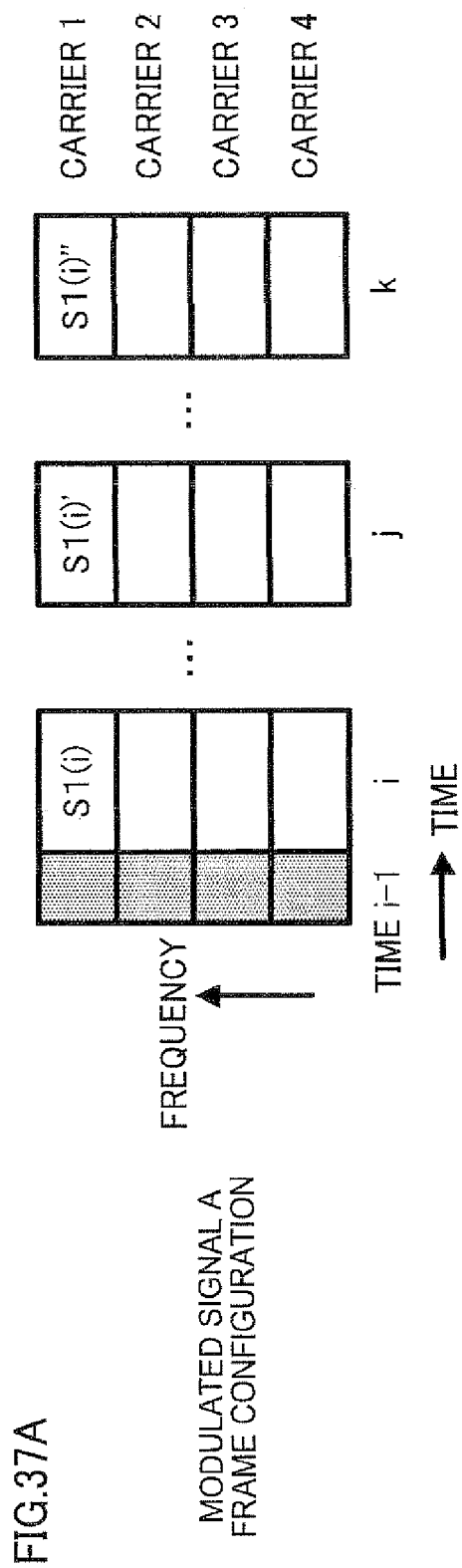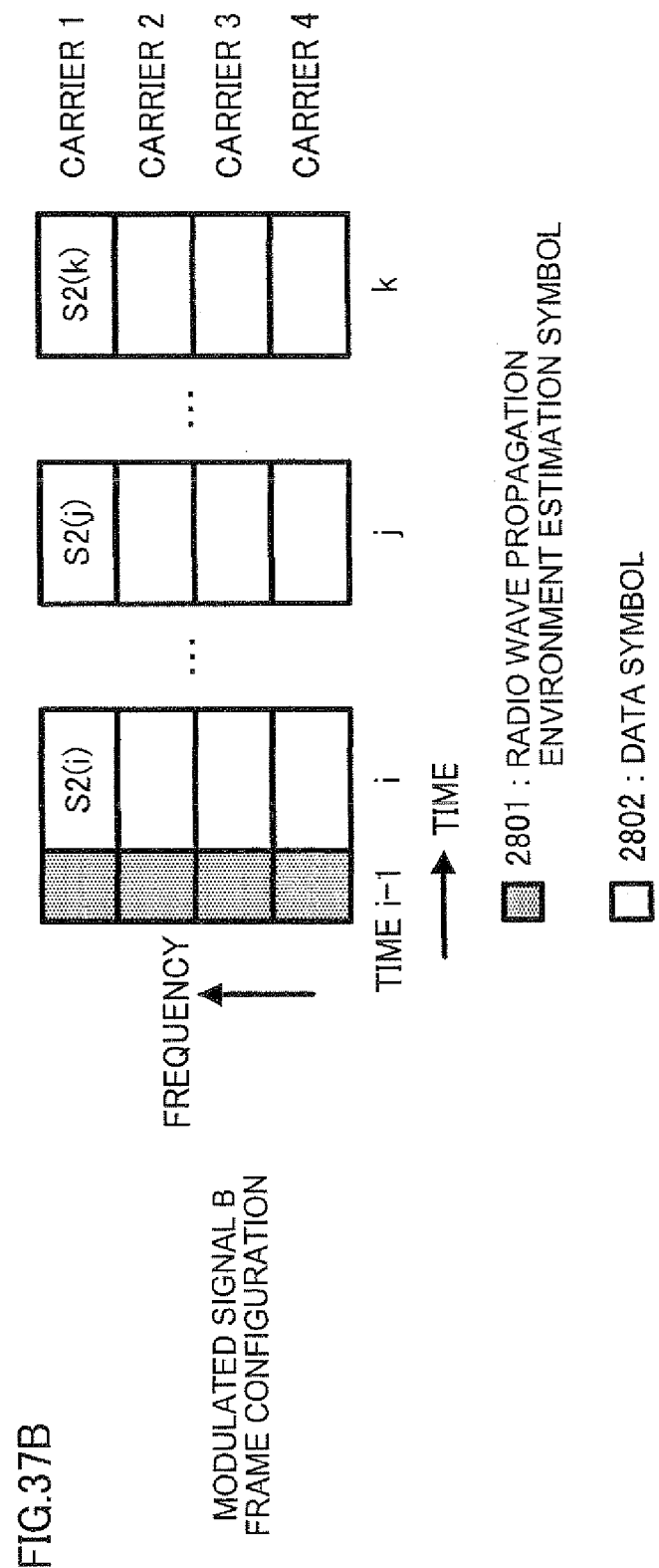
FIG.37A MODULATED SIGNAL A FRAME CONFIGURATION
FIG.37B MODULATED SIGNAL B FRAME CONFIGURATION

▨ 2801 : RADIO WAVE PROPAGATION ENVIRONMENT ESTIMATION SYMBOL

☐ 2802 : DATA SYMBOL

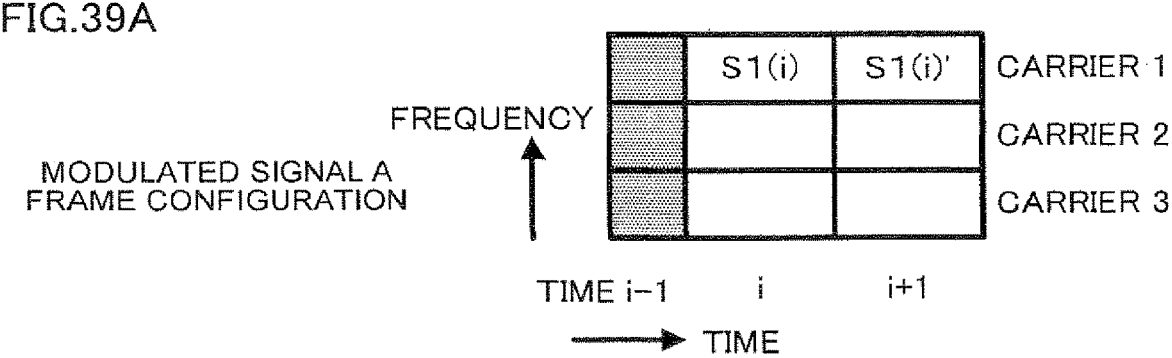
FIG.39A  MODULATED SIGNAL A FRAME CONFIGURATION
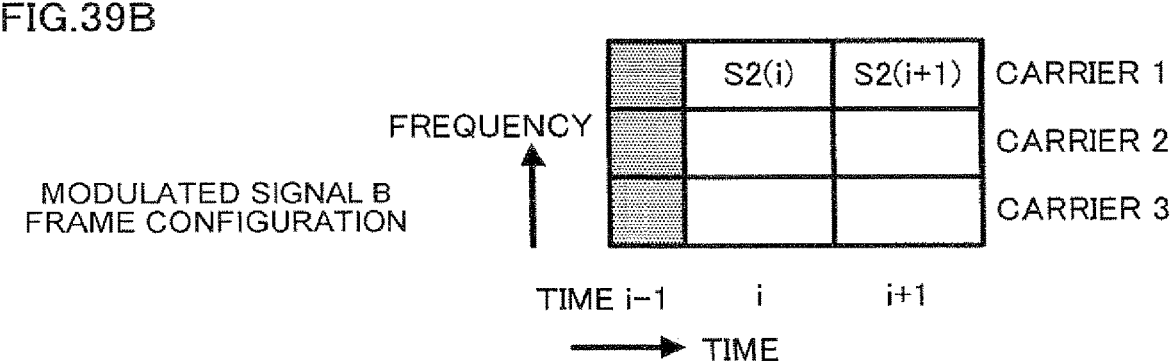
FIG.39B  MODULATED SIGNAL B FRAME CONFIGURATION
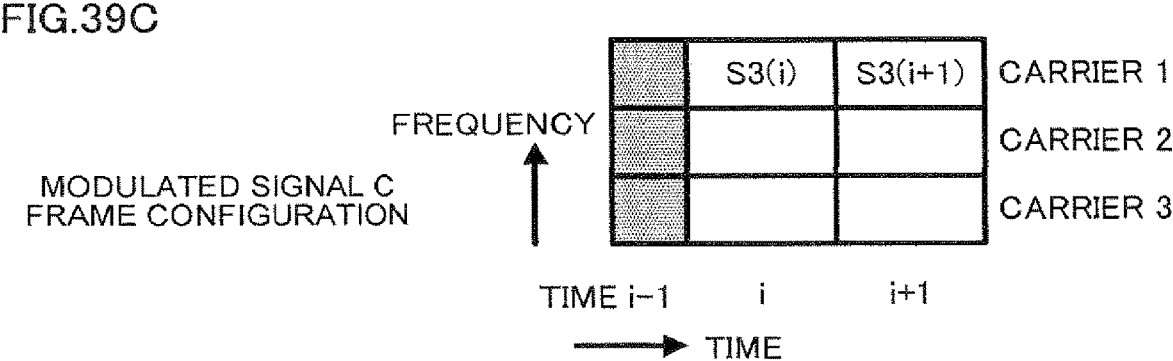
FIG.39C  MODULATED SIGNAL C FRAME CONFIGURATION
2801 : RADIO WAVE PROPAGATION ENVIRONMENT ESTIMATION SYMBOL
2802 : DATA SYMBOL

MODULATED SIGNAL A
FRAME CONFIGURATION

MODULATED SIGNAL B
FRAME CONFIGURATION

MODULATED SIGNAL C
FRAME CONFIGURATION

2801 : RADIO WAVE PROPAGATION
       ENVIRONMENT ESTIMATION SYMBOL

2802 : DATA SYMBOL

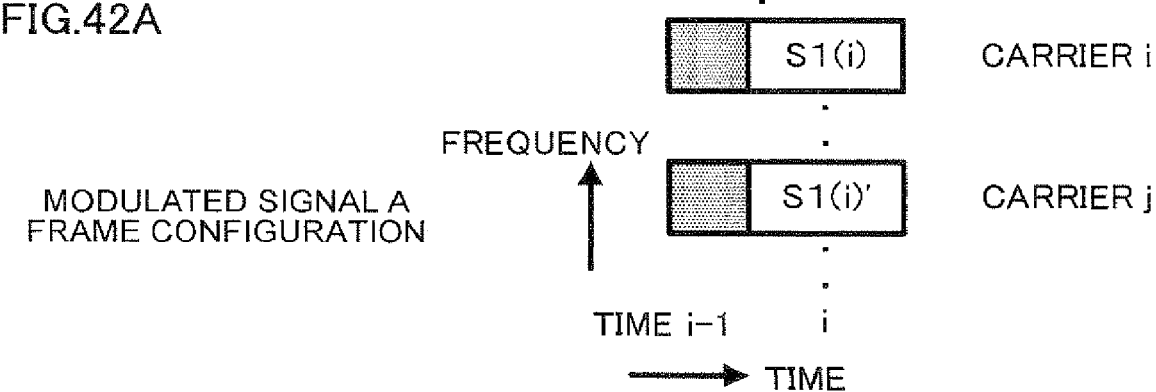
FIG.42A MODULATED SIGNAL A FRAME CONFIGURATION
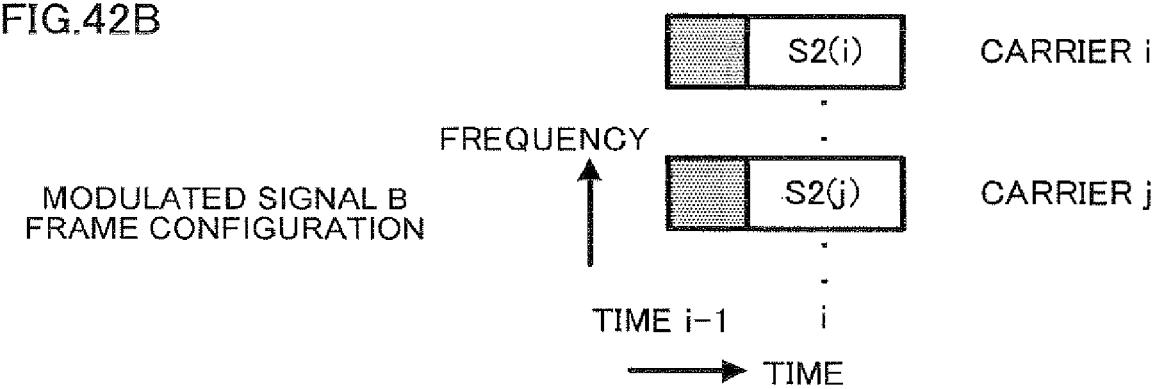
FIG.42B MODULATED SIGNAL B FRAME CONFIGURATION
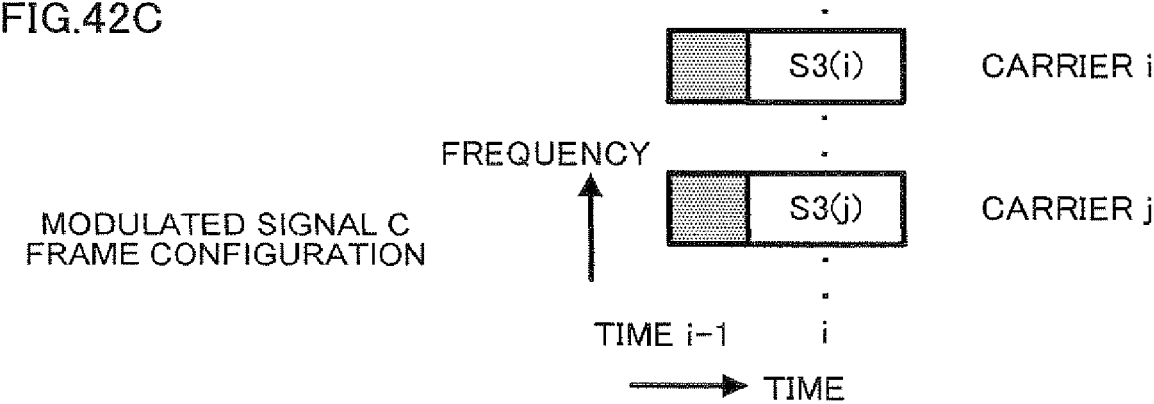
FIG.42C MODULATED SIGNAL C FRAME CONFIGURATION
2801 : RADIO WAVE PROPAGATION ENVIRONMENT ESTIMATION SYMBOL
2802 : DATA SYMBOL

MODULATED SIGNAL A FRAME CONFIGURATION

MODULATED SIGNAL B FRAME CONFIGURATION

MODULATED SIGNAL C FRAME CONFIGURATION

2801 : RADIO WAVE PROPAGATION ENVIRONMENT ESTIMATION SYMBOL

2802 : DATA SYMBOL

MODULATED SIGNAL A
FRAME CONFIGURATION

MODULATED SIGNAL B
FRAME CONFIGURATION

MODULATED SIGNAL C
FRAME CONFIGURATION

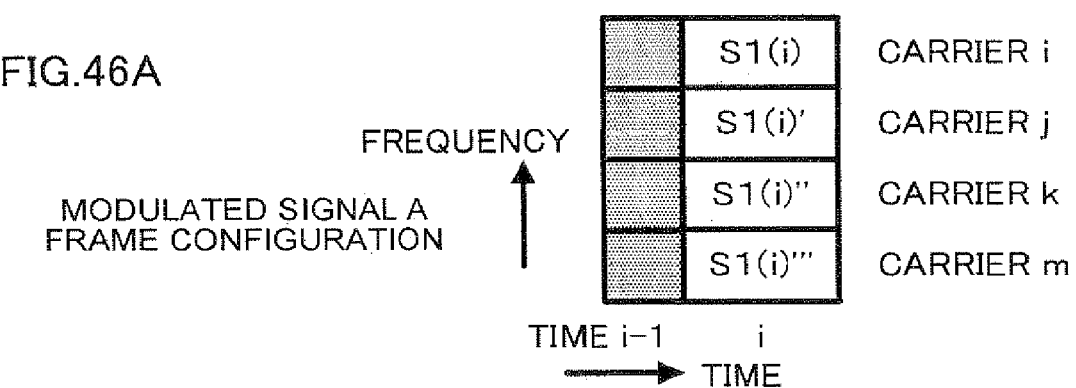
FIG.46A MODULATED SIGNAL A FRAME CONFIGURATION
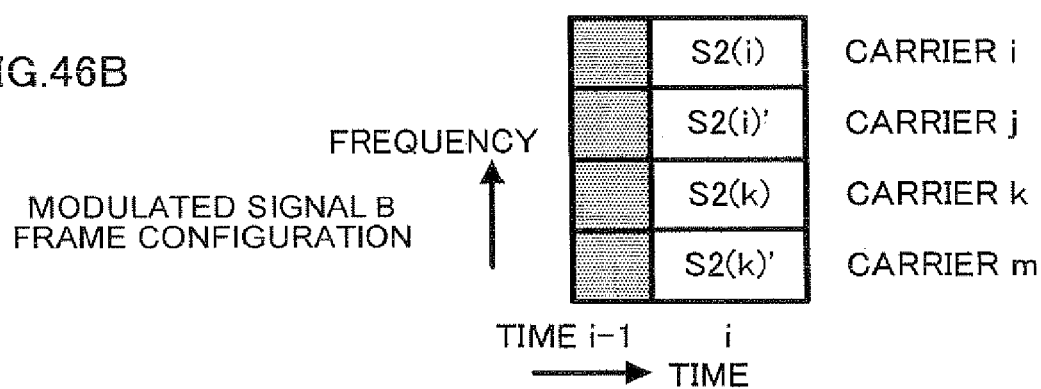
FIG.46B MODULATED SIGNAL B FRAME CONFIGURATION
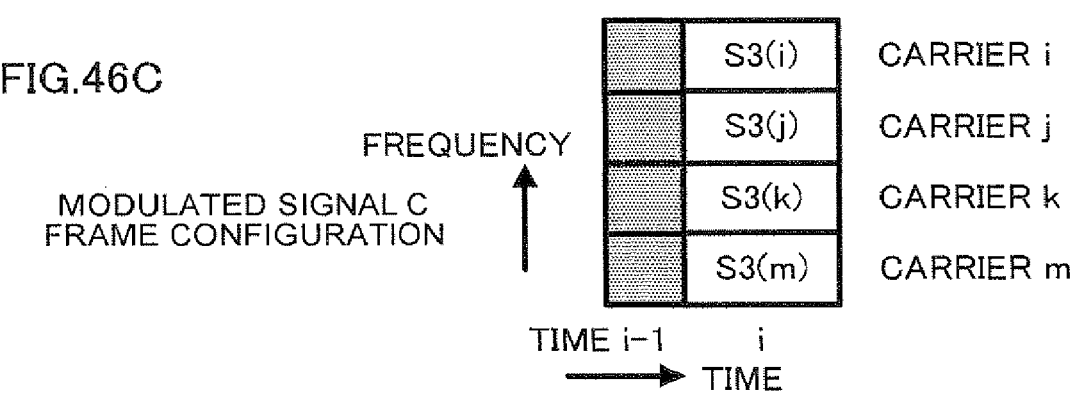
FIG.46C MODULATED SIGNAL C FRAME CONFIGURATION
2801 : RADIO WAVE PROPAGATION ENVIRONMENT ESTIMATION SYMBOL
2802 : DATA SYMBOL FIG.53B SIGNAL POINT ARRANGEMENTS AT TIME i+1

FIG.53A SIGNAL POINT ARRANGEMENTS AT TIME i

COMMUNICATION APPARATUS AND COMMUNICATION METHOD

CROSS REFERENCE TO RELATED APPLICATIONS

This is a continuation application of application Ser. No. 16/296,568, filed Mar. 8, 2019, which is a continuation of application Ser. No. 15/902,371 filed Feb. 22, 2018 which is a continuation of application Ser. No. 15/404,910 filed Jan. 12, 2017, which is a continuation application of application Ser. No. 14/709,858 filed May 12, 2015, which is a continuation application of Ser. No. 14/278,979 filed May 15, 2014, now U.S. Pat. No. 9,065,499, which is a continuation application of application Ser. No. 13/964,993 filed Aug. 12, 2013, now U.S. Pat. No. 8,767,864 issued Jul. 1, 2014, which is a continuation application of application Ser. No. 13/586,442 filed Aug. 15, 2012, now U.S. Pat. No. 8,532,219 issued Sep. 10, 2013, which is a continuation application of application Ser. No. 13/052,833 filed Mar. 21, 2011, now U.S. Pat. No. 8,270,521 issued Sep. 18, 2012, which is a continuation application of application Ser. No. 12/824,047 filed Jun. 25, 2010, now U.S. Pat. No. 7,929,635 issued Apr. 19, 2011, which is a continuation application of application Ser. No. 10/562,932 filed Feb. 9, 2006, now U.S. Pat. No. 7,773,694 issued Aug. 10, 2010, which is a national stage of PCT/JP2004/009774 filed Jul. 2, 2004, which is based on Japanese Application No. 2003-190683 filed Jul. 2, 2003 and Japanese Application No. 2004-173224 filed May 14, 2004, the entire contents of each of which are incorporated by reference herein. Other continuation applications of Ser. No. 10/562,932 filed Dec. 30, 2005 are: application Ser. No. 12/913,601 filed on Oct. 27, 2010, now U.S. Pat. No. 8,259,837 issued Sep. 4, 2012, which is a continuation application of application Ser. No. 12/697,878 filed Feb. 1, 2010, now U.S. Pat. No. 7,848,454 issued Dec. 7, 2010, which is a continuation application of application Ser. No. 10/562,932 filed Feb. 9, 2006, now U.S. Pat. No. 7,773,694 issued Aug. 10, 2010.

TECHNICAL FIELD

The present invention relates in particular to a communication apparatus and communication method that use multiple antennas.

BACKGROUND ART

An example of a conventional communication method that uses multiple antennas is the communication method known as MIMO (Multiple-Input Multiple-Output). In multi-antenna communication represented by MIMO a plurality of streams of transmit data are individually modulated, and each modulated signal is transmitted simultaneously from a different antenna, thereby increasing the data communication speed.

In this kind of communication method, the receiving side must separate and demodulate a plurality of modulated signals multiplexed together on the transmission path. Therefore, in communication using multiple antennas, demodulation precision has a major influence on the effective data transmission speed.

An example of a heretofore known technology that improves modulated signal reception quality on the receiving side and improves the effective data transmission speed when performing multi-antenna communication is a technique whereby space-time block codes are transmitted as described in "Space-Time Block Codes from Orthogonal Design" IEEE Transactions on Information Theory, pp. 1456-1467, vol. 45, no. 5, July 1999.

These space-time block codes will be explained briefly using FIG. 1. As shown in FIG. 1B, a transmitting apparatus has antennas 5 and 6, and transmits a signal simultaneously from each of antennas 5 and 6. A receiving apparatus receives the simultaneously transmitted plurality of signals with an antenna 7.

FIG. 1A shows the frame configuration of signals transmitted from antennas 5 and 6. A transmit signal A is transmitted from antenna 5, and at the same time, a transmit signal B is transmitted from antenna 6. Transmit signal A and transmit signal B are composed of symbol blocks in which the same symbols are placed a plurality of times so that coding gain and diversity gain are obtained.

This will now be explained in more detail. In FIG. 1A, S1 and S2 indicate different symbols, and complex conjugates are indicated by "*". In space-time block coding, at time i, symbol S1 is transmitted from first antenna 5 and symbol −S2* is simultaneously transmitted from second antenna 6, and then at time i+1, symbol S2 is transmitted from first antenna 5 and symbol S1* is simultaneously transmitted from second antenna 6.

At antenna 7 of the receiving apparatus, a signal is received in which transmit signal A subjected to channel fluctuation h1(t) between antenna 5 and antenna 7, and transmit signal B subjected to channel fluctuation h2(t) between antenna 6 and antenna 7, are combined.

The receiving apparatus estimates channel fluctuations h1(t) and h2(t), separates the original transmit signal A and transmit signal B from the composite received signal by using those estimates, and then demodulates the symbols.

If space-time block coded signals are used at this time, when signal separation is carried out maximal-ratio combining of symbols S1 and S2 can be performed regardless of channel fluctuations h1(t) and h2(t), enabling large coding gain and diversity gain to be obtained. As a result, reception quality—that is, error rate performances can be improved.

As a different modulated signal is transmitted from each transmitting antenna in multi-antenna communication as described above, it is ideally possible for the data transmission speed to be increased by a factor equal to the number of antennas compared with a case where a modulated signal is transmitted from a single antenna. However, if the precision of separation and demodulation of the modulated signals is poor, the effective data transmission speed will decrease.

In contrast, when space-time block coding technology is used, the reception quality (error rate performances) of the modulated signal transmitted from each antenna can be improved, enabling a decrease in data transmission speed due to degradation of separation and demodulation precision to be suppressed.

However, a drawback with the use of space-time block coding technology is that, while reception quality (error rate performances) certainly improves, transmission efficiency decreases. That is to say, since S1* and S2* transmitted using space-time block coding are demodulated as S1 and S2 by the receiving apparatus, the same information is transmitted twice at time i and time i+1, and transmission efficiency decreases proportionally.

For example, in a general multi-antenna communication system, symbols S3 and S4 differing from symbols S1 and S2 are transmitted at time i+1, and therefore four symbols S1 through S4 can be transmitted in the period from time i to time i+1. That is to say, considered in simple terms, data transmission efficiency when using space-time block coding technology decreases to half that of general multi-antenna communication.

DISCLOSURE OF INVENTION

It is an object of the present invention to provide a communication apparatus and communication method that enable excellent reception quality to be obtained while suppressing a decrease in data transmission efficiency. In order to achieve this object, when a first modulated signal is transmitted from a first antenna and a second modulated signal is transmitted from a first antenna, the signal point arrangement mode of at least one modulated signal of the first modulated signal and second modulated signal is changed in the time direction or the frequency direction.

By this means, the modulated-signal signal point arrangement changes for each time or each subcarrier, and therefore, on the receiving side, the Euclidian distance between a candidate signal point and reception point is large at a particular time or in a particular subcarrier, and the Euclidian distance between a candidate signal point and reception point is small at a particular time or in a particular subcarrier. As a result, a diversity effect can be obtained, and reception quality can be improved.

Also, in the present invention, the first modulated signal is formed by modulating the same data of first transmit data a plurality of times while changing the signal point arrangement mode, and the second modulated signal is formed by modulating second transmit data without changing the signal point arrangement mode.

By this means, the demodulation result of a first modulated signal obtained based on a received signal of a time or subcarrier of good reception quality can be made a first modulated signal received digital signal, a received digital signal of a second modulated signal received at a time or in a subcarrier of poor reception quality can be obtained from a received signal of that time or subcarrier of poor reception quality using a received digital signal of the first modulated signal of a time or subcarrier of good reception quality already determined, and the error rate performances of the second modulated signal received at a time or in a subcarrier of poor reception quality can also be improved. As a result, a received digital signal with good error rate performances can be obtained for both the first modulated signal and the second modulated signal.

Moreover, in the present invention, a modulated signal formed from different transmit data is basically transmitted from each antenna, enabling a decrease in data transmission efficiency to be suppressed to a greater extent than when space-time block coding is used.

BRIEF DESCRIPTION OF DRAWINGS

FIG. 2A is a drawing showing sample frame configurations of modulated signals according to Embodiment 1;

FIG. 2B is a drawing showing the relationship between transmitting antennas and receiving antennas;

FIG. 3A, FIG. 3B and FIG. 3C are drawings showing sample signal point arrangements according to Embodiment 1;

FIG. 11A, FIG. 11B and FIG. 11C are drawings showing sample signal point arrangements according to Embodiment 1;

FIG. 37A and FIG. 37B are drawings showing sample frame configurations of modulated signals according to Embodiment 3;

FIG. 39A through FIG. 39C are drawings showing sample frame configurations of modulated signals according to Embodiment 3;

FIG. 42A through FIG. 42C are drawings showing sample frame configurations of modulated signals according to Embodiment 3;

FIG. 46A through FIG. 46C are drawings showing sample frame configurations of modulated signals according to Embodiment 3;

BEST MODE FOR CARRYING OUT THE INVENTION

Figure 1A:
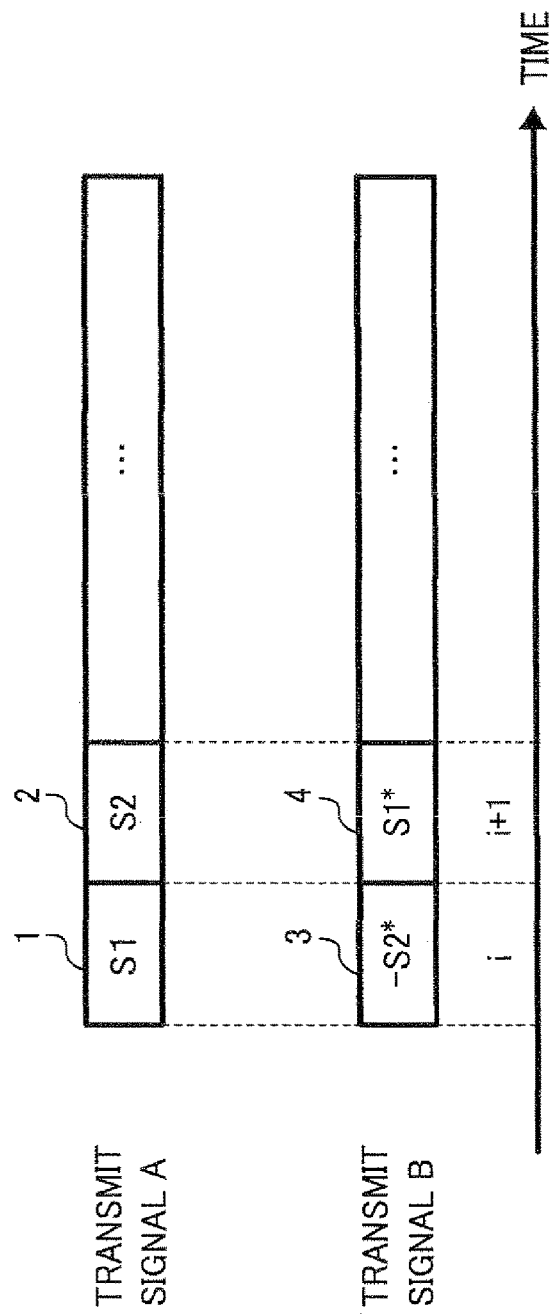
FIG. 1A is a drawing showing an example of the frame configurations of conventional transmit signals.
Figure 1B:
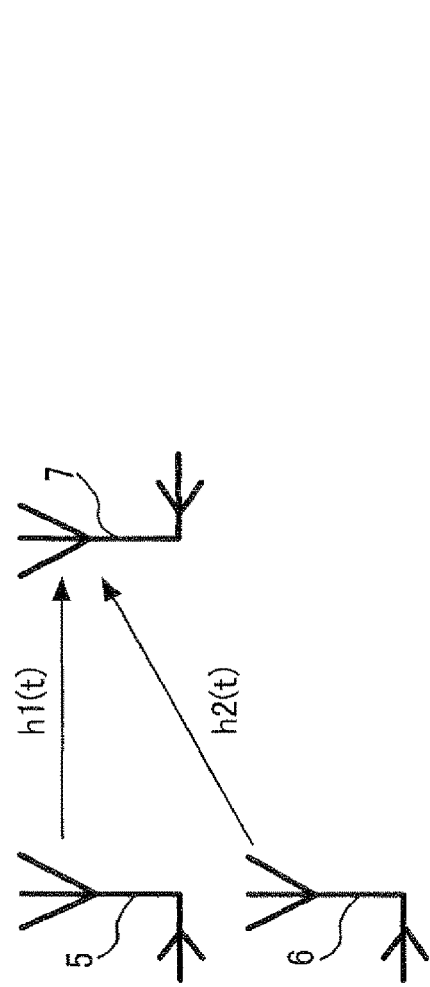
FIG. 1B is a drawing showing the relationship between transmitting antennas and a receiving antenna.

With reference now to the accompanying drawings, embodiments of the present invention will be explained in detail below.

(1) Embodiment 1

In this embodiment it is proposed that, when a first and second antenna are used and a different modulated signal is transmitted from each antenna, the same data be transmitted a plurality of times for only one modulated signal. In this embodiment, two modulated signals are formed by modulating two different streams of data, and these two modulated signals are transmitted from different antennas. At this time, in a modulated signal transmitted from one of the antennas, the same data is transmitted a plurality of times, changing the signal point arrangement mode. By this means, since different modulated signals are basically transmitted from each antenna, the error rate performances of data transmitted a plurality of times can be improved, and as a result, the error rate performances of both streams (the two streams) can be improved, while maintaining a higher data transmission speed than when space-time block coding is used.

FIG. 2A shows frame configurations of modulated signals transmitted from a communication apparatus according to Embodiment 1 of the present invention. Modulated signal A and modulated signal B are transmitted from different antennas. Modulated signals A and B contain radio wave propagation environment estimation symbols 101 and 104 respectively. Radio wave propagation environment estimation symbols 101 and 104 are predetermined symbols for estimating the radio wave propagation environment in a receiving apparatus.

Reference codes 102, 103, 105, and 106 denote data symbols. Modulated signal A point i data symbol 102 (S1(i)) and modulated signal A point i+1 data symbol 103 (S1(i)') form the same data as signal point arrangements with the mapping rule changed. On the other hand, modulated signal B point i data symbol 105 (S2(i)) and modulated signal B point i+1 data symbol 106 (S2(i+1)) have mutually different data that has undergone signal point arrangement in accordance with the same mapping rule. That is to say, while modulated signal B is a typical modulated signal, modulated signal A transmits the same data a plurality of times, changing the mapping pattern.

In FIG. 2B, modulated signal A is transmitted from transmitting antenna 107 and modulated signal B is transmitted from transmitting antenna 108. Then a signal combining modulated signal A and modulated signal B multiplexed together on the propagation path is received at each of receiving antennas 109 and 110.

FIG. 3A through FIG. 3C show sample signal point arrangements for modulated signal A. FIG. 3A shows the signal point arrangement of symbol 102 in FIG. 2. FIG. 3B and FIG. 3C show signal point arrangements of symbol 103 in FIG. 2. FIG. 3B is an example in which the same data is arranged with the phase rotated through 90$o$ with respect to the signal point arrangement in FIG. 3A. FIG. 3C is an example in which the same data is arranged with the phase rotated through 45o with respect to the signal point arrangement in FIG. 3A.

Figure 4:
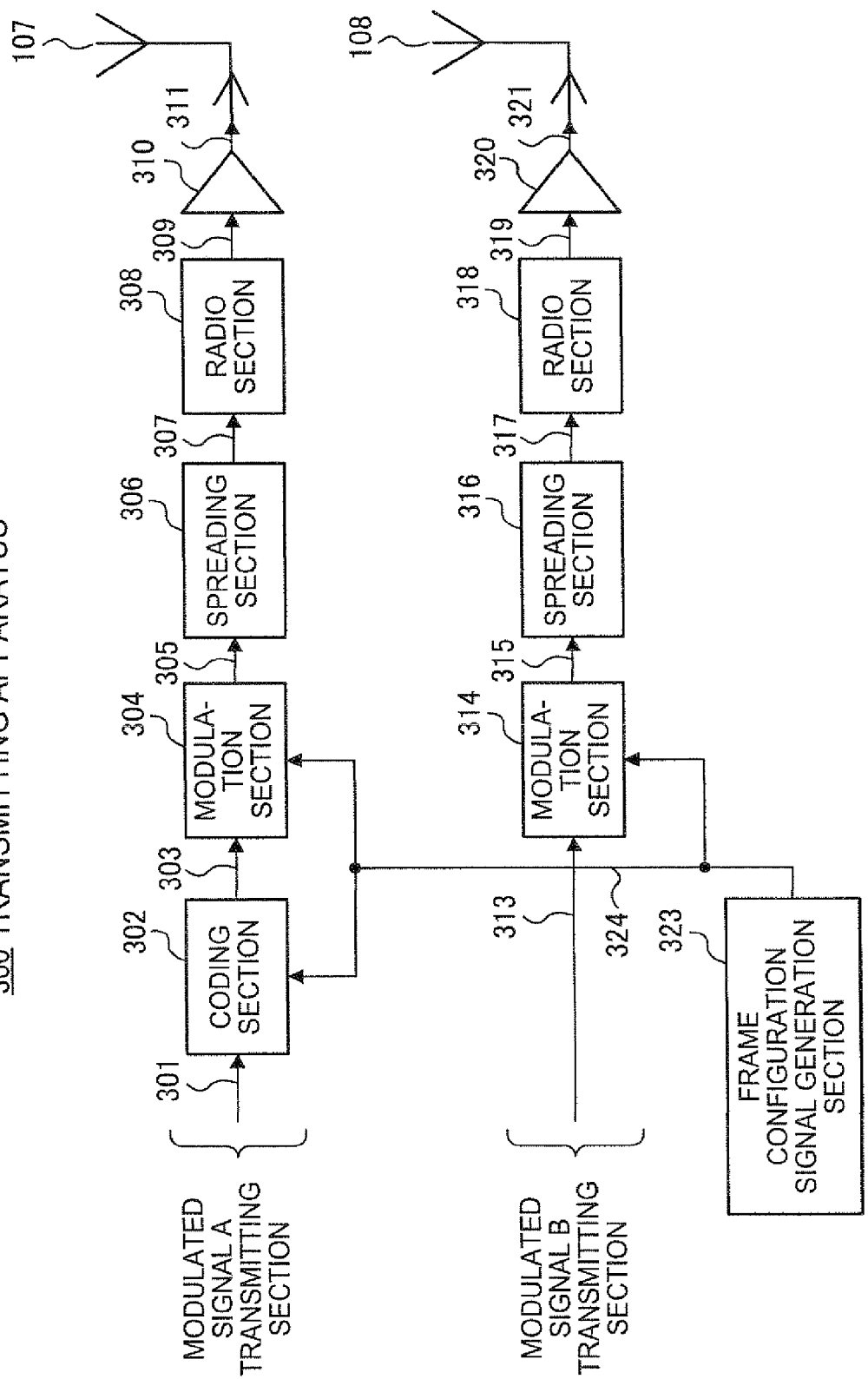
FIG. 4 is a block diagram showing a sample configuration of a transmitting apparatus according to Embodiment 1.

FIG. 4 shows a sample configuration of a transmitting apparatus according to this embodiment. The transmitting apparatus in FIG. 4 mainly comprises a coding section 302, a modulation section 304, a spreading section 306, a radio section 308, a power amplifier 310, a modulation section 314, a spreading section 316, a radio section 318, a power amplifier 320, and a frame configuration signal generation section 323.

In FIG. 4, frame configuration signal generation section 323 outputs a signal frame configuration signal 324 indicating a frame configuration—for example, information indicating which symbol in a frame is to be transmitted. Based on signal frame configuration signal 324, coding section 302 outputs a transmit digital signal 301 a plurality of times (in this embodiment, twice) in symbol units as a post-coding digital signal 303.

Modulation section 304 has post-coding digital signal 303 and frame configuration signal 324 as input, and outputs a transmit quadrature baseband signal 305 to spreading section 306. At this time, modulation section 304 performs modulation by mapping information in a predetermined signal point arrangement as shown in FIG. 3A, and then performs modulation by mapping the same information in a different signal point arrangement from the previous time as shown in FIG. 3B and FIG. 3C.

Spreading section 306 spreads transmit quadrature baseband signal 305 and outputs a post-spreading transmit quadrature baseband signal 307 to radio section 308. Radio section 308 converts post-spreading transmit quadrature baseband signal 307 from baseband frequency to radio frequency, and outputs a post-conversion modulated signal 309 to power amplifier 310. Power amplifier 310 amplifies the power of modulated signal 309, and outputs a post-amplification modulated signal 311. Modulated signal 311 is output from antenna 107 as a radio wave.

Modulation section 314 has transmit digital signal 313 and frame configuration signal 324 as input, and outputs transmit quadrature baseband signal 315. Spreading section 316 spreads transmit quadrature baseband signal 315, and outputs post-spreading transmit quadrature baseband signal 317.

Radio section 318 converts post-spreading transmit quadrature baseband signal 317 from baseband frequency to radio frequency, and outputs a post-conversion modulated signal 319. Power amplifier 320 amplifies the power of modulated signal 319, and outputs a post-amplification modulated signal 321. Modulated signal 321 is output from antenna 108 as a radio wave.

Figure 5:
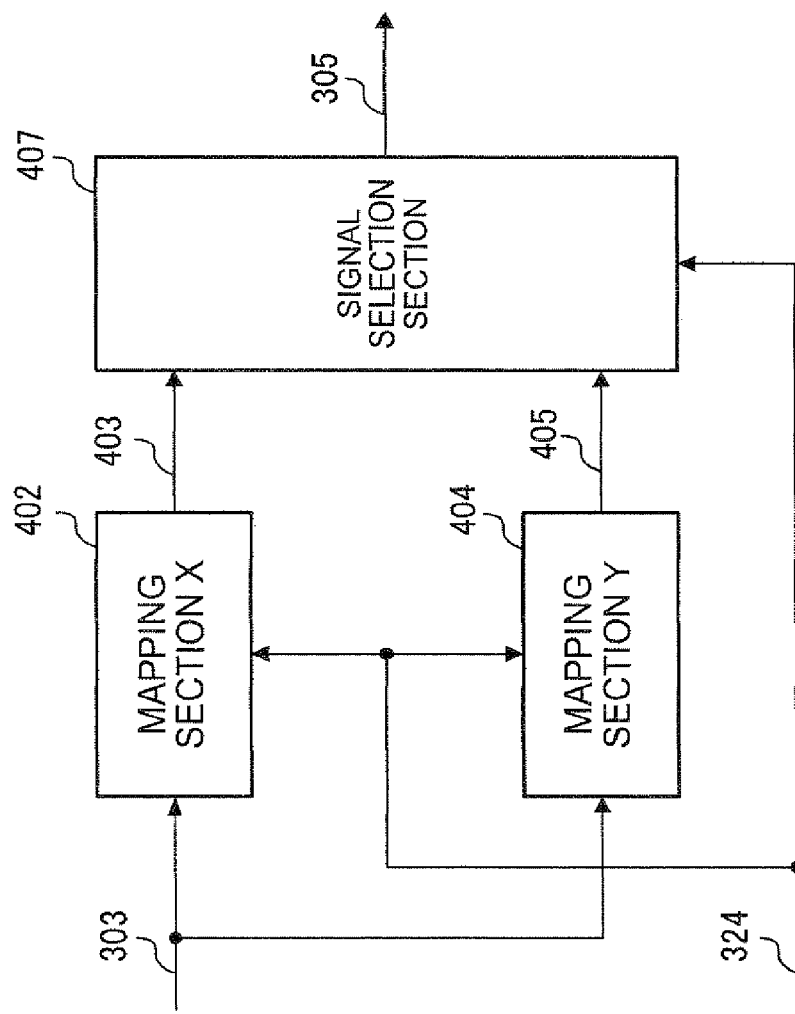
FIG. 5 is a block diagram showing a sample configuration of a modulation section according to Embodiment 1.

FIG. 5 shows a sample configuration of modulation section 304 in FIG. 4 according to this embodiment. In FIG. 5, a mapping section X 402 has a post-coding digital signal 303 and frame configuration signal 324 as input, and by mapping digital signal 303 as shown in FIG. 3A, outputs a first mapped transmit quadrature baseband signal 403.

A mapping section Y 404 has post-coding digital signal 303 and frame configuration signal 324 as input, and by mapping digital signal 303 using a different mapping pattern from that of mapping section X 402 as shown in FIG. 3B or FIG. 3C, outputs a second mapped transmit quadrature baseband signal 405.

A signal selection section 407 has first mapped transmit quadrature baseband signal 403, second mapped transmit quadrature baseband signal 405, and frame configuration signal 324 as input, selects either transmit quadrature baseband signal 403 or transmit quadrature baseband signal 405 based on the frame configuration signal, and outputs selected transmit quadrature baseband signal 305.

Figure 6:
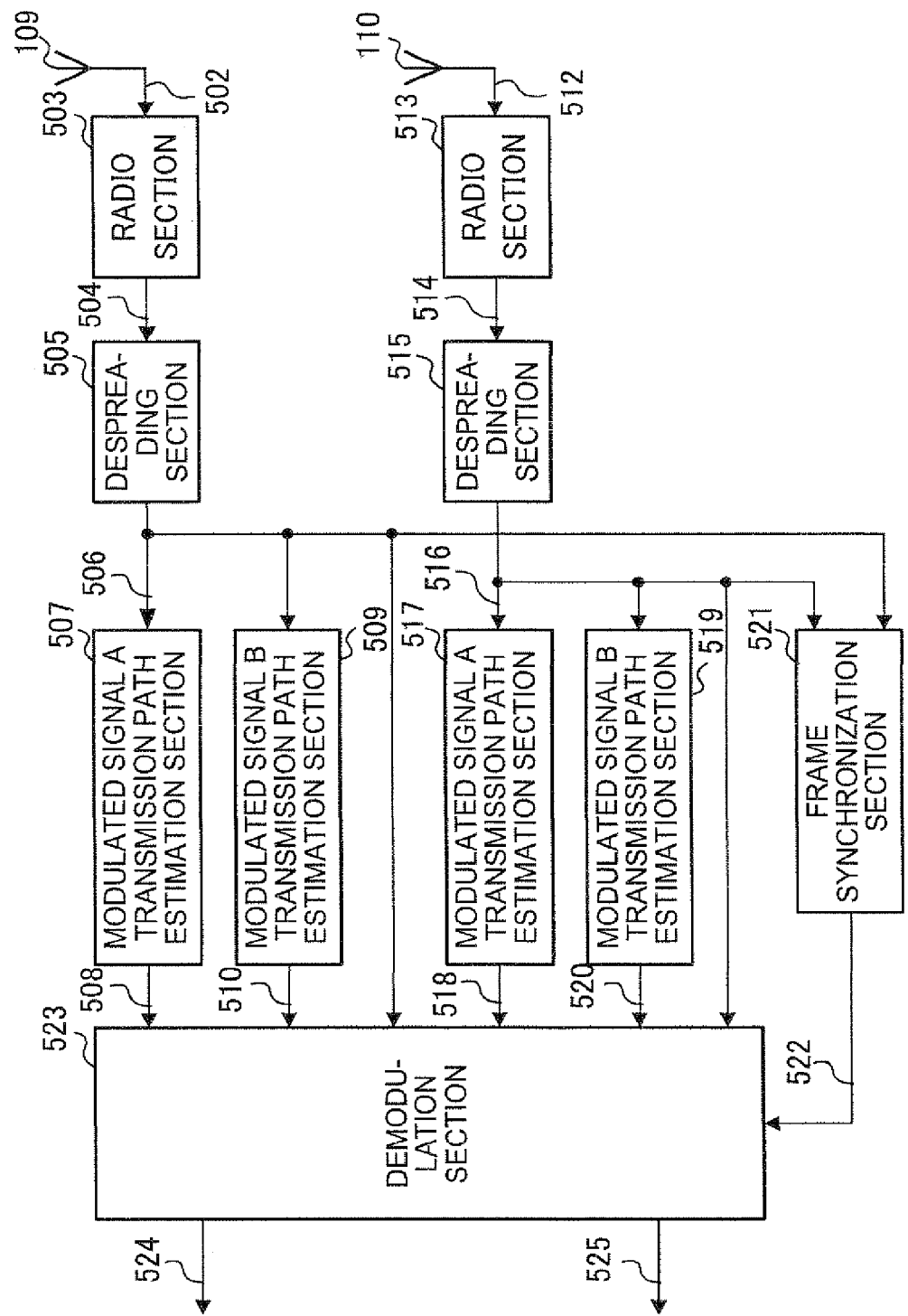
FIG. 6 is a block diagram showing a sample configuration of a receiving apparatus according to Embodiment 1.

FIG. 6 shows a sample configuration of a receiving apparatus according to this embodiment. A radio section 503 has a received signal 502 received by an antenna 109 as input, and outputs a received quadrature baseband signal 504. A despreading section 505 has received quadrature baseband signal 504 as input, and outputs a post-despreading received quadrature baseband signal 506.

A modulated signal A transmission path estimation section 507 has post-despreading received quadrature baseband signal 506 as input, estimates modulated signal channel fluctuation (h11(t) in FIG. 2B) based on radio wave propagation environment estimation symbol 101 contained in modulated signal A (FIG. 2A), and outputs the estimation result as a modulated signal A transmission path estimation signal 508. Similarly, a modulated signal B transmission path estimation section 509 has post-despreading received quadrature baseband signal 506 as input, estimates modulated signal B channel fluctuation (h21(t) in FIG. 2B) based on radio wave propagation environment estimation symbol 104 contained in modulated signal B (FIG. 2A), and outputs the estimation result as a modulated signal B transmission path estimation signal 510.

A radio section 513 has a received signal 512 received by an antenna 110 as input, and outputs a received quadrature baseband signal 514. A despreading section 515 has received quadrature baseband signal 514 as input, and outputs a post-despreading received quadrature baseband signal 516.

A modulated signal A transmission path estimation section 517 has post-despreading received quadrature baseband signal 516 as input, estimates modulated signal channel fluctuation (h12(t) in FIG. 2B) based on radio wave propagation environment estimation symbol 101 contained in modulated signal A (FIG. 2A), and outputs the estimation result as a modulated signal A transmission path estimation signal 518. Similarly, a modulated signal B transmission path estimation section 519 has post-despreading received quadrature baseband signal 516 as input, estimates modulated signal B channel fluctuation (h22(t) in FIG. 2B) based on radio wave propagation environment estimation symbol 104 contained in modulated signal B (FIG. 2A), and outputs the estimation result as a modulated signal B transmission path estimation signal 520.

A frame synchronization section 521 has post-despreading received quadrature baseband signals 506 and 516 as input, forms a frame synchronization signal 522 for maintaining synchronization between frames based on predetermined symbols contained in received quadrature baseband signals 506 and 516 and so forth, and outputs this frame synchronization signal 522.

A demodulation section 523 has modulated signal A transmission path estimation signals 508 and 518, modulated signal B transmission path estimation signals 510 and 520, post-despreading received quadrature baseband signals 506 and 516, and frame synchronization signal 522 as input, and by demodulating received quadrature baseband signals 506 and 516 using transmission path estimation signals 508, 518, 510, and 520, and frame synchronization signal 522, obtains a modulated signal A received digital signal 524 and modulated signal B received digital signal 525, and outputs these signals.

Figure 7:
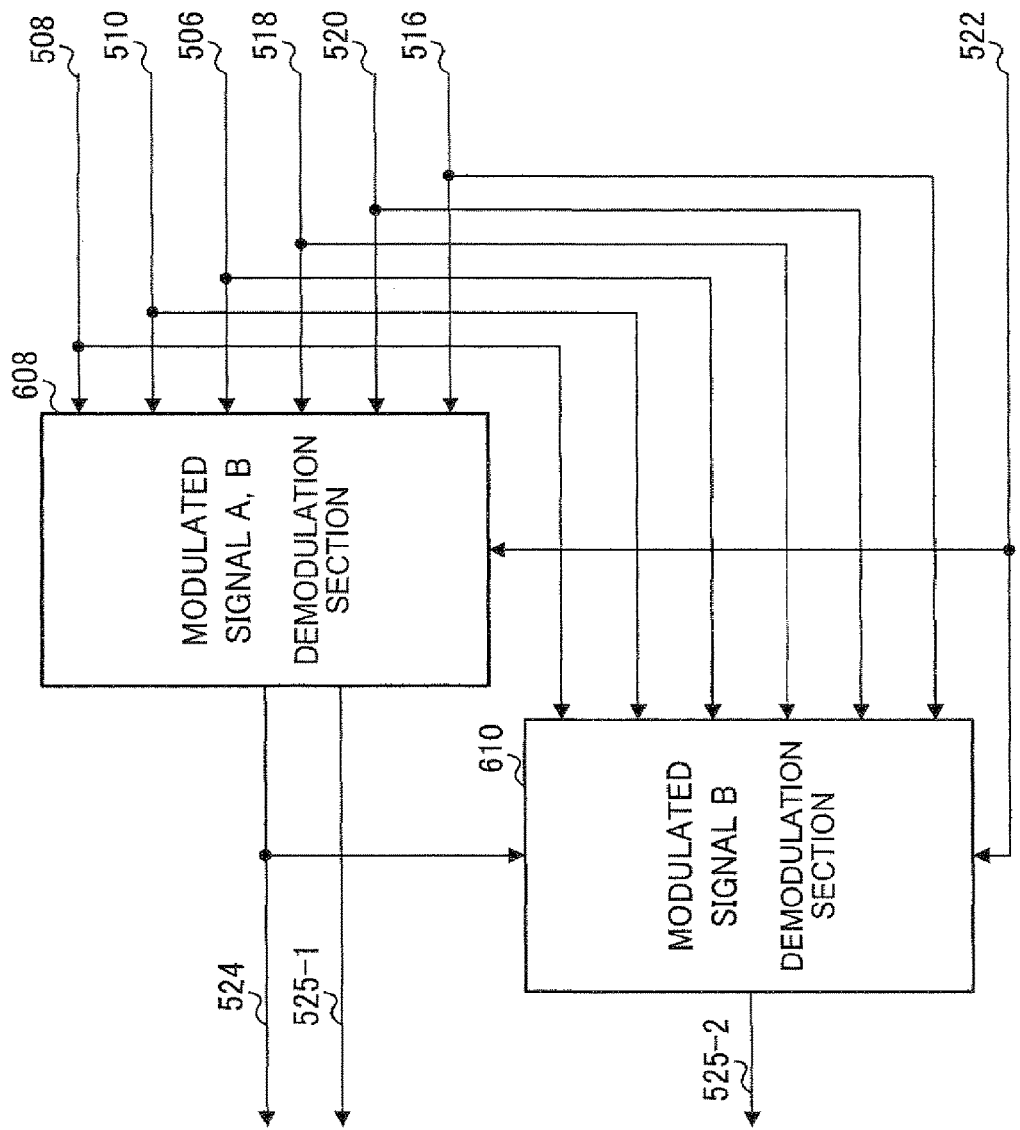
FIG. 7 is a block diagram showing a sample configuration of a demodulation section according to Embodiment 1.

FIG. 7 shows the detailed configuration of demodulation section 523. Demodulation section 523 has a modulated signal A and B demodulation section 608 and a modulated signal B demodulation section 610.

Modulated signal A and B demodulation section 608 has modulated signal A transmission path estimation signals 508 and 518, modulated signal B transmission path estimation signals 510 and 520, post-despreading received quadrature baseband signals 506 and 516, and frame synchronization signal 522 as input, and by demodulating received quadrature baseband signals 506 and 516 using transmission path estimation signals 508, 518, 510, and 520, and frame synchronization signal 522, obtains a modulated signal A received digital signal 524 and modulated signal B received digital signal 525-1, and outputs these signals.

In addition to modulated signal A transmission path estimation signals 508 and 518, modulated signal B transmission path estimation signals 510 and 520, post-despreading received quadrature baseband signals 506 and 516, and frame synchronization signal 522, modulated signal B demodulation section 610 also has as input modulated signal A received digital signal 524 obtained by modulated signal A and B demodulation section 608, and using these, outputs a received digital signal 525-2 for modulated signal B.

Figure 8:
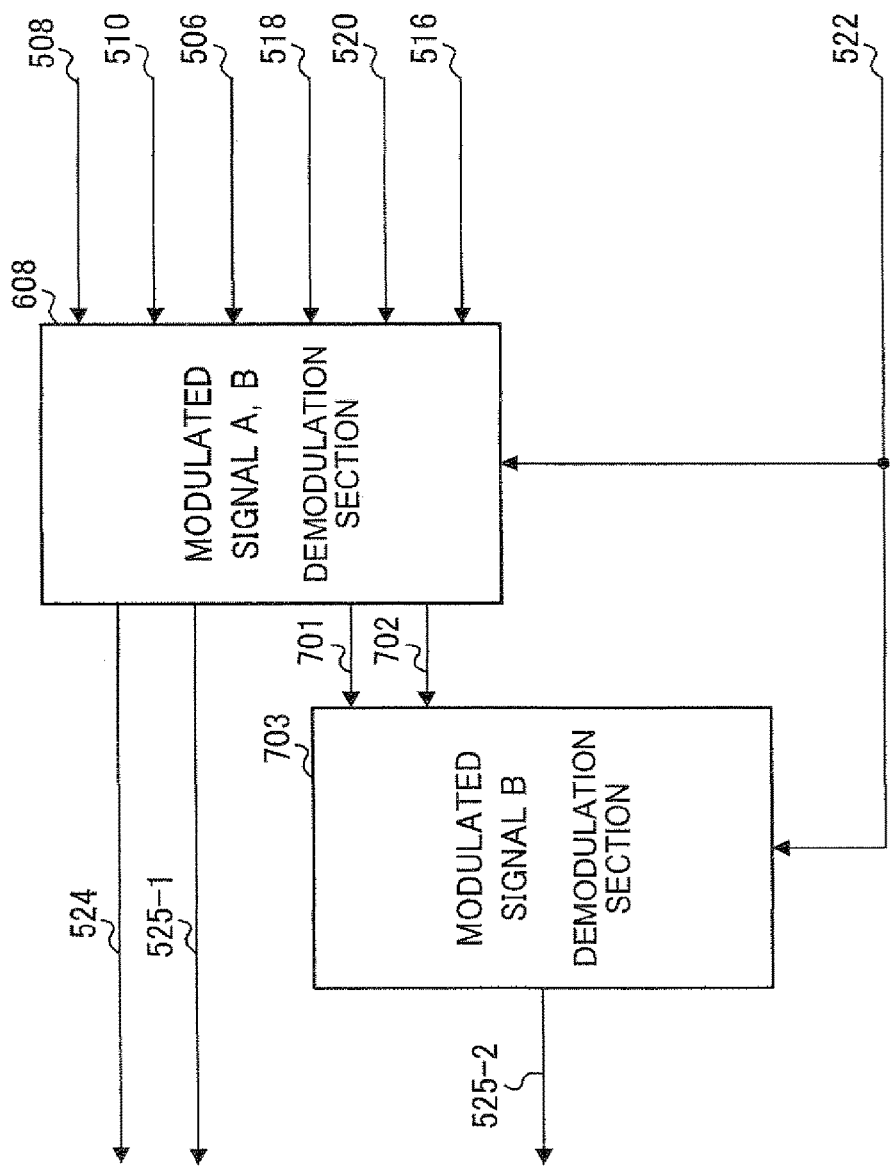
FIG. 8 is a block diagram showing another sample configuration of a demodulation section.

FIG. 8 shows another sample configuration of demodulation section 523. In FIG. 8, items that operate in the same way as in FIG. 7 are assigned the same codes as in FIG. 7.

Modulated signal A and B demodulation section 608 has modulated signal A transmission path estimation signals 508 and 518, modulated signal B transmission path estimation signals 510 and 520, post-despreading received quadrature baseband signals 506 and 516, and frame synchronization signal 522 as input, and by demodulating received quadrature baseband signals 506 and 516 using transmission path estimation signals 508, 518, 510, and 520, and frame synchronization signal 522, obtains modulated signal A received digital signal 524, a modulated signal B received digital signal 525-1, a first soft decision value signal 701, and a second soft decision value signal 702, and outputs these signals.

A modulated signal B demodulation section 703 has first soft decision value signal 701 and second soft decision value signal 702 as input, obtains received digital signal 525-2 by demodulating first soft decision value signal 701 and second soft decision value signal 702, and outputs this received digital signal 525-2.

Next, the operation of this embodiment will be explained.

As described above, when transmitting apparatus 300 of this embodiment transmits two modulated signals A and B from separate antennas, the same data is transmitted a plurality of times, changing the mapping pattern (that is, the signal point arrangement mode), for modulated signal A only. Thus, to consider a comparison with use of space-time block coding, whereas the same information is transmitted repeatedly by a plurality of antennas in space-time block coding, transmitting apparatus 300 transmits information repeatedly from only one antenna but does not transmit the same information repeatedly from the other antenna, thereby enabling a higher data transmission speed to be maintained than when space-time block coding is used.

Also, by receiving such signals, receiving apparatus 500 can demodulate modulated signal A and modulated signal B with good error rate performances. This procedure will be described in detail below.

First, using radio wave propagation environment estimation symbols, receiving apparatus 500 estimates channel fluctuations h11(t), h12(t), h21(t), and h22(t) between the antennas of the modulated signals at time t. The relationship between received signal R1(i) received by antenna 109 and received signal R2(i) received by antenna 110 at time i, and modulated signal S1(i) transmitted from transmitting antenna 107 and modulated signal S2(i) transmitted from transmitting antenna 108 at time i can be expressed by the following equation using h11(i), h12(i), h21(i), h22(i).

$$\begin{pmatrix} R1(i) \\ R2(i) \end{pmatrix} = \begin{pmatrix} h11(i) & h12(i) \\ h21(i) & h22(i) \end{pmatrix} \begin{pmatrix} S1(i) \\ S2(i) \end{pmatrix} \quad (1)$$

Similarly, the relationship in the following equation holds true at time i+1.

$$\begin{pmatrix} R1(i+1) \\ R2(i+1) \end{pmatrix} = \begin{pmatrix} h11(i+1) & h12(i+1) \\ h21(i+1) & h22(i+1) \end{pmatrix} \begin{pmatrix} S1(i)' \\ S2(i+1) \end{pmatrix} \quad (2)$$

S1(i) and S2(i) can be obtained from the relationship in equation (1), and S1(i)' and S2(i+1) can be obtained from the relationship in equation (2).

Here, if the difference between the time in which data symbols 102 and 105 are transmitted and the time in which data symbols 103 and 106 are transmitted is small, as in the example in FIG. 2A (in which there is only a difference of time "1"), then h11(i) ≈ h11(i+1), h12(i) ≈ h12(i+1), h21(i) ≈ h21(i+1), and h22(i) ≈ h22(i+1).

Therefore, in such a case, the matrices of equation (1) and equation (2) are almost equal matrices, but the (S1(i), S2(i)) and (S1(i)', S2(i+1)) vectors are different, and therefore the likelihoods of the data obtained by demodulation are different.

In particular, the difference in data likelihoods increases when the Likelihood Detection shown in "A simple transmit diversity technique for wireless communications," IEEE Journal on Select Areas in Communications, pp. 1451-1458, vol. 16, no. 8, October 1998, is used.

Figure 52:
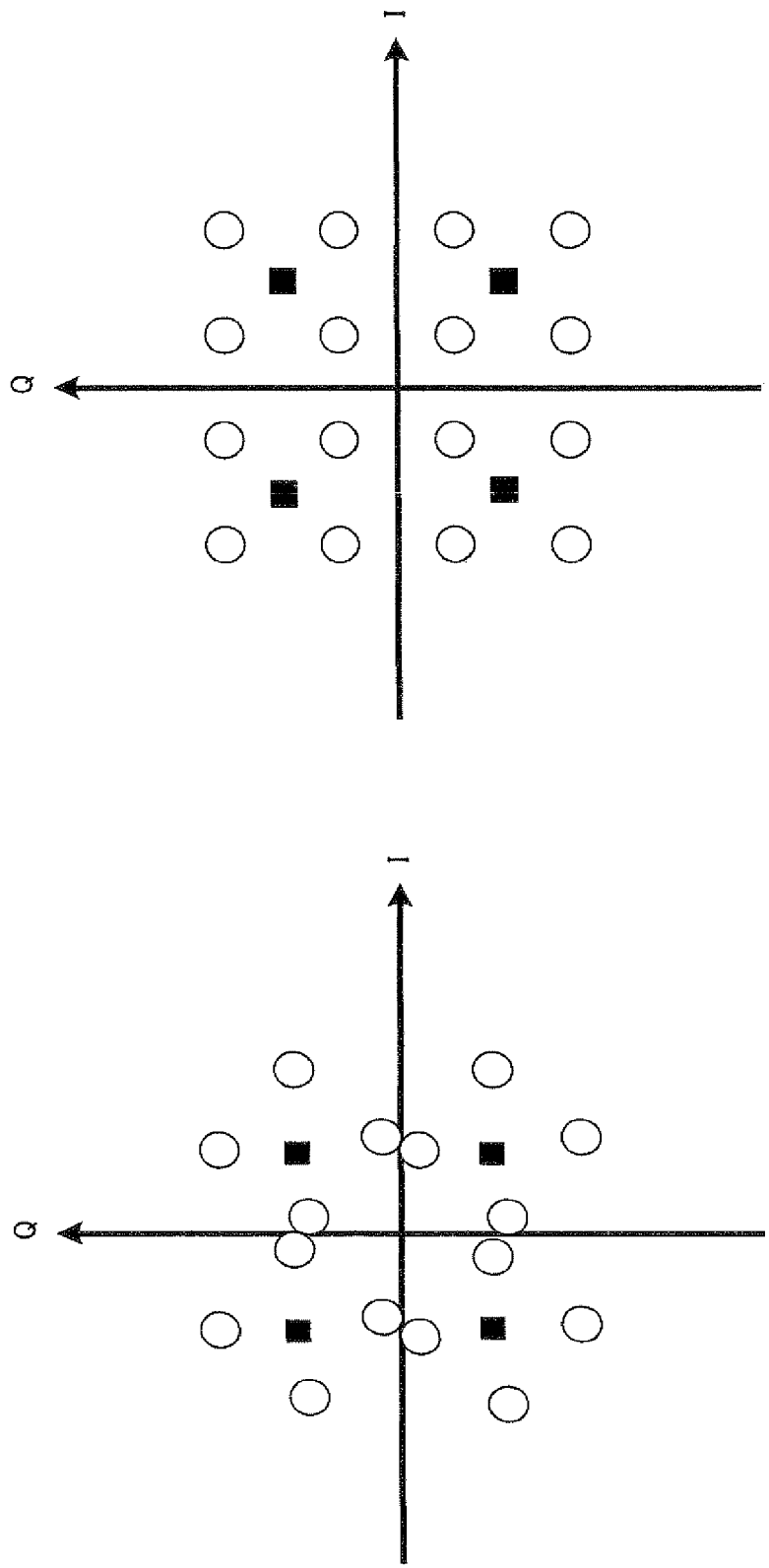
FIG. 52A is a drawing showing a reception signal point state in which the minimum Euclidian distance is small and reception quality is poor.
FIG. 52B is a drawing showing a reception signal point state in which the minimum Euclidian distance is large and reception quality is good.

An example of variation of candidate signal points in time i and time i+1 received signals at this time is shown in FIG. 52A and FIG. 52B. FIG. 52A shows a candidate signal point arrangement for a time i received signal, and FIG. 52B shows a candidate signal point arrangement for a time i+1 received signal. Thus, in this embodiment the candidate signal point arrangement differs for time i and time i+1, and therefore the reception quality at time i and the reception quality at time i+1 differ. By this means, a diversity effect can be obtained. FIG. 52A and FIG. 52B will be explained in detail later herein.

Transmitting apparatus 300 and receiving apparatus 500 of this embodiment make use of this characteristic to improve receive data quality.

This will now be explained in specific terms. As described above, transmitting apparatus 300 forms modulated signal A (S1(i), S1(i)') by modulating the same transmit data so that the time i and time i+1 signal point arrangements vary, and transmits this at the same time as modulated signal B (S2(i), S2(i+1)) using a different antenna. By this means, the receiving side separates and demodulates modulated signal S1(i) and modulated signal S2(i) from a signal in which modulated signal S1(i) and modulated signal S2(i) are multiplexed at time i, and demodulates modulated signal S1(i)' and modulated signal S2(i+1) from a signal in which modulated signal S1(i)' and modulated signal S2(i+1) are multiplexed at time i+1.

Here, since the modulated signal A signal point arrangement changes between time i and time i+1, the signal point arrangement of the above-described time i multiplexed signal and the signal point arrangement of the above-described time i+1 multiplexed signal also differ, and as a result, the error rates of the receive data when these are separated and modulated are also different.

When the time i reception quality is better, receiving apparatus 500 of this embodiment uses the signal obtained by demodulating modulated signal S1(i) as the modulated signal A demodulation result. That is to say, the S1(i) demodulation result is also used as the modulated signal S1(i)' demodulation result. Then modulated signal S2(i) whose reception quality is good is demodulated by means of normal separation and modulation from a signal in which modulated signal S1(i) and modulated signal S2(i) are multiplexed. In contrast, modulated signal S2(i+1) whose reception quality is poor is replaced by modulated signal S1(i)' whose reception quality is poor, and demodulation is performed using the demodulation result of modulated signal S1(i) whose reception quality is good.

On the other hand, when the time i+1 reception quality is better, receiving apparatus 500 uses the signal obtained by demodulating modulated signal S1(i)' as the modulated signal A demodulation result. That is to say, the S1(i)' demodulation result is also used as the modulated signal S1(i) demodulation result. Then modulated signal S2(i+1) whose reception quality is good is demodulated by means of normal separation and modulation from a signal in which modulated signal S1(i)' and modulated signal S2(i+1) are multiplexed. In contrast, modulated signal S2(i) whose reception quality is poor is replaced by modulated signal S1(i) whose reception quality is poor, and demodulation is performed using the demodulation result of modulated signal S1(i)' whose reception quality is good.

By using the modulated signal A demodulation result of a time when demodulation precision is good in this way, the modulated signal A demodulation error rate performances can be improved, and by performing modulated signal B demodulation using the modulated signal A demodulation result of a time when demodulation precision is good, the modulated signal B demodulation error rate performances can also be improved.

The actual demodulation (decoding) procedure of receiving apparatus 500 is as follows.

<1> Time i detection is performed, and (S1(i), S2(i)) is obtained.

<2> Time i+1 detection is performed, and (S1(i)', S2(i+1)) is obtained.

<3> The time i and time i+1 reception qualities are compared.

If the time i reception quality is better, (S1(i), S2(i)) data obtained in time i detection is used directly. Then S2(i+1) data is obtained by estimating S1(i)' of time i+1 from S1(i) obtained in time i detection, and using that result.

On the other hand, if the time i+1 reception quality is better, (S1(i)', S2(i+1)) data obtained in time i+1 detection is used directly. Then S2(i) data is obtained by estimating S1(i) of time i from S1(i)' obtained in time i+1 detection, and using that result.

In receiving apparatus 500, modulated signal A received digital signal 524 and modulated signal B received digital signal 525 are obtained by performing this kind of demodulation processing in demodulation section 523.

This demodulation processing will now be described in greater detail. In the example in this embodiment, modulated signal A and modulated signal B are both QPSK modulated signals, and it is therefore possible to transmit a total of 4 bits—2 bits in modulated signal A and 2 bits in modulated signal B—at the same time. That is to say, it is possible to transmit 0000, 0001, . . . , 1111. It is assumed that the upper 2 bits are the 2 bits transmitted in modulated signal A, and the lower 2 bits are the 2 bits transmitted in modulated signal B.

The overall operation of demodulation section 523 will first be explained.

First, at time i, demodulation section 523 finds signal points (candidate signal points) in the 16 signal point (0000, 0001, . . . , 1111) I-Q plane using modulated signal A transmission path estimation signal 508 and modulated signal B transmission path estimation signal 510. The appearance of these signal points is shown by reference codes 1302 in FIG. 14. Also, demodulation section 523 has as input the signal of the signal point indicated by reference code 1301 in FIG. 14 as received quadrature baseband signal 506 from despreading section 505. Next, demodulation section 523 calculates, for example, the square of the distance from signal point 1301 in the I-Q plane for all the signal points indicated by reference code 1302 in FIG. 14. That is to say, the square of the distance between signal point 1302 of transmit bits 0000 and signal point 1301 (X0000(i)) is found, and in the same way the squares of the distances between signal points 1302 of transmit bits 0001, . . . , 1111 and signal point 1301 (X0001(i), . . . , X1111(i)) are found.

Similarly, at time i, demodulation section 523 finds signal points (candidate signal points) in the 16 signal point (0000, 0001, . . . , 1111) I-Q plane using modulated signal A transmission path estimation signal 518 and modulated signal B transmission path estimation signal 520. The appearance of these signal points is shown by reference codes 1302 in FIG. 14. Also, demodulation section 523 inputs the signal of the signal point indicated by reference code 1301 in FIG. 14 as received quadrature baseband signal 516 from despreading section 515. Next, demodulation section 523 calculates the square of the distance from signal point 1301 in the I-Q plane for all the signal points indicated by reference code 1302 in FIG. 14. That is to say, the square of the distance between signal point 1302 of transmit bits 0000 and signal point 1301 (Y0000(i)) is found, and in the same way the squares of the distances between signal points 1302 of transmit bits 0001, . . . , 1111 and signal point 1301 (Y0001(i), . . . , Y1111(i)) are found.

Demodulation section 523 then finds the sum of X0000(i) and Y0000(i), Z0000(i)=X0000(i)+Y0000(i), and similarly finds Z0001(i), . . . , Z1111(i). In the same way, demodulation section 523 finds Z0000(i+1), Z0001(i+1), . . . , Z1111(i+1) for time i+1. Next, demodulation section 523 compares the likelihoods of time i and time i+1 receive data.

For example, demodulation section 523 searches for the smallest value among Z0000(i), Z0001(i), . . . , Z1111(i). Let that value be designated F(i). Then demodulation section 523 searches for the second-smallest value. Let that value be designated S(i).

Similarly, demodulation section 523 searches for the smallest value among Z0000(i+1), Z0001(i+1), . . . , Z1111 (i+1). Let that value be designated F(i+1). Then demodulation section 523 searches for the second-smallest value. Let that value be designated S(i+1).

Then, for example, demodulation section 523 finds R(i)= F(i)/S(i), and R(i+1)=F(i+1)/S(i+1).

When R(i+1)>R(i), demodulation section 523 determines that the time i reception quality is better, and determines that the 4 bits providing F(i) are correct data. Then, as the 2 bits transmitted in modulated signal A, the 2 bits obtained at time i are taken as time i and time i+1 receive data. For modulated signal B, as the 2 bits transmitted at time i, the 2 bits obtained at time i are taken directly as receive data, while the 2 bits transmitted at time i+1 are determined making use of the fact that the 2 bits transmitted in time i+1 modulated signal A have already been determined. For example, if the 2 bits transmitted in modulated signal A are 00, the 2 bits transmitted in modulated signal B at time i+1 are determined by searching for the item with the smallest value among Z0000(i+1), Z0001(i+1), Z0010(i+1), and Z0011(i+1). Similarly, if the 2 bits transmitted in modulated signal A are 01, the 2 bits transmitted in modulated signal B at time i+1 are determined by searching for the item with the smallest value among Z0100(i+1), Z0101(i+1), Z0110(i+1), and Z0111(i+1). The 2 bits transmitted in modulated signal B at time i+1 are also determined in the same way when the 2 bits transmitted in modulated signal A are 10 or 11.

When R(i)>R(i+1), demodulation section 523 determines that the time i+1 reception quality is better, and determines that the 4 bits providing F(i+1) are correct data. Then, as the 2 bits transmitted in modulated signal A, the 2 bits obtained at time i+1 are taken as time i and time i+1 receive data. For modulated signal B, as the 2 bits transmitted at time i+1, the 2 bits obtained at time i+1 are taken directly as receive data, while the 2 bits transmitted at time i are determined making use of the fact that the 2 bits transmitted in time i modulated signal A have already been determined. For example, if the 2 bits transmitted in modulated signal A are 00, the 2 bits transmitted in modulated signal B at time i are determined by searching for the item with the smallest value among Z0000(i), Z0001(i), Z0010(i), and Z0011(i). Similarly, if the 2 bits transmitted in modulated signal A are 01, the 2 bits transmitted in modulated signal B at time i are determined by searching for the item with the smallest value among Z0100(i), Z0101(i), Z0110(i), and Z0111(i). The 2 bits transmitted in modulated signal B at time i are also determined in the same way when the 2 bits transmitted in modulated signal A are 10 or 11.

The operation when demodulation section 523 is configured as shown in FIG. 7 and FIG. 8 will now be explained.

When demodulation section 523 is configured as shown in FIG. 7, as described above, of the data transmitted in modulated signal A at time i and time i+1, modulated signal A and B demodulation section 608 outputs data demodulated from the signal of the time with the better reception quality as modulated signal A received digital signal 524. Also, as described above, data transmitted in modulated signal B of a time of good reception quality is output as modulated signal B received digital signal 525-1.

As described above, modulated signal B demodulation section 610 has modulated signal A received digital signal 524 whose reception quality is good as input, uses this to obtain received digital signal 525-2 whose reception quality is good by demodulating modulated signal B of a time of poor reception quality, and outputs this received digital signal 525-2.

When demodulation section 523 is configured as shown in FIG. 8, as described above, of the data transmitted in modulated signal A at time i and time i+1, modulated signal A and B demodulation section 608 outputs data demodulated from the signal of a time of good reception quality as modulated signal A received digital signal 524. Also, modulated signal A and B demodulation section 608 outputs Z0000(i), . . . , Z1111(i) as first soft decision value signal 701, and outputs Z0000(i+1), . . . , Z1111(i+1) as second soft decision value signal 702. Furthermore, modulated signal A and B demodulation section 608 outputs received digital signal 525-1 of modulated signal B of either time i or time i+1.

Modulated signal B demodulation section 703 has Z0000(i), . . . , Z1111(i) comprising first soft decision value signal 701 and Z0000(i+1), . . . , Z1111(i+1) comprising second soft decision value signal 702 as input, and, as described above, by performing modulated signal B demodulation based on the time i and time i+1 reception qualities, obtains modulated signal B received digital signal 525-2 of a different time from modulated signal B from which received digital signal 525-1 was obtained, and outputs this received digital signal 525-2.

Thus, according to this embodiment, of modulated signals A and B transmitted from different antennas, modulated signal A is formed by modulating the same data a plurality of times while changing the signal point arrangement mode, and modulated signal B is formed not by modulating the same data a plurality of times while changing the signal point arrangement mode but by performing sequential modulation of time series data (that is, by executing normal modulation), thereby enabling the error rate performances of the data stream transmitted a plurality of times to be improved, and as a result, the error rate performances of both streams (the two streams) to be improved, while maintaining a higher data transmission speed than when space-time block coding is used.

Actually, on the receiving side, by taking the demodulation result of modulated signal A obtained based on a received signal of a time of good reception quality as the modulated signal A received digital signal, and obtaining the received digital signal of modulated signal B received at a time of poor reception quality from a received signal of that time of poor reception quality using the already determined modulated signal A received digital signal of a time of good reception quality, the error rate performances of modulated signal B received at a time of poor reception quality can also be improved.

Furthermore, when QPSK is used as the modulation method, if QPSK modulated signals that have a mutual 45o phase difference are formed from the same data for modulated signal A and transmitted, it is possible to obtain a state in which the minimum Euclidian distance is large at time i and time i+1, enabling error rate performances to be significantly improved.

(1-1) Variant Example 1

Figure 9:
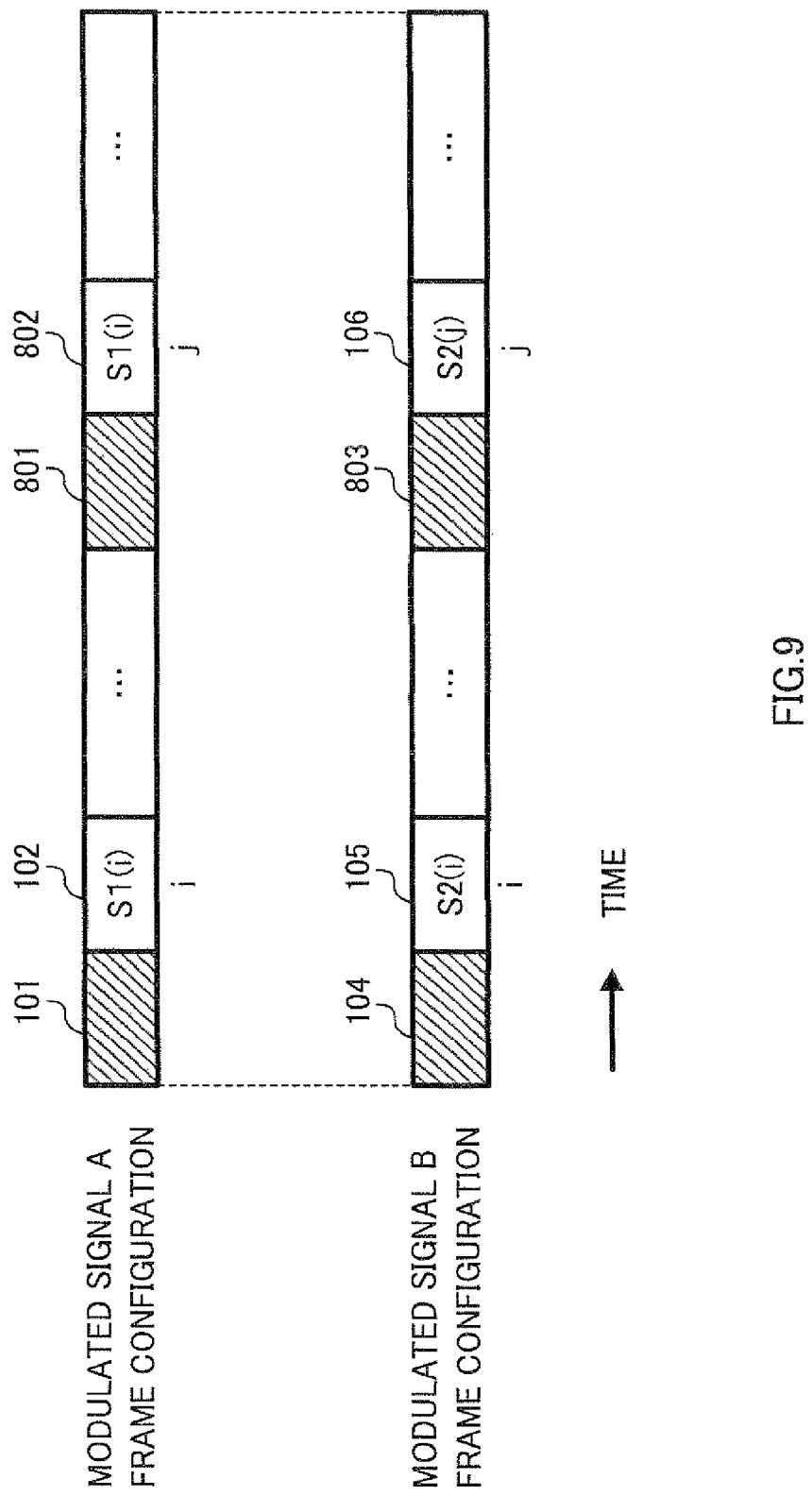
FIG. 9 is a drawing showing sample frame configurations according to Embodiment 1.

In the above example, a case has been described in which the frame configurations transmitted by transmitting apparatus 300 are as shown in FIG. 2A, but the transmitted frame configurations may also be as shown in FIG. 9. The difference between the frame configurations in FIG. 9 and the frame configurations in FIG. 2A is that the time difference in transmitting signal S1(i) in which the same data is modulated in modulated signal A is made small in the case of FIG. 2A, but is made very large in FIG. 9.

Consequently, the radio wave propagation environment is totally different at time i and time j. Considering this, in the case of FIG. 9, the signal point arrangement of modulated signal A transmitted at time j is made the same as the signal point arrangement of modulated signal A transmitted at time i. This is because it was considered that, even if the signal point arrangement of modulated signal A is not intentionally varied, the time i and time j reception qualities will differ to some extent due to differences in the radio wave propagation environment.

As a result, if the demodulation result of modulated signal A obtained based on a received signal of a time of good reception quality is taken as the modulated signal A received digital signal, and the received digital signal of modulated signal B received at a time of poor reception quality from a received signal of that time of poor reception quality is obtained using the already determined modulated signal A received digital signal of a time of good reception quality, the error rate performances of modulated signal B received at a time of poor reception quality can also be improved in the same way as when signals with the frame configurations shown in FIG. 2A are transmitted.

This will now be explained in specific terms. Equation (1) given above holds true at time i. Similarly, the relationship in the following equation holds true at time j.

$$\begin{pmatrix} R1(j) \\ R2(j) \end{pmatrix} = \begin{pmatrix} h11(j) & h12(j) \\ h21(j) & h22(j) \end{pmatrix} \begin{pmatrix} S1(j) \\ S2(j) \end{pmatrix} \quad (3)$$

In receiving apparatus 500, h11(j), h12(j), h21(j), and h22(j) in equation (3) are estimated using, for example, radio wave propagation environment estimation symbols 801 and 803 in FIG. 9. Here, since the radio wave propagation environment differs for time i and time j, h11(i)≠h11(j), h12(i)≠h12(j), h21(i)≠h21(j), and h22(i)≠h22(j). Therefore, time i and time j reception qualities are totally different.

A description will now be given of signal point arrangements in the I-Q plane for time i and time j taking the above into consideration.

Examples of modulated signal A signal point arrangements in the I-Q plane are shown in FIG. 3A through FIG. 3C. When the frame configurations shown in FIG. 9 are used, the time i and time j signal point arrangements may both be as shown in FIG. 3A, or may differ, with the time i signal point arrangement as shown in FIG. 3A and the time j signal point arrangement as shown in FIG. 3B. This is because, unlike in the case of the frame configurations in FIG. 2A, the radio wave propagation environment differs for time i and time j, and therefore even if the signal point arrangement is not intentionally varied at time i and time j, the reception quality is different for time i and time j.

The decoding procedure is described in detail below. This can be considered as similar to the operation in the case of the frame configurations in FIG. 2A. That is to say, time i+1 operations can be thought of as being replaced by time j operations.

<1> Time i detection is performed, and (S1(i), S2(i)) is obtained.
<2> Time j detection is performed, and (S1(i), S2(j)) is obtained.
<3> The time i and time j reception qualities are compared.

If the time i reception quality is better, (S1(i), S2(i)) data obtained in time i detection is used directly. Then S2(j) data is obtained by estimating S1(i) of time j from S1(i) obtained in time i detection, and using that result. On the other hand, if the time j reception quality is better, (S1(i), S2(j)) data obtained in time j detection is used directly. Then S2(i) data is obtained by estimating S1(i) of time i from S1(i) obtained in time j detection, and using that result.

In receiving apparatus 500, modulated signal A received digital signal 524 and modulated signal B received digital signal 525 are obtained by performing this kind of demodulation processing in demodulation section 523.

A description of the detailed operation of demodulation section 523 when transmit signals with the frame configurations in FIG. 9 are received will be omitted, as it is the same as described above with "time j" substituted for "time i+1" operations. However, a difference in above time i+1 and time j processing is that, whereas for time i+1, time i+1 data likelihood is determined based on signal points (candidate signal points) obtained using radio wave propagation environment estimation symbols 101 and 104 in FIG. 2A, for time j, time j data likelihood is determined based on signal points (candidate signal points) obtained using radio wave propagation environment estimation symbols 801 and 803 in FIG. 9.

(1-2) Variant Example 2

Figure 10A:
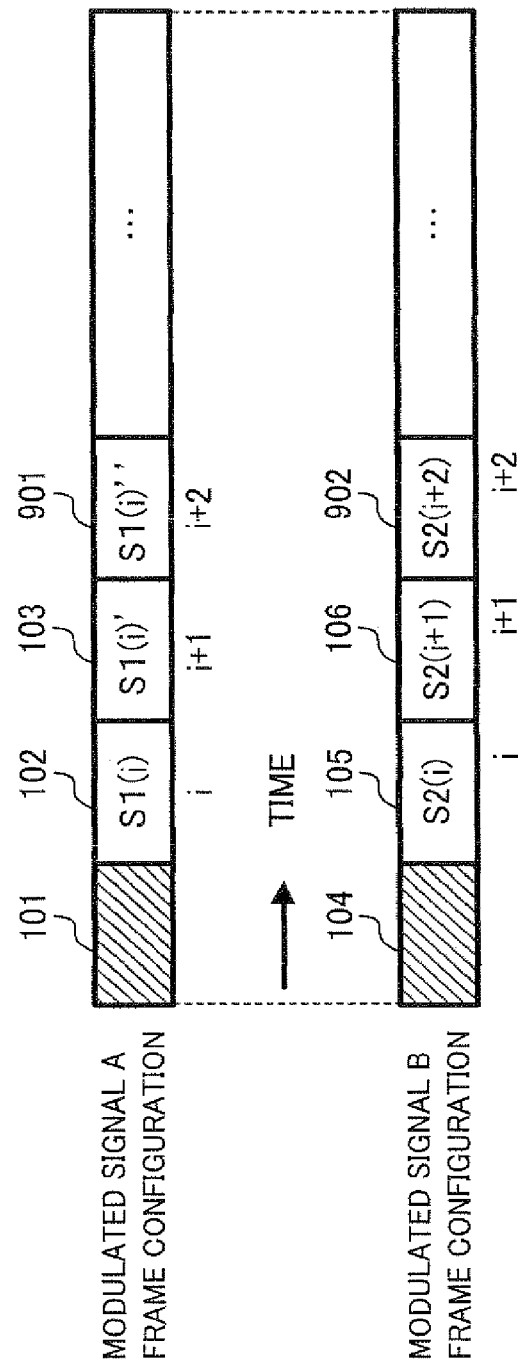
FIG. 10A and FIG. 10B are drawings showing sample frame configurations according to Embodiment 1.
Figure 10B:
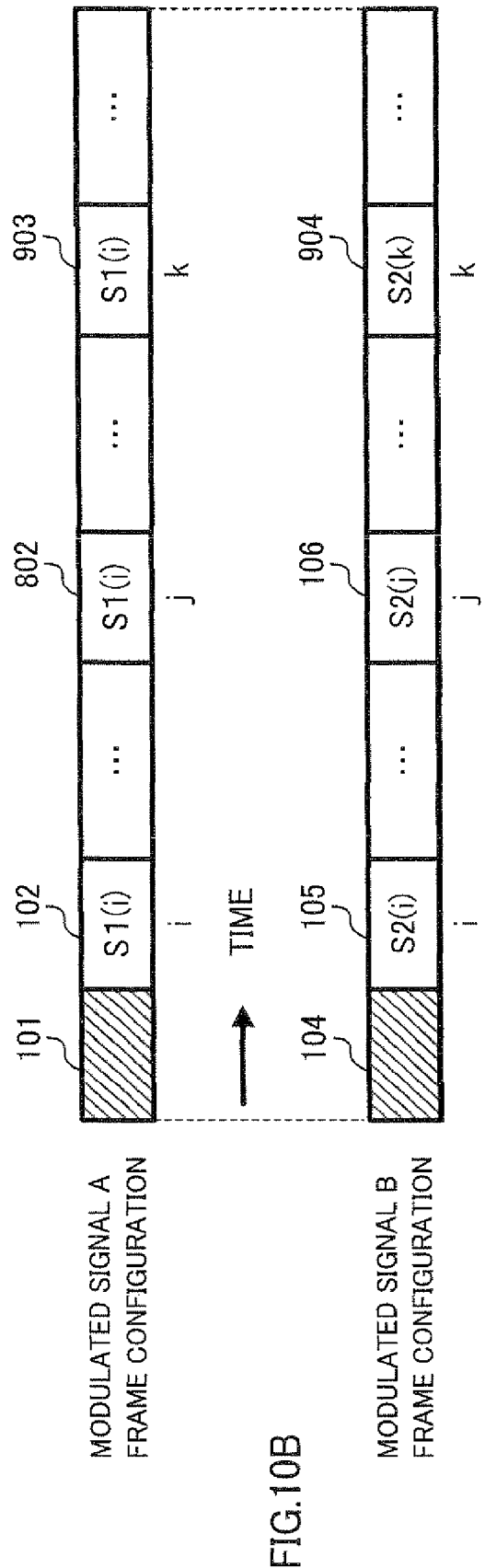

Here, frame configurations transmitted by transmitting apparatus 300 will be described for cases as shown in FIG. 10A and FIG. 10B.

With regard to the frame configurations shown in FIG. 10A, whereas with the frame configurations in FIG. 2A the same data is transmitted twice in succession in modulated signal A, changing the signal point arrangement mode, in the case of the frame configurations in FIG. 10A the same data is transmitted three times in succession in modulated signal A, changing the signal point arrangement mode.

Also, with regard to the frame configurations shown in FIG. 10B, whereas with the frame configurations in FIG. 9 the same data is transmitted twice in succession in modulated signal A at separated times without changing the signal point arrangement mode, in the case of the frame configurations in FIG. 10B the same data is transmitted three times in succession in modulated signal A at separated times without changing the signal point arrangement mode.

First, a case in which the frame configurations in FIG. 10A are used will be described.

The situation regarding the time i and time i+1 states is the same as in the description relating to the frame configurations in FIG. 2A. The relationship in the following equation holds true at time i+2.

$$\begin{pmatrix} R1(i+2) \\ R2(i+2) \end{pmatrix} = \begin{pmatrix} h11(i+2) & h12(i+2) \\ h21(i+2) & h22(i+2) \end{pmatrix} \begin{pmatrix} S1(i)'' \\ S2(i+2) \end{pmatrix} \quad (4)$$

As the time from time i to time i+2 is short, h11(i) ≈ h11(i+1) ≈ h11(i+2), h12(i) ≈ h12(i+1) ≈ h12(i+2), h21(i)≈h21(i+1)≈h21(i+2), and h22(i) ≈ h22(i+1) ≈ h22(i+2).

S1(i) and S2(i) can be obtained from the relationship in equation (1), S1(i)' and S2(i+1) can be obtained from the relationship in equation (2), and S1(i)" and S2(i+2) can be obtained from the relationship in equation (4). At this time, the matrices of equation (1), equation (2), and equation (4) are almost equal matrices, but since the S1(i), S1(i)', and S1(i)" signal points are changed, the (S1(i), S2(i)), (S1(i)', S2(i+1)), and (S1(i)", S2(i+2)) vectors are different, and therefore the likelihoods of the data obtained in each of times i through i+2 are different. At this time, for example, the signal point arrangement in FIG. 11A may be used for S1(i) of time i, the signal point arrangement in FIG. 11B for S1(i)' of time i+1, and the signal point arrangement in FIG. 11C for S1(i)" of time i+2. By making the signal point arrangement modes for modulated signals S1(i), S1(i)', and S1(i)" with identical data different in this way, the likelihoods of data obtained in each of times i through i+2 can be changed efficiently.

Transmit signals with the frame configurations in FIG. 10A can be formed by transmitting apparatus 300 with the configuration shown in FIG. 4. Modulation section 304 need only have a configuration in which a mapping section Z (not shown) is added to the configuration of modulation section 304 in FIG. 5. Time i+2 mapping can then be performed by the added mapping section Z.

The actual demodulation (decoding) procedure of receiving apparatus 500 when signals with the frame configurations in FIG. 10A are received is as follows.

<1> Time i detection is performed, and (S1(i), S2(i)) is obtained.
<2> Time i+1 detection is performed, and (S1(i)', S2(i+1)) is obtained.
<3> Time i+2 detection is performed, and (S1(i)", S2(i+2)) is obtained.
<4> The time i, time i+1, and time i+2 reception qualities are compared.

If, among time i, time i+1, and time i+2, the time i reception quality is the best, (S1(i), S2(i)) data obtained in time i detection is used directly. Then S2(i+1) data is obtained by estimating S1(i)' of time i+1 from S1(i) obtained in time i detection, and using that result. Also, S2(i+2) data is obtained by estimating S1(i)" of time i+2 from S1(i) obtained in time i detection, and using that result.

If the time i+1 reception quality is the best, (S1(i)', S2(i+1)) data obtained in time i+1 detection is used directly. Then S2(i) data is obtained by estimating S1(i) of time i from S1(i)' obtained in time i+1 detection, and using that result. Also, S2(i+2) data is obtained by estimating S1(i)" of time i+2 from S1(i)' obtained in time i+1 detection, and using that result.

If the time i+2 reception quality is the best, (S1(i)", S2(i+2)) data obtained in time i+2 detection is used directly. Then S2(i) data is obtained by estimating S1(i) of time i from S1(i)" obtained in time i+2 detection, and using that result. Also, S2(i+1) data is obtained by estimating S1(i)' of time i+1 from S1(i)" obtained in time i+2 detection, and using that result.

In receiving apparatus 500, modulated signal A received digital signal 524 and modulated signal B received digital signal 525 are obtained by performing this kind of demodulation processing in demodulation section 523.

This demodulation processing will now be described in greater detail. When modulated signal A and modulated signal B are both QPSK modulated signals, it is possible to transmit a total of 4 bits—2 bits in modulated signal A and 2 bits in modulated signal B—at the same time. That is to say, it is possible to transmit 0000, 0001, . . . , 1111. It is assumed that the upper 2 bits are the 2 bits transmitted in modulated signal A, and the lower 2 bits are the 2 bits transmitted in modulated signal B.

The overall operation of demodulation section 523 will first be explained.

First, at time i in FIG. 10A, demodulation section 523 finds signal points (candidate signal points) in the 16 signal point (0000, 0001, . . . , 1111) I-Q plane using modulated signal A transmission path estimation signal 508 and modulated signal B transmission path estimation signal 510. The appearance of these signal points is shown by reference codes 1302 in FIG. 14. Also, demodulation section 523 has as input the signal of the signal point indicated by reference code 1301 in FIG. 14 as received quadrature baseband signal 506 from despreading section 505. Next, demodulation section 523 calculates, for example, the square of the distance from signal point 1301 in the I-Q plane for all the signal points indicated by reference code 1302 in FIG. 14. That is to say, the square of the distance between signal point 1302 of transmit bits 0000 and signal point 1301 (X0000(i)) is found, and in the same way the squares of the distances between signal points 1302 of transmit bits 0001, . . . , 1111 and signal point 1301 (X0001(i), . . . , X1111(i)) are found.

Similarly, at time i in FIG. 10A, demodulation section 523 finds signal points (candidate signal points) in the 16 signal point (0000, 0001, . . . , 1111) I-Q plane using modulated signal A transmission path estimation signal 518 and modulated signal B transmission path estimation signal 520. The appearance of these signal points is shown by reference codes 1302 in FIG. 14. Also, demodulation section 523 has as input the signal of the signal point indicated by reference code 1301 in FIG. 14 as received quadrature baseband signal 516 from despreading section 515. Next, demodulation section 523 calculates the square of the distance from signal point 1301 in the I-Q plane for all the signal points indicated by reference code 1302 in FIG. 14. That is to say, the square of the distance between signal point 1302 of transmit bits 0000 and signal point 1301 (Y0000(i)) is found, and in the same way the squares of the distances between signal points 1302 of transmit bits 0001, . . . , 1111 and signal point 1301 (Y0001(i), . . . , Y1111(i)) are found.

Demodulation section 523 then finds the sum of X0000(i) and Y0000(i), Z0000(i)=X0000(i)+Y0000(i), and similarly finds Z0001(i), . . . , Z1111(i). In the same way, demodulation section 523 finds Z0000(i+1), Z0001(i+1), . . . , Z1111(i+1) for time i+1, and finds Z0000(i+2), Z0001(i+2), . . . , Z1111(i+2) for time i+2.

Next, demodulation section 523 compares the likelihoods of time i, time i+1, and time i+2 receive data.

For example, demodulation section 523 searches for the smallest value among Z0000(i), Z0001(i), Z . . . , 1111(i). Let that value be designated F(i). Then demodulation section 523 searches for the second-smallest value. Let that value be designated S(i).

Similarly, demodulation section 523 searches for the smallest value among Z0000(i+1), Z0001(i+1), . . . , Z1111(i+1). Let that value be designated F(i+1). Then demodulation section 523 searches for the second-smallest value. Let that value be designated S(i+1).

Similarly, demodulation section 523 searches for the smallest value among Z0000(i+2), Z0001(i+2), . . . , Z1111(i+2). Let that value be designated F(i+2). Then demodulation section 523 searches for the second-smallest value. Let that value be designated S(i+2).

Then, for example, demodulation section 523 finds R(i)=F(i)/S(i), R(i+1)=F(i+1)/S(i+1), and R(i+2)=F(i+2)/S(i+2). The time i, time i+1, and time i+2 reception qualities are estimated using the above values. If the time i reception quality is determined to be the best, as the 2 bits transmitted in modulated signal A, the 2 bits obtained at time i are taken as time i, time i+1, and time i+2 receive data. For modulated signal B, as the 2 bits transmitted at time i, the 2 bits obtained at time i are taken directly as receive data, while the 2 bits transmitted at times i+1 and i+2 are determined making use of the fact that the 2 bits transmitted in time i+1 and i+2 modulated signal A have already been determined. If the time i+1 reception quality is determined to be the best, as the 2 bits transmitted in modulated signal A, the 2 bits obtained at time i+1 are taken as time i, time i+1, and time i+2 receive data. For modulated signal B, as the 2 bits transmitted at time i+1, the 2 bits obtained at time i+1 are taken directly as receive data, while the 2 bits transmitted at times i and i+2 are determined making use of the fact that the 2 bits transmitted in time i and i+2 modulated signal A have already been determined.

If the time i+2 reception quality is determined to be the best, as the 2 bits transmitted in modulated signal A, the 2 bits obtained at time i+2 are taken as time i, time i+1, and time i+2 receive data. For modulated signal B, as the 2 bits transmitted at time i+2, the 2 bits obtained at time i+2 are taken directly as receive data, while the 2 bits transmitted at times i and i+1 are determined making use of the fact that the 2 bits transmitted in time i and i+1 modulated signal A have already been determined.

Figure 12:
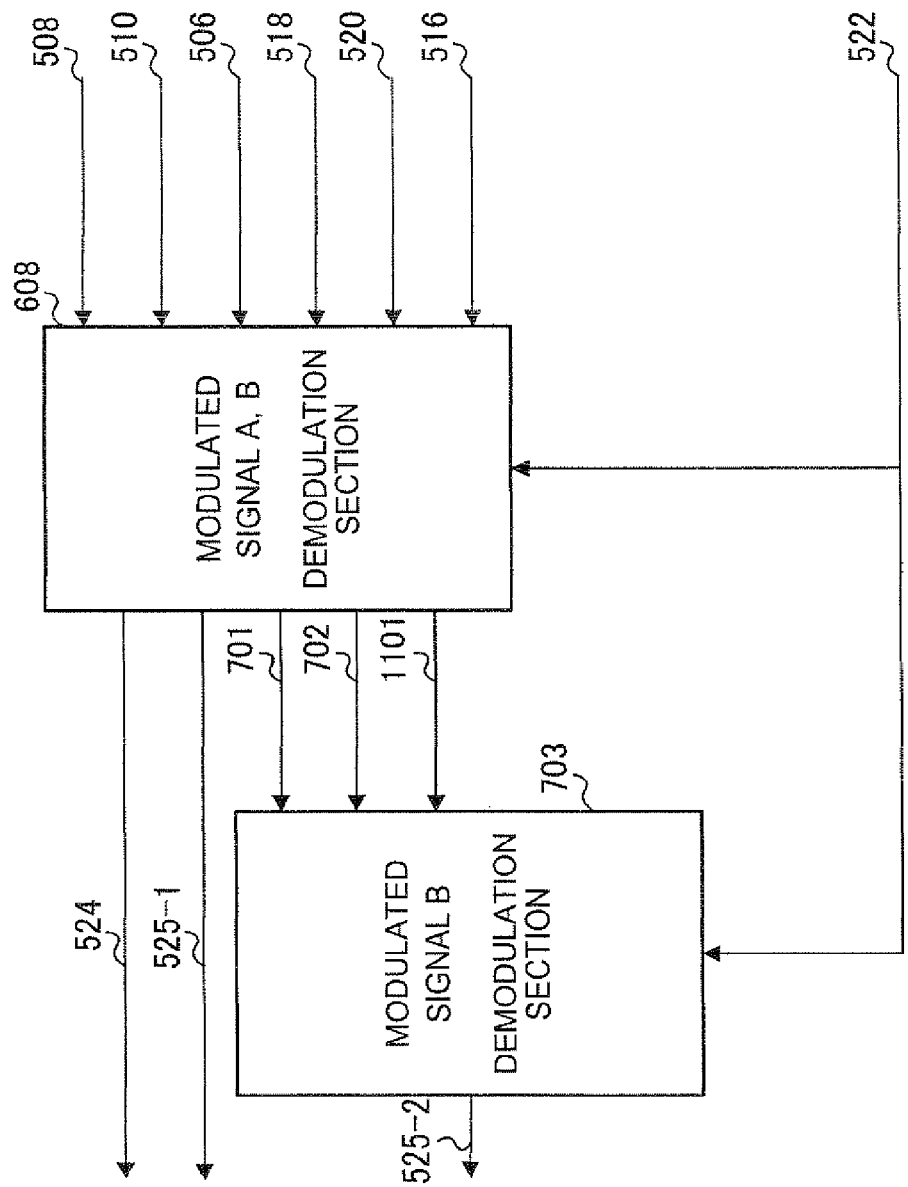
FIG. 12 is a drawing showing a sample configuration of a demodulation section according to Embodiment 1.

An example of the detailed configuration of demodulation section 523 for performing this kind of processing is shown in FIG. 12. As described above, of the data transmitted in modulated signal A at time i, time i+1, and time i+2, modulated signal A and B demodulation section 608 outputs data demodulated from the signal of the time with the best reception quality as modulated signal A received digital signal 524. Also, modulated signal A and B demodulation section 608 outputs Z0000(i), . . . , Z1111(i) as first soft decision value signal 701, Z0000(i+1), . . . , Z1111(i+1) as second soft decision value signal 702, and Z0000(i+2), . . . , Z1111(i+2) as a third soft decision value signal 1101. Furthermore, modulated signal A and B demodulation section 608 outputs received digital signal 525-1 of modulated signal B of one of time i, time i+1, or time i+2.

Modulated signal B demodulation section 703 has Z0000 (i), . . . , Z1111(i) comprising first soft decision value signal 701, Z0000(i+1), . . . , Z1111(i+1) comprising second soft decision value signal 702, and Z0000(i+2), . . . , Z1111(i+2) comprising third soft decision value signal 1101, as input, and, as described above, by performing modulated signal B demodulation based on the time i, time i+1, and time i+2 reception qualities, obtains modulated signal B received digital signal 525-2 of a different time from modulated signal B from which received digital signal 525-1 was obtained, and outputs this received digital signal 525-2.

When frame configurations such as shown in FIG. 10A are used in this way, a time in which reception quality is best can be selected from among more times than when frame configurations such as shown in FIG. 2A are used, enabling modulated signal A and B demodulated data with significantly better error rate performances to be obtained.

A case has been described here in which, as shown in FIG. 10A, the same data is transmitted by three consecutive symbols, S1(i), S1(i)', and S1(i)", changing the signal point arrangement, but this is not a limitation, and essentially it is only necessary that, when a modulated signal with the same data is transmitted a plurality of times at short time intervals, the reception quality of each time be varied by changing the signal point arrangement of modulated signals with the same data. That is to say, modulated signals transmitted at times i, i+1, and i+2 may be transmitted at times i, i+n, and i+m. At this time, it is effective if the following relationships hold true: h11(i) ≠ h11(i+n) ≠ h11(i+m), h12(i) ≠ h12 (i+n) ≠ h12(i+m), h21(i) ≠ h21(i+n) ≠ h21(i+m), and h22(i) ≠ h22(i+n) ≠ h22(i+m). In this case, operations can be executed in the same way as described above, considering an above-described time i+1 operation as a time i+n operation, and an above-described time i+2 operation as a time i+m operation.

Next, a case in which the frame configurations in FIG. 10B are used will be described.

As stated above, with regard to the frame configurations shown in FIG. 10B, whereas with the frame configurations in FIG. 9 the same data is transmitted twice in succession in modulated signal A at separated times without changing the signal point arrangement, in the case of the frame configurations in FIG. 10B the same data is transmitted three times in succession in modulated signal A at separated times without changing the signal point arrangement.

The situation regarding the time i and j states is the same as in the description relating to the frame configurations in FIG. 9. The relationship in the following equation holds true at time k.

$$\begin{pmatrix} R1(k) \\ R2(k) \end{pmatrix} = \begin{pmatrix} h11(k) & h12(k) \\ h21(k) & h22(k) \end{pmatrix} \begin{pmatrix} S1(i)'' \\ S2(k) \end{pmatrix} \quad (5)$$

Here, times i, j, and k are times for which the radio wave propagation environment differs, and therefore h11(i)≠h11 (j)≠h11(k), h12(i)≠h12(j)≠h12(k), h21(i)≠h21(j)≠h21(k), and h22(i)≠h22(j)≠h22(k). Therefore, times i, j, and k reception qualities are totally different. Considering this, in the case of FIG. 10B, the signal point arrangement of modulated signal A transmitted at time j and time k is made the same as the signal point arrangement of modulated signal A transmitted at time i. This is because it was considered that, even if the signal point arrangement of modulated signal A is not intentionally varied, the time i, time j, and time k reception qualities will differ to some extent due to differences in the radio wave propagation environment.

Examples of modulated signal A signal point arrangements in the I-Q plane are shown in FIG. 11A through FIG. 11C. When the frame configurations shown in FIG. 10B are used, the times i, j, and k signal point arrangements may all be as shown in FIG. 11A, or may differ, with the time i signal point arrangement as shown in FIG. 11A, the time j signal point arrangement as shown in FIG. 11B, and the time k signal point arrangement as shown in FIG. 11C. This is because the radio wave propagation environment differs for times i, j, and k, and therefore even if the signal point arrangement is not intentionally varied in each time, the reception quality is different for each time.

The actual demodulation (decoding) procedure of receiving apparatus 500 when signals with the frame configurations in FIG. 10B are received is as follows.

<1> Time i detection is performed, and (S1(i), S2(i)) is obtained.

<2> Time j detection is performed, and (S1(i), S2(j)) is obtained.

<3> Time k detection is performed, and (S1(i), S2(k)) is obtained.

<4> The time i, time j, and time k reception qualities are compared.

If, among time i, time j, and time k, the time i reception quality is the best, (S1(i), S2(i)) data obtained in time i detection is used directly. Then S2(j) data is obtained by estimating S1(i) of time j from S1(i) obtained in time i detection, and using that result. Also, S2(k) data is obtained by estimating S1(i) of time k from S1(i) obtained in time i detection, and using that result.

If the time j reception quality is the best, (S1(i), S2(j)) data obtained in time j detection is used directly. Then S2(i) data is obtained by estimating S1(i) of time i from S1(i) obtained in time j detection, and using that result. Also, S2(k) data is obtained by estimating S1(i) of time k from S1(i) obtained in time j detection, and using that result.

If the time k reception quality is the best, (S1(i), S2(k)) data obtained in time k detection is used directly. Then S2(i) data is obtained by estimating S1(i) of time i from S1(i) obtained in time k detection, and using that result. Also, S2(j) data is obtained by estimating S1(i) of time j from S1(i) obtained in time k detection, and using that result.

In receiving apparatus 500, modulated signal A received digital signal 524 and modulated signal B received digital signal 525 are obtained by performing this kind of demodulation processing in demodulation section 523.

This demodulation processing will now be described in greater detail.

When modulated signal A and modulated signal B are both QPSK modulated signals, it is possible to transmit a total of 4 bits—2 bits in modulated signal A and 2 bits in modulated signal B—at the same time. That is to say, it is possible to transmit 0000, 0001, . . . , 1111. It is assumed that the upper 2 bits are the 2 bits transmitted in modulated signal A, and the lower 2 bits are the 2 bits transmitted in modulated signal B.

The overall operation of demodulation section 523 will first be explained.

First, at time i in FIG. 10B, demodulation section 523 finds signal points (candidate signal points) in the 16 signal point (0000, 0001, . . . , 1111) I-Q plane using modulated signal A transmission path estimation signal 508 and modulated signal B transmission path estimation signal 510. The appearance of these signal points is shown by reference codes 1302 in FIG. 14. Also, demodulation section 523 has as input the signal of the signal point indicated by reference code 1301 in FIG. 14 as received quadrature baseband signal 506 from despreading section 505. Next, demodulation section 523 calculates, for example, the square of the distance from signal point 1301 in the I-Q plane for all the signal points indicated by reference code 1302 in FIG. 14. That is to say, the square of the distance between signal point 1302 of transmit bits 0000 and signal point 1301 (X0000(i)) is found, and in the same way the squares of the distances between signal points 1302 of transmit bits 0001, . . . , 1111 and signal point 1301 (X0001(i), . . . , X1111(i)) are found.

Similarly, at time i in FIG. 10B, demodulation section 523 finds signal points (candidate signal points) in the 16 signal point (0000, 0001, . . . , 1111) I-Q plane using modulated signal A transmission path estimation signal 518 and modulated signal B transmission path estimation signal 520. The appearance of these signal points is shown by reference codes 1302 in FIG. 14. Also, demodulation section 523 has as input the signal of the signal point indicated by reference code 1301 in FIG. 14 as received quadrature baseband signal 516 from despreading section 515. Next, demodulation section 523 calculates the square of the distance from signal point 1301 in the I-Q plane for all the signal points indicated by reference code 1302 in FIG. 14. That is to say, the square of the distance between signal point 1302 of transmit bits 0000 and signal point 1301 (Y0000(i)) is found, and in the same way the squares of the distances between signal points 1302 of transmit bits 0001, . . . , 1111 and signal point 1301 (Y0001(i), Y1111(i)) are found.

Demodulation section 523 then finds the sum of X0000(i) and Y0000(i), Z0000(i)=X0000(i)+Y0000(i), and similarly finds Z0001(i), . . . , Z1111(i). In the same way, demodulation section 523 finds Z0000(j), Z0001(j), . . . , Z1111(j) for time j, and finds Z0000(k), Z0001(k), . . . , Z1111(k) for time k.

Next, demodulation section 523 compares the likelihoods of time i, time j, and time k receive data.

For example, demodulation section 523 searches for the smallest value among Z0000(i), Z0001(i), . . . , Z1111(i). Let that value be designated F(i). Then demodulation section 523 searches for the second-smallest value. Let that value be designated S(i).

Similarly, demodulation section 523 searches for the smallest value among Z0000(j), Z0001(j), . . . , Z1111(j). Let that value be designated F(j). Then demodulation section 523 searches for the second-smallest value. Let that value be designated S(j).

Similarly, demodulation section 523 searches for the smallest value among Z0000(k), Z0001(k), . . . , Z1111(k). Let that value be designated F(k). Then demodulation section 523 searches for the second-smallest value. Let that value be designated S(k).

Then, for example, demodulation section 523 finds R(i)=F(i)/S(i), R(j)=F(j)/S(j), and R(k)=F(k)/S(k). The time i, time j, and time k reception qualities are estimated using the above values.

If the time i reception quality is determined to be the best, as the 2 bits transmitted in modulated signal A, the 2 bits obtained at time i are taken as time i, time j, and time k receive data. For modulated signal B, as the 2 bits transmitted at time i, the 2 bits obtained at time i are taken directly as receive data, while the 2 bits transmitted at times j and k are determined making use of the fact that the 2 bits transmitted at time j and k modulated signal A have already been determined.

If the time j reception quality is determined to be the best, as the 2 bits transmitted in modulated signal A, the 2 bits obtained at time j are taken as time i, time j, and time k receive data. For modulated signal B, as the 2 bits transmitted at time j, the 2 bits obtained at time j are taken directly as receive data, while the 2 bits transmitted at times i and k are determined making use of the fact that the 2 bits transmitted at time i and k modulated signal A have already been determined.

If the time k reception quality is determined to be the best, as the 2 bits transmitted in modulated signal A, the 2 bits obtained at time k are taken as time i, time j, and time k receive data. For modulated signal B, as the 2 bits transmitted at time k, the 2 bits obtained at time k are taken directly as receive data, while the 2 bits transmitted at times i and j are determined making use of the fact that the 2 bits transmitted at time i and j modulated signal A have already been determined.

An example of the detailed configuration of demodulation section 523 for performing this kind of processing is shown in FIG. 12. As described above, of the data transmitted in modulated signal A at time i, time j, and time k, modulated signal A and B demodulation section 608 outputs data demodulated from the signal of the time with the best reception quality as modulated signal A received digital signal 524. Also, modulated signal A and B demodulation section 608 outputs Z0000(i), . . . , Z1111(i) as first soft decision value signal 701, Z0000(j), . . . , Z1111(j) as second soft decision value signal 702, and Z0000(k), . . . , Z1111(k) as third soft decision value signal 1101. Furthermore, modulated signal A and B demodulation section 608 outputs received digital signal 525-1 of modulated signal B of one of time i, time j, or time k.

Modulated signal B demodulation section 703 has Z0000 (i), . . . , Z1111(i) comprising first soft decision value signal 701, Z0000(j), . . . , Z1111(j) comprising second soft decision value signal 702, and Z0000(k), . . . , Z1111(k) comprising third soft decision value signal 1101, as input, and, as described above, by performing modulated signal B demodulation based on the time i, time j, and time k reception qualities, obtains modulated signal B received digital signal 525-2 of a different time from modulated signal B from which received digital signal 525-1 was obtained, and outputs this received digital signal 525-2.

When frame configurations such as shown in FIG. 10B are used in this way, a time in which reception quality is best can be selected from among more times than when frame configurations such as shown in FIG. 9 are used, enabling modulated signal A and B demodulated data with significantly better error rate performances to be obtained.

(1-3) Variant Example 3

Figure 13:
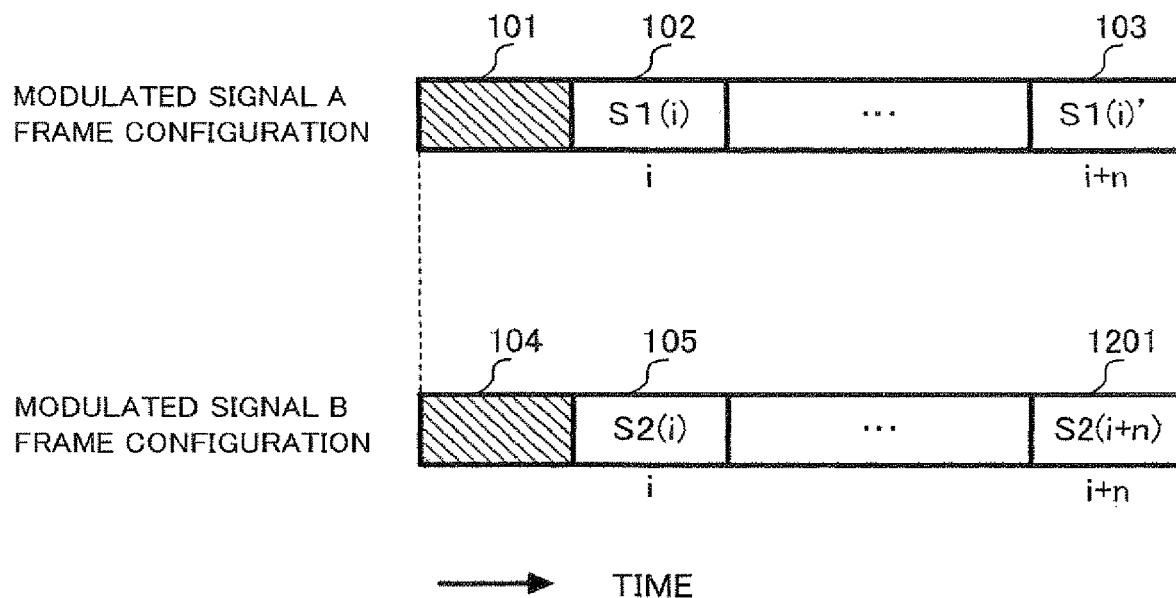
FIG. 13 is a drawing showing sample frame configurations of modulated signals according to Embodiment 1.

Here, an example will be described in which the frame configurations transmitted by transmitting apparatus 300 are as shown in FIG. 13 instead of FIG. 2A.

The difference between the frame configurations in FIG. 13 and the frame configurations in FIG. 2A is that the time difference in transmitting signal S1(i) and S1(i)' in which the same data is modulated in modulated signal A is "1" in the case of FIG. 2A, but is "n" in FIG. 13.

Here, if n is such that the relationships h11(i)≈ h11(i+n), h12(i)≈ h12(i+n), h21(i)≈ h21(i+n), and h22(i)≈ h22(i+n) hold true, operations can be executed in the same way as when signals with the frame configurations in FIG. 2A are transmitted. That is to say, operations can be executed in the same way, considering an above-described time i+1 operation as a time i+n operation.

(1-4) Variant Example 4

Here, it is proposed that the transmission power of modulated signal A or the transmission power of modulated signal B be made to differ between time i and time i+1. By so doing, the reception quality can be changed for time i and time i+1, in the same way as when the modulated signal A signal point arrangement pattern is changed for time i and time i+1 as described above, enabling the same kind of effect to be obtained as when the above-described frame configurations are used. Furthermore, when the above-described frame configurations are combined, the difference in reception quality of each time can be made significantly greater. That is to say, changing the signal point arrangement mode is taken to include changing the transmission power.

Specifically, modulated signals S1(i) and S2(i) for which equation (1) holds true are transmitted at time i, and modulated signals rS1(i)' and S2(i+1) or modulated signals S1(i)' and rS2(i+1) for which equation (6) or equation (7) below holds true are transmitted at time i+1.

$$\begin{pmatrix} R1(i+1) \\ R2(i+1) \end{pmatrix} = \begin{pmatrix} h11(i+1) & h12(i+1) \\ h21(i+1) & h22(i+1) \end{pmatrix} \begin{pmatrix} rS1(i)' \\ S2(i+1) \end{pmatrix} \quad (6)$$

$$\begin{pmatrix} R1(i+1) \\ R2(i+1) \end{pmatrix} = \begin{pmatrix} h11(i+1) & h12(i+1) \\ h21(i+1) & h22(i+1) \end{pmatrix} \begin{pmatrix} S1(i)' \\ rS2(i+1) \end{pmatrix} \quad (7)$$

The difference between equation (6) and equation (7) lies in whether the transmission power of modulated signal A (S1) is changed or the transmission power of modulated signal B (S2) is changed. Changing the reception quality by changing the transmission power in this way can be implemented in combination with the embodiment below.

(1-5) Variant Example 5

The configuration of the transmitting apparatus is not limited to the configuration in FIG. 4, and the configuration of modulation section 304 is not limited to the configuration in FIG. 5. The essential elements are that a first modulation section and second modulation section is provided, a first modulated signal is formed by the first modulation section by modulating the same data of first transmit data a plurality of times while changing the signal point arrangement mode or leaving a time interval of a plurality of symbols, a second modulated signal is formed by time series modulation of second transmit data, and these first and second modulated signals are transmitted from different antennas.

The configuration of the receiving apparatus is not limited to the configuration in FIG. 6, and configurations of demodulation section 523 are not limited to the configurations in FIG. 6, FIG. 7, and FIG. 8. The essential elements are that the demodulation result of modulated signal A (that is, a modulated signal transmitted with the same data modulated a plurality of times) obtained based on a received signal of a time of good reception quality is taken as the modulated signal A received digital signal, and using the already determined received digital signal of modulated signal A of a time of good reception quality, a received digital signal of modulated signal B transmitted at a time of poor reception quality from a received signal of that time of poor reception quality is obtained.

For each antenna, a single antenna may be composed of a plurality of antennas. Also, in the above embodiment, a case has been described in which the number of modulated signals and the number of antennas are the same, but more antennas than the number of modulated signals n (n≥2) may be provided, and the transmitting antennas may be switched in use. If this is done, the reception qualities of each time can be made to differ still more by switching the transmitting antennas. This also applies in the case of embodiments described later herein.

In the above embodiment, a case has been described in which, for example, R(i)=F(i)/S(i), R(i+1)=F(i+1)/S(i+1), R(i+2)=F(i+2)/S(i+2), R(j)=F(j)/S(j), and R(k)=F(k)/S(k) are used as formulas for finding reception quality, but this is not a limitation, and reception quality can also similarly be found using, for example, formulas R(i)=F(i)−S(i), R(i+1)=F(i+1)−S(i+1), R(i+2)=F(i+2)−S(i+2), R(j)=F(j)−S(j), and R(k)=F(k)−S(k). This also applies to embodiments described later herein. However, when such formulas are used, size relationships are the opposite of those described in the embodiment. That is to say, reception quality is better for a larger value of R(i).

In the above embodiment, a frame configuration whereby the same data is transmitted twice in modulated signal A and a frame configuration whereby the same data is transmitted three times in modulated signal A have been proposed, but frame configurations are not limited to these, and the present invention can also be similarly implemented with a frame configuration whereby the same data is transmitted n (n≥4) times in modulated signal A. Here, as the value of n increases, the apparent data transmission speed at which transmission is possible with modulated signal A declines, but error rate performances when modulated signals A and B are demodulated improve, and therefore making n larger the poorer the radio wave propagation environment enables the effective data transmission speed to be increased.

In the above embodiment, a case in which a spread spectrum system is used has been described as an example, but this is not a limitation, and the present invention can also be similarly implemented with a single-carrier system in which spectral diffusion is not performed. At this time, the spreading section can be omitted from the transmitting apparatus configuration, and the despreading section can be omitted from the receiving apparatus configuration. The coding of this implementation can also be executed in each carrier in a multicarrier system, taking an OFDM system as an example. When an OFDM system is used, for example, the transmitting apparatus would have a configuration in which an inverse Fourier transform section is added in order to generate a modulated signal using OFDM, and the receiving apparatus would have a configuration in which a Fourier transform section is added. This also applies to embodiments described later herein.

In the above embodiment, coding of modulated signal A and modulated signal B is performed with respect to the time axis direction. That is to say, in the examples in the above-described embodiment, modulated signals of the same data are transmitted at different times in modulated signal A. However, the coding (arrangement in modulated signal transmit frames) of this embodiment can be performed in the frequency axis direction, especially when using a multicarrier system of which OFDM is an example. That is to say, modulated signal A could have a plurality of identical data symbols placed on different carriers.

In the above embodiment, improving the reception quality (error rate performances) of modulated signal A also improves the reception quality (error rate performances) of modulated signal B. If, in addition to the above embodiment, block coding, convolutional coding such as Viterbi coding or turbo coding, or coding such as LDPC (Low-Density Parity-Check) coding, is executed on modulated signal A, the reception quality of modulated signal A can be further improved, enabling the reception quality of modulated signal B also to be further improved. This also applies to embodiments described later herein.

Block coding, convolutional coding such as Viterbi coding or turbo coding, and error correction coding such as LDPC coding, are not limited to execution on modulated signal A only, but may be executed for both modulated signals A and B. In this case, modulated signal B is demodulated after demodulation of modulated signal A.

In the above embodiment, a configuration whereby two modulated signals are transmitted from two antennas has been described as an example, but the present invention is not limited to this, and the same data may be transmitted in at least one modulated signal of n modulated signals a plurality of times using different times or different frequencies. This also applies to embodiments described later herein.

(2) Embodiment 2

In Embodiment 1, it was proposed that, in transmitting two different modulated signals using two antennas, the same data be transmitted a plurality of times for only one of the modulated signals. In contrast, in this embodiment it is proposed that, in transmitting three different modulated signals using three antennas, the same data be transmitted a plurality of times for one or two of the three modulated signals, and associated actual frame configurations and apparatus configurations are described.

Figure 15:
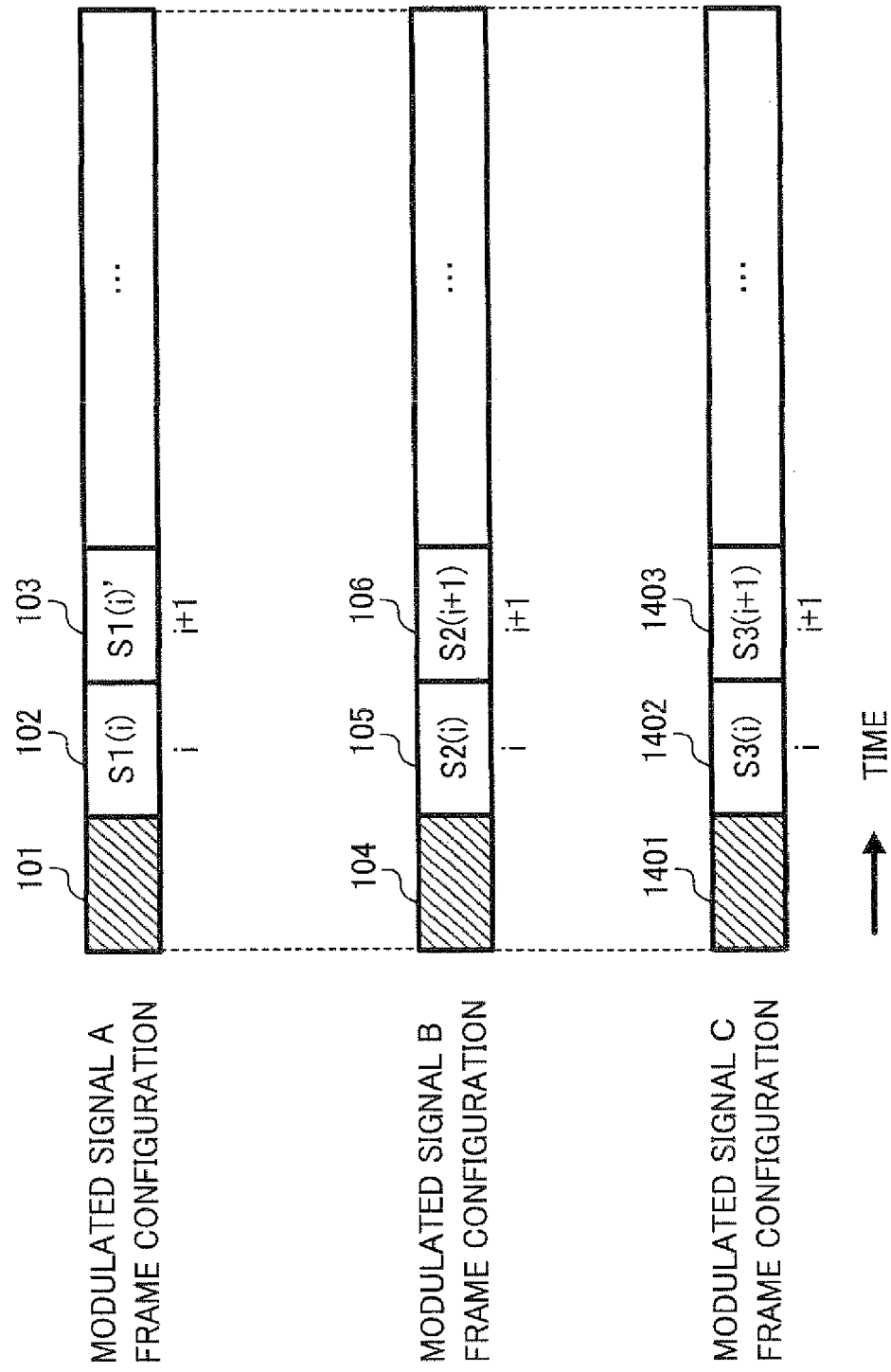
FIG. 15 is a drawing showing sample frame configurations of modulated signals according to Embodiment 2.

FIG. 15, in which parts corresponding to those in FIG. 2A are assigned the same codes as in FIG. 2A, shows sample frame configurations of modulated signals according to this embodiment. In this embodiment, a modulated signal C is transmitted at the same time as modulated signal A and modulated signal B. Modulated signal C contains a radio wave propagation environment estimation symbol 1401. Reference codes 1402 and 1403 denote data symbols. Modulated signal C time i data symbol 1402 (S3(i)) and time i+1 data symbol 1403 (S3(i+1)) have mutually different data that has undergone signal point arrangement in accordance with the same mapping rule, as in the case of modulated signal B. That is to say, modulated signal A is a special signal in which the same data is transmitted a plurality of times, changing the signal point arrangement mode, while modulated signals B and C are typical modulated signals.

Figure 17:
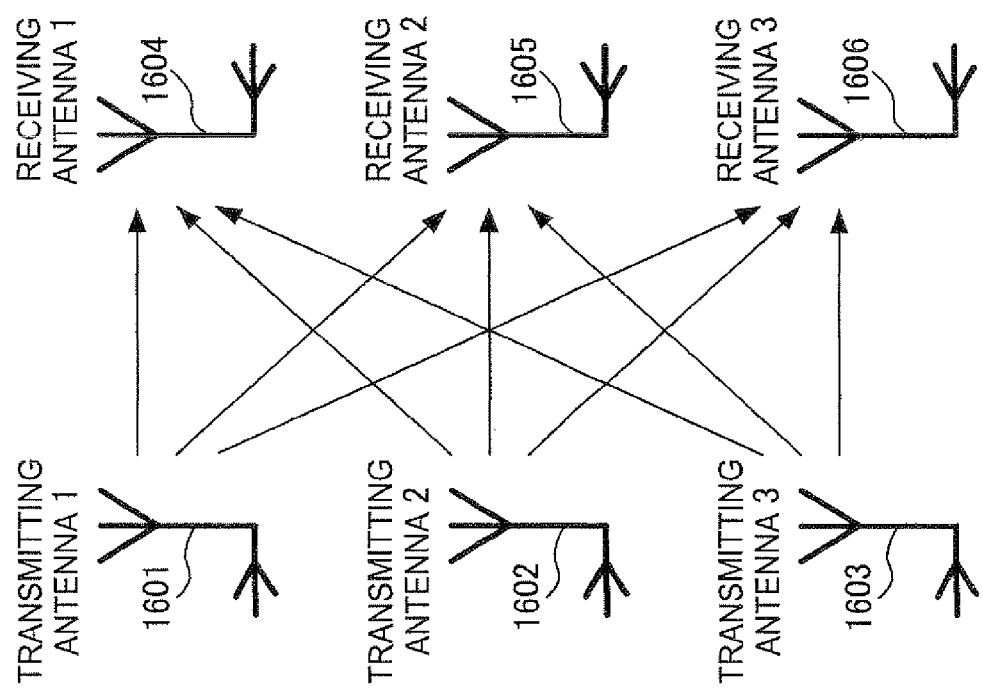
FIG. 17 is a drawing showing the relationship between transmitting and receiving antennas according to Embodiment 2.

FIG. 17 shows the relationship between transmitting antennas 1601, 1602, and 1603 and receiving antennas 1604, 1605, and 1606 according to this embodiment, and the propagation paths between these transmitting and receiving antennas.

Figure 18:
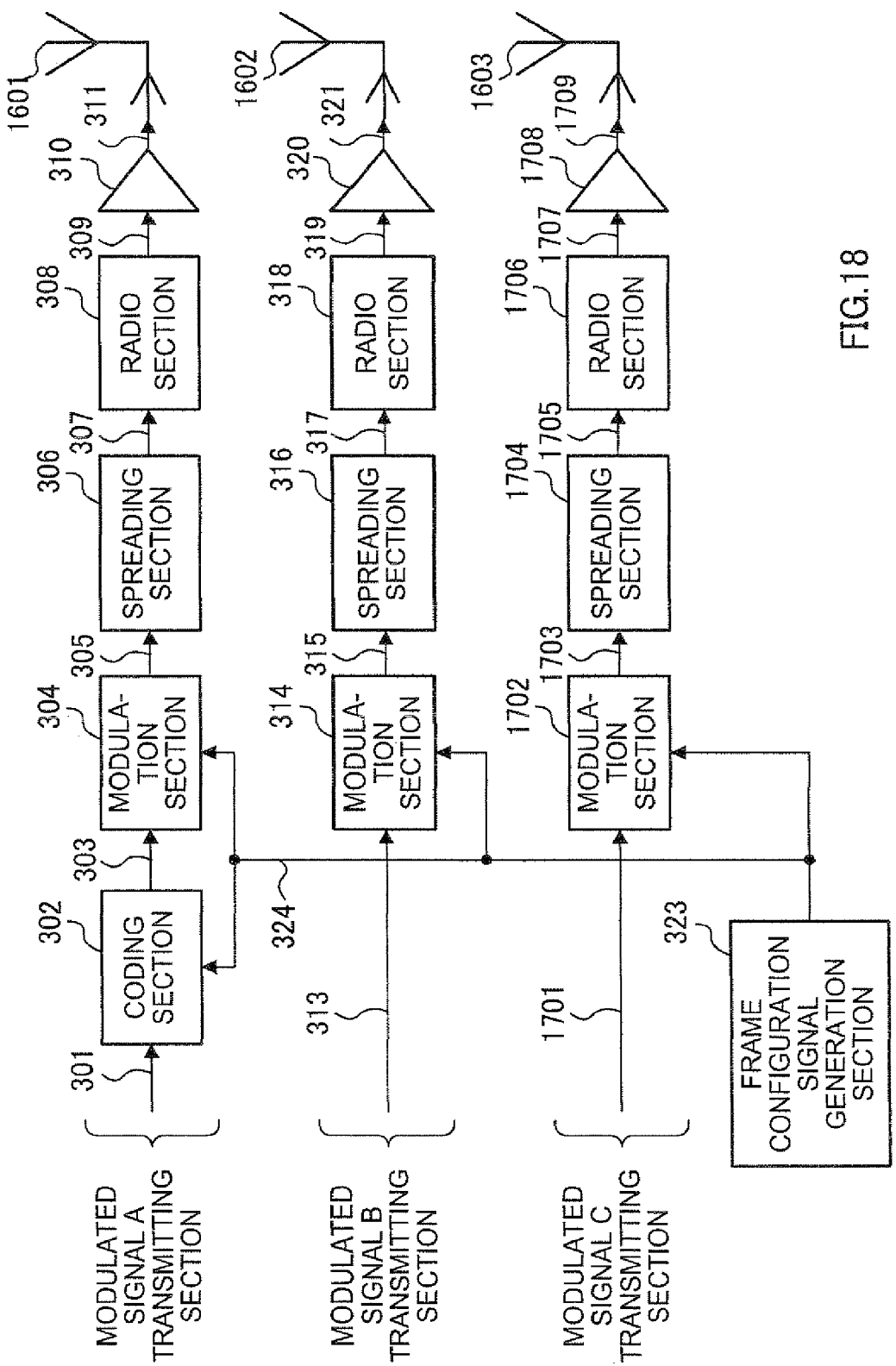
FIG. 18 is a block diagram showing a sample configuration of a transmitting apparatus according to Embodiment 2.

FIG. 18, in which parts corresponding to those in FIG. 4 are assigned the same codes as in FIG. 4, shows a sample configuration of a transmitting apparatus according to this embodiment. In transmitting apparatus 1700, a modulation section 1702 has transmit digital signal 1701 and frame configuration signal 324 as input, and outputs a transmit quadrature baseband signal 1703. Spreading section 1704 spreads transmit quadrature baseband signal 1703 and outputs a post-spreading transmit quadrature baseband signal 1705.

A radio section 1706 converts post-spreading transmit quadrature baseband signal 1705 from baseband frequency to radio frequency, and outputs a post-conversion modulated signal 1707. A power amplifier 1708 amplifies the power of modulated signal 1707, and outputs a post-amplification modulated signal 1709. Modulated signal 1709 is output from antenna 1603 as a radio wave.

Figure 19:
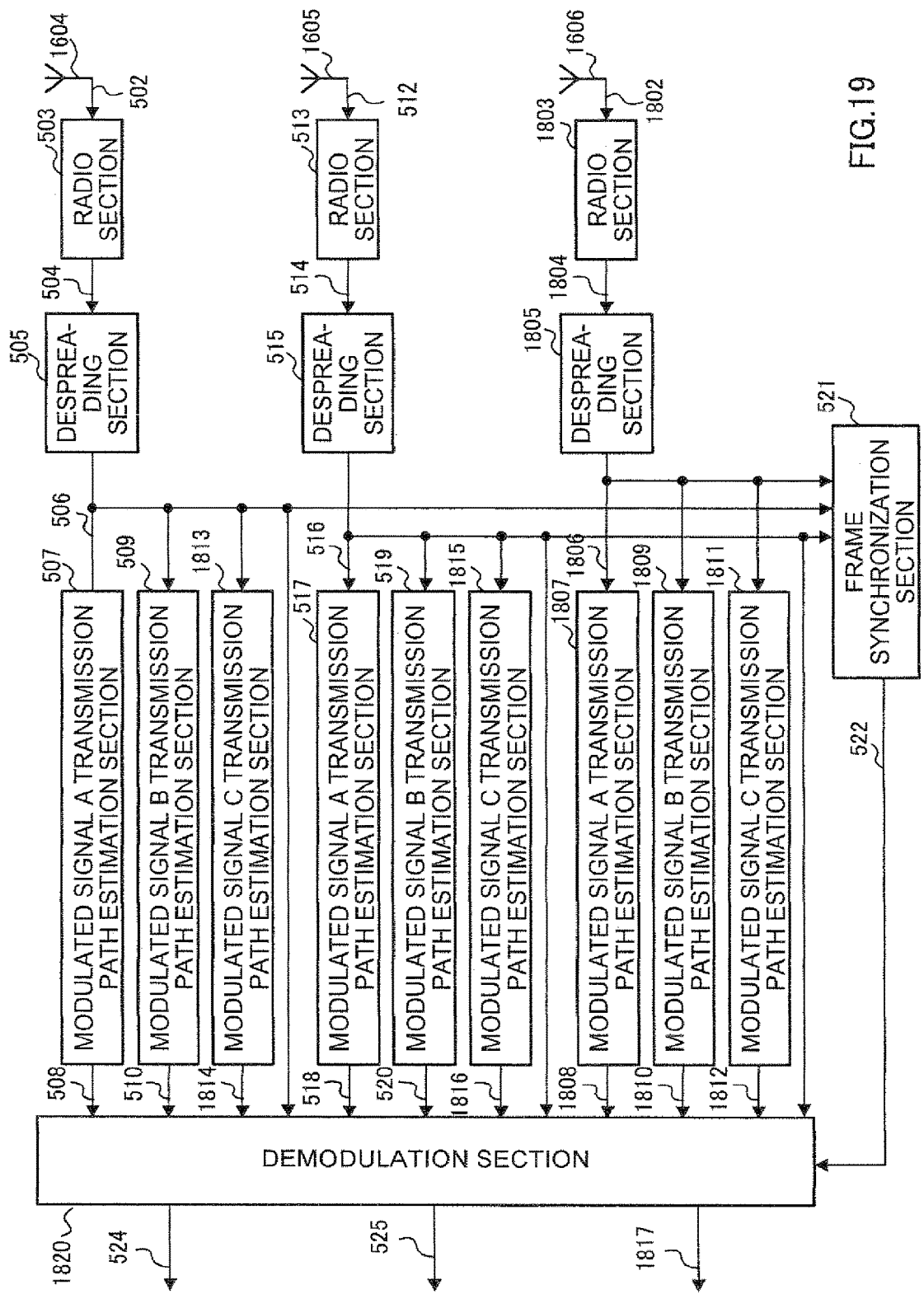
FIG. 19 is a block diagram showing a sample configuration of a receiving apparatus according to Embodiment 2.

FIG. 19, in which parts corresponding to those in FIG. 6 are assigned the same codes as in FIG. 6, shows a sample configuration of a receiving apparatus according to this embodiment. In receiving apparatus 1800, a radio section 1803 has a received signal 1802 received by an antenna 1606 as input, and outputs a received quadrature baseband signal 1804. A despreading section 1805 has received quadrature baseband signal 1804 as input, and outputs a post-despreading received quadrature baseband signal 1806.

A modulated signal A transmission path estimation section 1807 has post-despreading received quadrature baseband signal 1806 as input, and outputs a modulated signal A transmission path estimation signal 1808. A modulated signal B transmission path estimation section 1809 has post-despreading received quadrature baseband signal 1806 as input, and outputs a modulated signal B transmission path estimation signal 1810.

A modulated signal C transmission path estimation section 1811 has post-despreading received quadrature baseband signal 1806 as input, and outputs a modulated signal C transmission path estimation signal 1812. A modulated signal C transmission path estimation section 1813 has post-despreading received quadrature baseband signal 506 as input, and outputs a modulated signal C transmission path estimation signal 1814. A modulated signal C transmission path estimation section 1815 has post-despreading received quadrature baseband signal 516 as input, and outputs a modulated signal C transmission path estimation signal 1816.

Frame synchronization section 521 has post-despreading received quadrature baseband signals 506, 516, and 1806 as input, and outputs frame synchronization signal 522.

A demodulation section 1820 has post-despreading received quadrature baseband signals 506, 516, and 1806, modulated signal A transmission path estimation signals 508, 518, and 1808, modulated signal B transmission path estimation signals 510, 520, and 1810, modulated signal C transmission path estimation signals 1812, 1814, and 1816, and frame synchronization signal 522 as input, and by performing demodulation of modulated signal A, modulated signal B, and modulated signal C, obtains modulated signal A received digital signal 524, modulated signal B received digital signal 525, and a modulated signal C received digital signal 1817, and outputs these signals.

Figure 20:
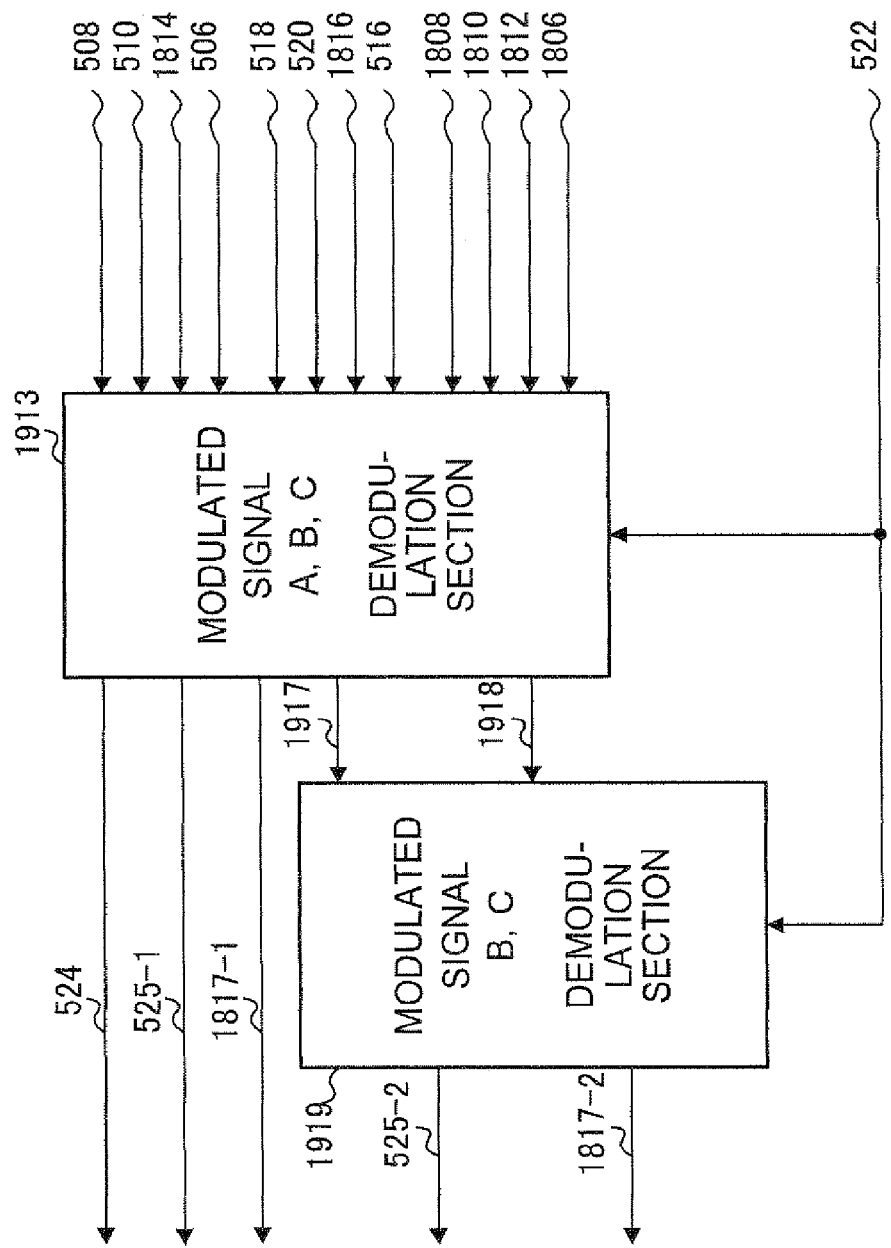
FIG. 20 is a block diagram showing a sample configuration of a demodulation section according to Embodiment 2.

FIG. 20 shows the detailed configuration of demodulation section 1820. A modulated signal A, B, C demodulation section 1913 has modulated signal A transmission path estimation signals 508, 518, and 1808, modulated signal B transmission path estimation signals 510, 520, and 1810, modulated signal C transmission path estimation signals 1814, 1816, and 1812, post-despreading received quadrature baseband signals 506, 516, and 1806, and frame synchronization signal 522 as input, and outputs modulated signal A received digital signal 524, modulated signal B received digital signal 525-1, a modulated signal C received digital signal 1817-1, a first soft decision value signal 1917, and a second soft decision value signal 1918.

A modulated signal B and C demodulation section 1919 has first soft decision value signal 1917, second soft decision value signal 1918, and frame synchronization signal 522 as input, and outputs modulated signal B received digital signal 525-2 and a modulated signal C received digital signal 1817-2.

Next, the operation of this embodiment will be explained.

As described above, when transmitting apparatus 1700 of this embodiment transmits three modulated signals A, B, and C from separate antennas, the same data is transmitted a plurality of times, changing the mapping pattern (changing the signal point arrangement mode), for modulated signal A only. Thus, to consider a comparison with use of space-time block coding, whereas the same information is transmitted repeatedly by a plurality of antennas in space-time block coding, transmitting apparatus 1700 transmits data repeatedly from only one of three antennas, thereby enabling a higher data transmission speed to be maintained than when space-time block coding is used.

Also, by receiving such signals, receiving apparatus 1800 can demodulate modulated signals A, B, and C with good error rate performances. That is to say, when such signals are received, the signal point arrangements of the received modulated signals vary between time i and time i+1, and therefore the precision of demodulation of modulated signal A, modulated signal B, and modulated signal C at time i and the precision of demodulation of modulated signal A, modulated signal B, and modulated signal C at time i+1 are different. Then by demodulating modulated signal A at a time when demodulation precision is good, and demodulating modulated signal B and modulated signal C using that result, the demodulation precision of modulated signal B and modulated signal C can be improved.

The operation of receiving apparatus 1800 will now be explained in detail.

First, using radio wave propagation environment estimation symbols, receiving apparatus 1800 estimates channel fluctuations between the transmitting and receiving antennas. In the case of the transmitting/receiving antenna relationship in FIG. 7, if the channel fluctuation from transmitting antenna i to receiving antenna j is designated hji, and a transmit signal of receiving antenna j is designated Rj, the transmit/received signal relationship at time i can be expressed by the following equation.

$$\begin{pmatrix} R1(i) \\ R2(i) \\ R3(i) \end{pmatrix} = \begin{pmatrix} h11(i) & h12(i) & h13(i) \\ h21(i) & h22(i) & h23(i) \\ h31(i) & h32(i) & h33(i) \end{pmatrix} \begin{pmatrix} S1(i) \\ S2(i) \\ S3(i) \end{pmatrix} \quad (8)$$

Similarly, the relationship in the following equation holds true at time i+1.

$$\begin{pmatrix} R1(i+1) \\ R2(i+1) \\ R3(i+1) \end{pmatrix} = \begin{pmatrix} h11(i+1) & h12(i+1) & h13(i+1) \\ h21(i+1) & h22(i+1) & h23(i+1) \\ h31(i+1) & h32(i+1) & h33(i+1) \end{pmatrix} \begin{pmatrix} S1(i)' \\ S2(i+1) \\ S3(i+1) \end{pmatrix} \quad (9)$$

S1(i), S2(i), and S3(i) can be obtained from the relationship in equation (8), and S1(i)', S2(i+1), and S3(i+1) can be obtained from the relationship in equation (9).

In the same way as in Embodiment 1, $h11(i) \approx h11(i+1)$, $h12(i) \approx h12(i+1)$, $h13(i) \approx h13(i+1)$, $h21(i) \approx h21(i+1)$, $h22(i) \approx h22(i+1)$, $h23(i) \approx h23(i+1)$, $h31(i) \approx h31(i+1)$, $h32(i) \approx h32(i+1)$, and $h33(i) \approx h33(i+1)$.

At this time, the matrices of equation (8) and equation (9) are almost equal matrices, but the (S1(i), S2(i)), S3(i)) and (S1(i)', S2(i+1), S3(i+1)) vectors are different, and therefore the likelihoods of the obtained data are different.

Transmitting apparatus 1700 and receiving apparatus 1800 of this embodiment make use of this characteristic to improve receive data quality.

The actual demodulation (decoding) procedure of receiving apparatus 1800 is as follows.

<1> Time i detection is performed, and (S1(i), S2(i), S3(i)) is obtained.

<2> Time i+1 detection is performed, and (S1(i)', S2(i+1), S3(i+1)) is obtained.

<3> The time i and time i+1 reception qualities are compared.

If the time i reception quality is better, (S1(i), S2(i), S3(i)) data obtained in time i detection is used directly. Then S1(i)' of time i+1 is estimated from S1(i) obtained in time i detection, and S2(i+1) and S3(i+1) are obtained using that result.

If the time i+1 reception quality is better, (S1(i)', S2(i+1), S3(i+1)) data obtained in time i+1 detection is used directly. Then S1(i) of time i is estimated from S1(i)' obtained in time i+1 detection, and S2(i) and S3(i) are obtained using that result.

In receiving apparatus 1800, modulated signal A received digital signal 524, modulated signal B received digital signal 525, and modulated signal C received digital signal 1817 are obtained by performing this kind of demodulation processing in demodulation section 1820.

In the example in this embodiment, modulated signal A, modulated signal B, and modulated signal C are all QPSK modulated signals, and it is therefore possible to transmit a total of 6 bits—2 bits in modulated signal A, 2 bits in modulated signal B, and 2 bits in modulated signal C—at the same time. That is to say, it is possible to transmit 000000, 000001, . . . , 111111. It is assumed that the upper 2 bits are the 2 bits transmitted in modulated signal A, the middle 2 bits are the 2 bits transmitted in modulated signal B, and the lower 2 bits are the 2 bits transmitted in modulated signal C.

The overall operation of demodulation section 1820 will first be explained.

First, at time i in FIG. 15, demodulation section 1820 finds signal points (candidate signal points) in the 64 signal point (000000, 000001, . . . , 111111) I-Q plane using modulated signal A transmission path estimation signal 508, modulated signal B transmission path estimation signal 510, and modulated signal C transmission path estimation signal 1814. Demodulation section 1820 also has received quadrature baseband signal 506 from despreading section 505 as input, and finds the reception state (received signal point) in the I-Q plane from this post-despreading received quadrature baseband signal 506.

Next, demodulation section 1820 calculates, for example, the square of the distance from the received signal point in the I-Q plane for all 64 signal points. That is to say, the square of the distance between the signal point of transmit bits 000000 and the received signal point (X000000(i)) is found, and in the same way the squares of the distances between the signal points of transmit bits 000001, . . . , 111111 and the received signal point (X000001(i), . . . , X111111(i)) are found.

Similarly, at time i in FIG. 15, demodulation section 1820 finds signal points (candidate signal points) in the 64 signal point (000000, 000001, . . . , 111111) I-Q plane using modulated signal A transmission path estimation signal 518, modulated signal B transmission path estimation signal 520, and modulated signal C transmission path estimation signal 1816. Demodulation section 1820 also has received quadrature baseband signal 516 from despreading section 515 as input, and finds the reception state (received signal point) in the I-Q plane from this post-despreading received quadrature baseband signal 516.

Next, demodulation section 1820 calculates, for example, the square of the distance from the received signal point in the I-Q plane for all 64 signal points. That is to say, the square of the distance between the signal point of transmit bits 000000 and the received signal point (Y000000(i)) is found, and in the same way the squares of the distances between the signal points of transmit bits 000001, . . . , 111111 and the received signal point (Y000001(i), . . . , Y111111(i)) are found.

Similarly, at time i in FIG. 15, demodulation section 1820 finds signal points (candidate signal points) in the 64 signal point (000000, 000001, . . . , 111111) I-Q plane using modulated signal A transmission path estimation signal 1808, modulated signal B transmission path estimation signal 1810, and modulated signal C transmission path estimation signal 1812. Demodulation section 1820 also has received quadrature baseband signal 1806 from despreading section 1805 as input, and finds the reception state (received signal point) in the I-Q plane from this post-despreading received quadrature baseband signal 1806.

Next, demodulation section 1820 calculates, for example, the square of the distance from the received signal point in the I-Q plane for all 64 signal points. That is to say, the square of the distance between the signal point of transmit bits 000000 and the received signal point (Z000000(i)) is found, and in the same way the squares of the distances between the signal points of transmit bits 000001, . . . , 111111 and the received signal point (Z000001(i), . . . , Z111111(i)) are found.

Demodulation section 1820 then finds the sum of X000000(i) and Y000000(i) and Z000000(i), K000000(i)=X000000(i)+Y000000(i)+Z000000(i), and similarly finds K000001(i), . . . , K111111(i). In the same way, demodulation section 1820 finds K000000(i+1), K000001(i+1), . . . , K111111(i+1) for time i+1.

Next, demodulation section 1820 compares the likelihoods of time i and time i+1 receive data.

For example, demodulation section 1820 searches for the smallest value among K000000(i), K000001(i), . . . , K111111(i). Let that value be designated F(i). Then demodulation section 1820 searches for the second-smallest value. Let that value be designated S(i).

Similarly, demodulation section 1820 searches for the smallest value among K000000(i+1), K000001(i+1), . . . , K111111(i+1). Let that value be designated F(i+1). Then demodulation section 1820 searches for the second-smallest value. Let that value be designated S(i+1).

Then, for example, demodulation section 1820 finds R(i)=F(i)/S(i), and R(i+1)=F(i+1)/S(i+1).

When R(i+1)>R(i), demodulation section 1820 determines that the time i reception quality is better, and determines that the 6 bits providing F(i) are correct data. Then, as the 2 bits transmitted in modulated signal A, the 2 bits obtained at time i are taken as time i and time i+1 receive data. For modulated signals B and C, as the 2 bits transmitted respectively at time i, the 2 bits obtained at time i are taken directly as receive data, while the 2 bits transmitted at time i+1 are determined making use of the fact that the 2 bits transmitted at time i+1 modulated signal A have already been determined.

For example, if the 2 bits transmitted in modulated signal A are 00, the 2 bits transmitted in modulated signal B and the 2 bits transmitted in modulated signal C at time i+1 are determined by searching for the item with the smallest value among the 16 points K000000(i+1), K000001(i+1), K000010(i+1), K000011(i+1), K000100(i+1), K000101(i+1), K000110(i+1), K000111(i+1), K001000(i+1), K001001(i+1), K001010(i+1), K001011(i+1), K01100(i+1), K001101(i+1), K001110(i+1), and K001111(i+1).

The 2 bits transmitted in modulated signal B and the 2 bits transmitted in modulated signal C at time i+1 are also determined in the same way when the 2 bits transmitted in modulated signal A are 01, 10, or 11.

When R(i)>R(i+1), demodulation section 1820 determines that the time i+1 reception quality is better, and determines that the 6 bits providing F(i+1) are correct data. Then, as the 2 bits transmitted in modulated signal A, the 2 bits obtained at time i+1 are taken as time i and time i+1 receive data. For modulated signals B and C, as the 2 bits transmitted respectively at time i+1, the 2 bits obtained at time i+1 are taken directly as receive data, while the 2 bits transmitted at time i are determined making use of the fact that the 2 bits transmitted at time i modulated signal A have already been determined.

For example, if the 2 bits transmitted in modulated signal A are 00, the 2 bits transmitted in modulated signal B and the 2 bits transmitted in modulated signal C at time i are determined by searching for the item with the smallest value among the 16 points K000000(i), K000001(i), K000010(i), K000011(i), K000100(i), K000101(i), K000110(i), K000111(i), K001000(i), K001001(i), K001010(i), K001011(i), K01100(i), K001101(i), K001110(i), and K001111(i).

The 2 bits transmitted in modulated signal B and the 2 bits transmitted in modulated signal C at time i are also determined in the same way when the 2 bits transmitted in modulated signal A are 01, 10, or 11. The operation when demodulation section 1820 is configured as shown in FIG. 20 will now be explained.

As described above, of the data transmitted in modulated signal A at time i and time i+1, modulated signal A, B, C demodulation section 1913 outputs data demodulated from the signal of a time of good reception quality as modulated signal A received digital signal 524.

Also, modulated signal A, B, C demodulation section 1913 outputs received digital signal 525-1 of modulated signal B and received digital signal 1817-1 of modulated signal C of either time i or time i+1. Furthermore, modulated signal A, B, C demodulation section 1913 outputs K000000

(i), . . . , K111111(i) as first soft decision value signal 1917, and outputs K000000(i+1), . . . , K111111(i+1) as second soft decision value signal 1918.

Modulated signal B and C demodulation section 1919 has K000000(i), . . . , K111111(i) comprising first soft decision value signal 1917 and K000000(i+1), . . . , K111111(i+1) comprising second soft decision value signal 1918 as input, and, as described above, by performing modulated signal B and modulated signal C demodulation based on the time i and time i+1 reception qualities, obtains modulated signal B received digital signal 525-2 of a different time from modulated signal B from which received digital signal 525-1 was obtained, and also obtains modulated signal C received digital signal 1817-2 of a different time from modulated signal B from which received digital signal 1817-1 was obtained.

Thus, according to this embodiment, of modulated signals A, B, and C transmitted from different antennas, modulated signal A is formed by modulating the same data a plurality of times while changing the signal point arrangement mode, and modulated signals B and C are formed not by modulating the same data a plurality of times while changing the signal point arrangement mode but by performing sequential modulation of time series data (that is, by executing normal modulation), thereby enabling the error rate performances of the data stream transmitted a plurality of times to be improved, and as a result, the error rate performances of all three streams to be improved, while maintaining a higher data transmission speed than when space-time block coding is used.

Actually, on the receiving side, by taking the demodulation result of modulated signal A obtained based on a received signal of a time of good reception quality as the modulated signal A received digital signal, and obtaining the received digital signals of modulated signals B and C received at a time of poor reception quality from a received signal of that time of poor reception quality using the already determined modulated signal A received digital signal of a time of good reception quality, the error rate performances of modulated signals B and C received at a time of poor reception quality can also be improved.

(2-1) Variant Example 1

Figure 16:
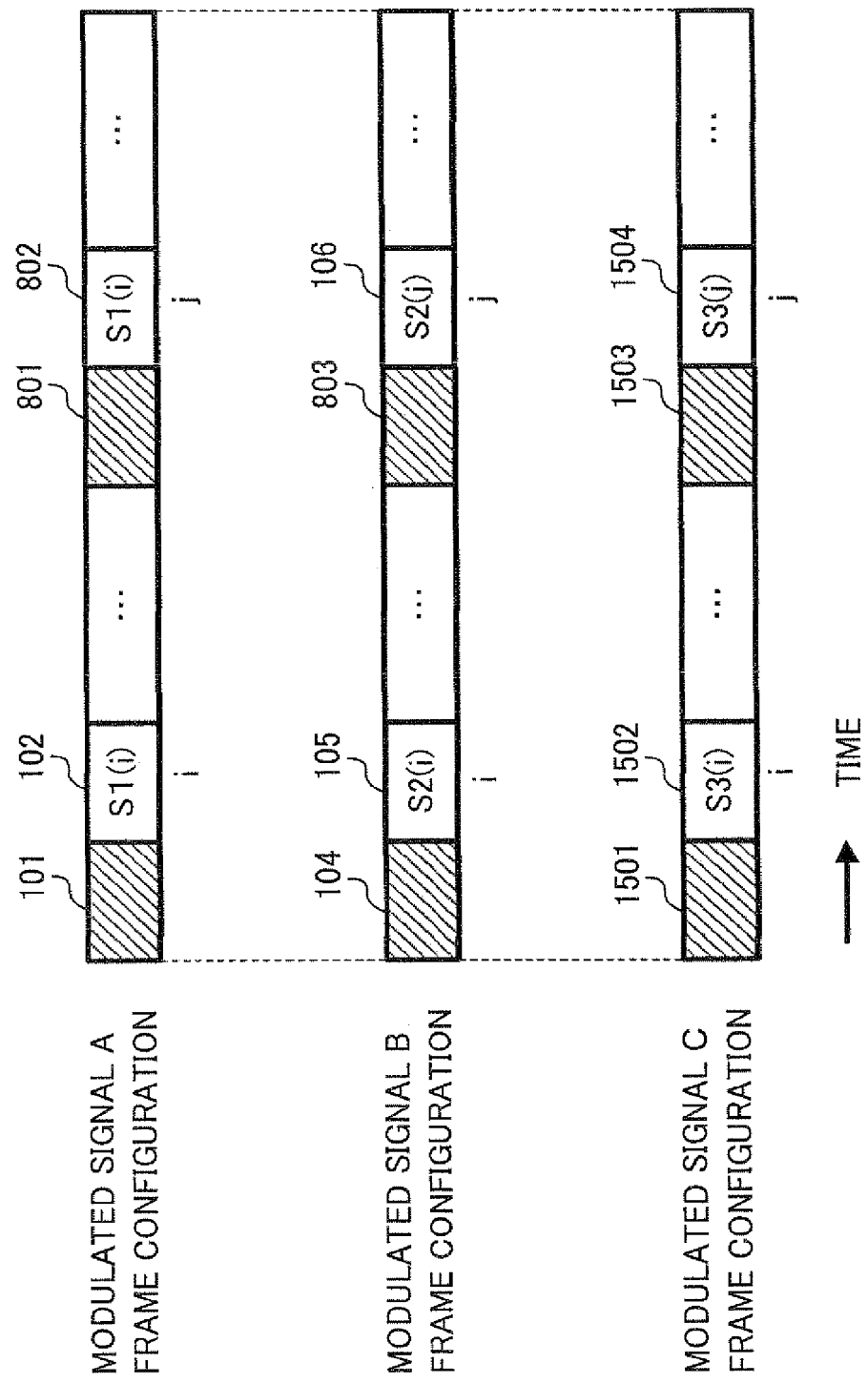
FIG. 16 is a drawing showing sample frame configurations of modulated signals according to Embodiment 2.

In this embodiment a case has been described in which the frame configurations transmitted by transmitting apparatus 1700 are as shown in FIG. 15, but the transmitted frame configurations may also be as shown in FIG. 16. The difference between the frame configurations in FIG. 16 and the frame configurations in FIG. 15 is that the time difference in transmitting signal S1(i) in which the same data is modulated in modulated signal A is made small in the case of FIG. 15, but is made very large in FIG. 16.

Consequently, the radio wave propagation environment is totally different at time i and time j. Considering this, in the case of FIG. 16, the signal point arrangement of modulated signal A transmitted at time j is made the same as the signal point arrangement of modulated signal A transmitted at time i. This is because it was considered that, even if the signal point arrangement of modulated signal A is not intentionally varied, the time i and time j reception qualities will differ to some extent due to differences in the radio wave propagation environment.

As a result, if the demodulation result of modulated signal A obtained based on a received signal of a time of good reception quality is taken as the modulated signal A received digital signal, and the received digital signals of modulated signals B and C received at a time of poor reception quality from a received signal of that time of poor reception quality are obtained using the already determined modulated signal A received digital signal of a time of good reception quality, the error rate performances of modulated signals B and C received at a time of poor reception quality can also be improved in the same way as when signals with the frame configurations shown in FIG. 15 are transmitted.

This will now be explained in specific terms. Equation (8) given above holds true at time i. Similarly, the relationship in the following equation holds true at time j.

$$\begin{pmatrix} R1(j) \\ R2(j) \\ R3(j) \end{pmatrix} = \begin{pmatrix} h11(j) & h12(j) & h13(j) \\ h21(j) & h22(j) & h23(j) \\ h31(j) & h32(j) & h33(j) \end{pmatrix} \begin{pmatrix} S1(i) \\ S2(j) \\ S3(j) \end{pmatrix} \quad (10)$$

In receiving apparatus 1800, h11(j), h12(j), h13(j), h21(j), h22(j), h23(j), h31(j), h32(j), and h33(j) in equation (10) are estimated using, for example, radio wave propagation environment estimation symbols 801, 803, and 1503 in FIG. 16. Here, since the radio wave propagation environment differs for time i and time j, h11(i)≠h11(j), h12(i)≠h12(j), h13(i)≠h13(j), h21(i)≠h21(j), h22(i)≠h22(j), h23(i)≠h23(j), h31(i)≠h31(j), h32(i)≠h32(j), and h33(i)≠h33(j). Therefore, time i and time j reception qualities are totally different. A description will now be given of signal point arrangements in the I-Q plane for time i and time j taking the above into consideration.

Examples of modulated signal A signal point arrangements in the I-Q plane are shown in FIG. 3A through FIG. 3C. When the frame configurations shown in FIG. 16 are used, the time i and j signal point arrangements may both be as shown in FIG. 3A, or may differ, with the time i signal point arrangement as shown in FIG. 3A and the time j signal point arrangement as shown in FIG. 3B. This is because, unlike in the case of the frame configurations in FIG. 15, the radio wave propagation environment differs for times i and j, and therefore even if the signal point arrangement is not intentionally varied at times i and j, the reception quality is different for time i and time j.

The decoding procedure is described in detail below. This can be considered as similar to the operation in the case of the frame configurations in FIG. 15. That is to say, time i+1 operations can be thought of as being replaced by time j operations.

<1> Time i detection is performed, and (S1(i), S2(i), S3(i)) is obtained.
<2> Time j detection is performed, and (S1(i), S2(j), S3(j)) is obtained.
<3> The time i and time j reception qualities are compared.

If the time i reception quality is better, (S1(i), S2(i), S3(i)) data obtained in time i detection is used directly. Then S1(i) of time j is estimated from S1(i) obtained in time i detection, and S2(j) and S3(j) are obtained using that result.

If the time j reception quality is better, (S1(i), S2(j), S3(j)) data obtained in time j detection is used directly. Then S1(i) of time i is estimated from S1(i) obtained in time j detection, and S2(i) and S3(i) are obtained using that result.

In receiving apparatus 1800, modulated signal A received digital signal 524, modulated signal B received digital signal 525, and modulated signal C received digital signal 1817 are obtained by performing this kind of demodulation processing in demodulation section 1820.

A description of the detailed operation of demodulation section 1820 when transmit signals with the frame configurations in FIG. 16 are received will be omitted, as it is the same as described above with "time j" substituted for "time i+1" operations. However, a difference in above time i+1 and time j processing is that, whereas for time i+1, time i+1 data likelihood is determined based on signal points (candidate signal points) obtained using radio wave propagation environment estimation symbols 101, 104, and 1401 in FIG. 15, for time j, time j data likelihood is determined based on signal points (candidate signal points) obtained using radio wave propagation environment estimation symbols 801, 803, and 1503 in FIG. 16.

(2-2) Variant Example 2

Figure 21:
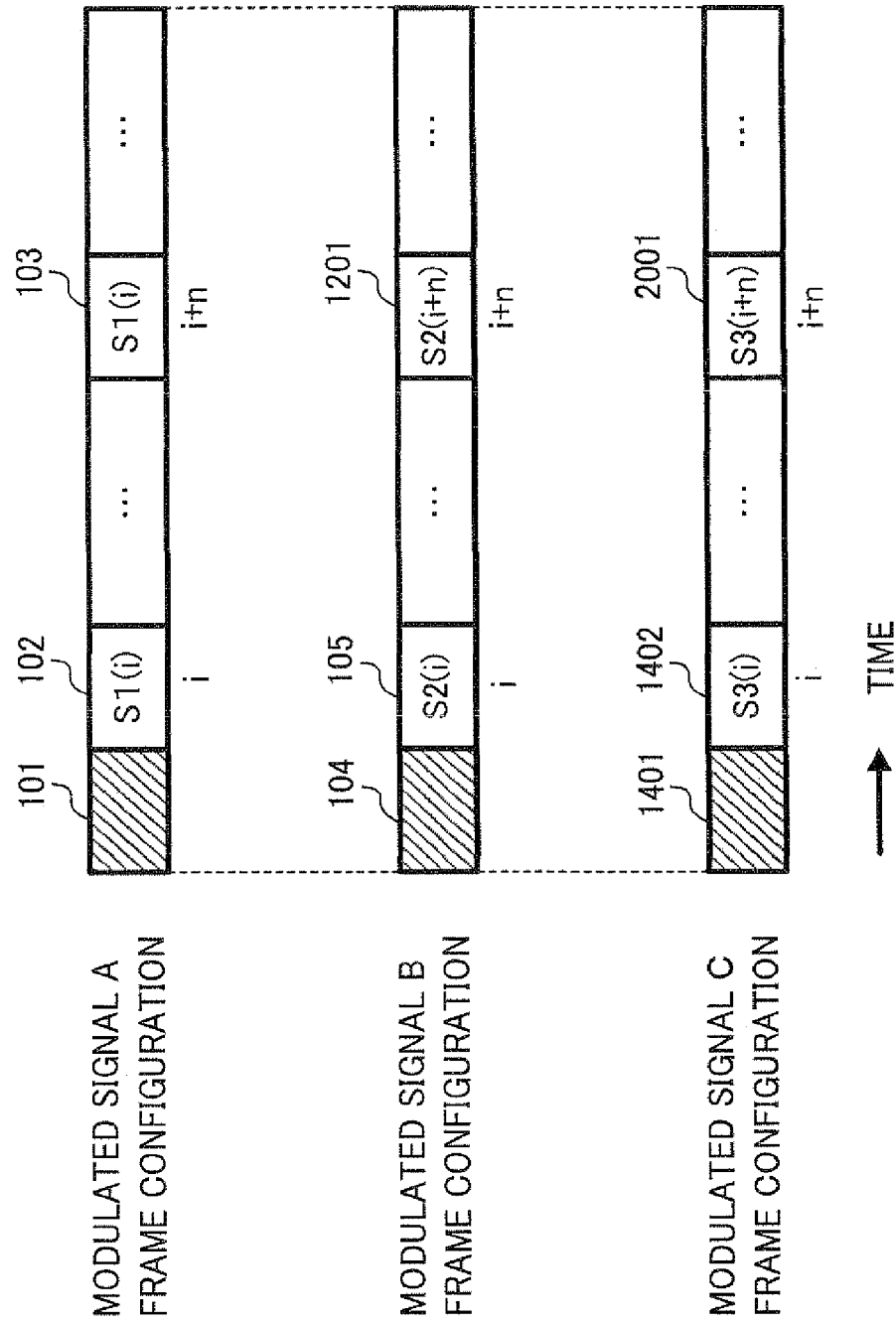
FIG. 21 is a drawing showing sample frame configurations of modulated signals according to Embodiment 2.

Here, an example will be described in which the frame configurations transmitted by transmitting apparatus 1700 are as shown in FIG. 21 instead of FIG. 15. The difference between the frame configurations in FIG. 21 and the frame configurations in FIG. 15 is that the time difference in transmitting signal S1(i) and S1(i)' in which the same data is modulated in modulated signal A is "1" in the case of FIG. 15, but is n in FIG. 21.

Here, if n is such that the relationships h11(i)≒ h11(i+n), h12(i)≒ h12(i+n), h21(i)≒ h21(i+n), and h22(i)≒ h22(i+n) hold true, the same kind of result can be obtained as when signals with the frame configurations in FIG. 15 are transmitted. That is to say, operations can be executed in the same way, considering a time i+1 operation as a time i+n operation.

(2-3) Variant Example 3

Figure 22:
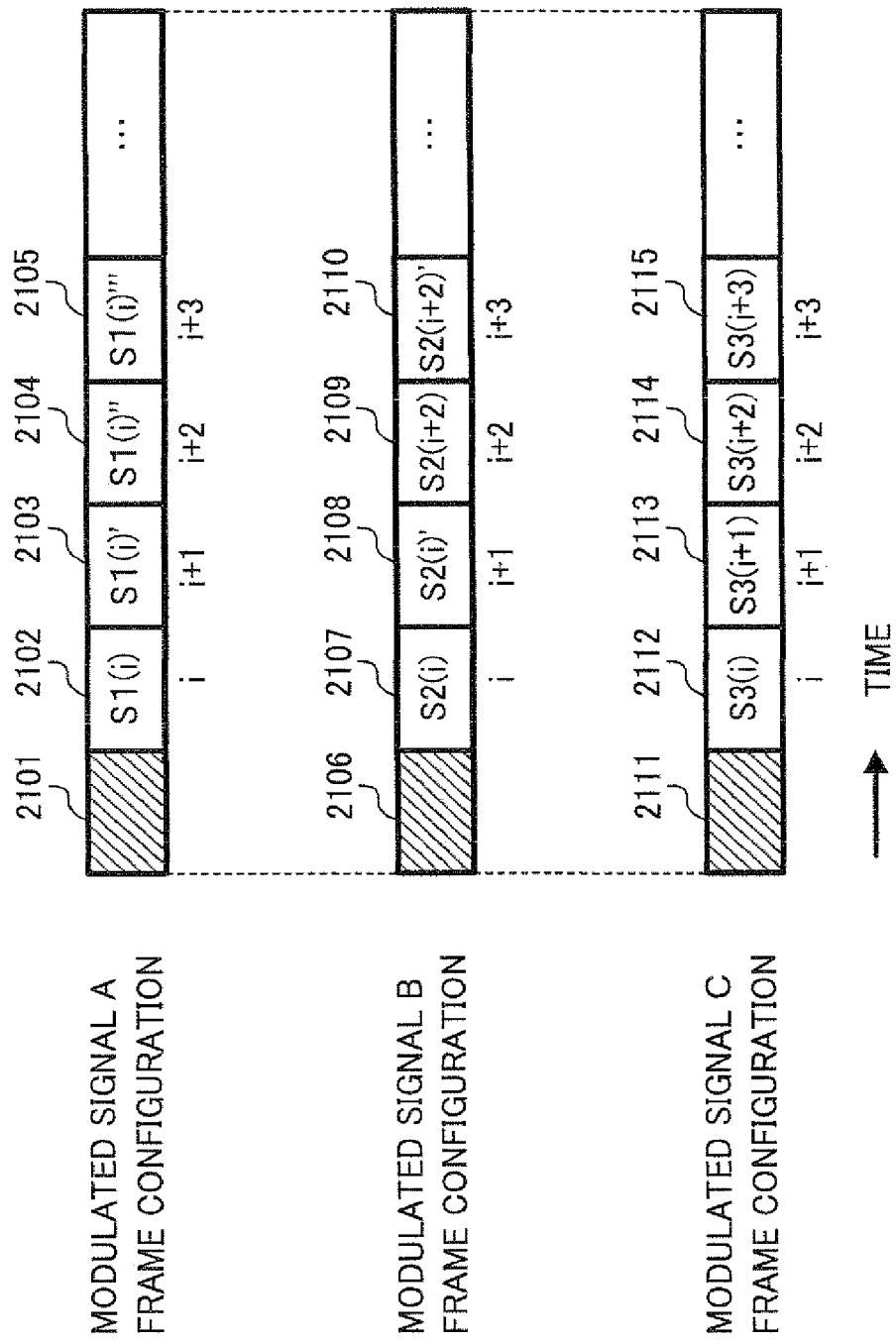
FIG. 22 is a drawing showing sample frame configurations of modulated signals according to Embodiment 2.

Here, it is proposed that the frame configurations transmitted by transmitting apparatus 1700 be as shown in FIG. 22 instead of as shown in FIG. 15. The frame configurations in FIG. 22 will first be explained. In modulated signal A, the same information is transmitted at time i, time i+1, time i+2, and time i+3. Then, for example, the S1(i) signal point arrangement is made as shown in FIG. 3A, the S1(i)' signal point arrangement as shown in FIG. 3B, the S1(i)" signal point arrangement as shown in FIG. 3C, and the S1(i)''' signal point arrangement is made a different arrangement from those shown in FIG. 3A, FIG. 3B, and FIG. 3C. Thus, in modulated signal A, the same information is transmitted with different signal point arrangements at times i, i+1, i+2, and i+3. Although different signal point arrangements need not necessarily be used, transmitting with different signal point arrangements has the effect of increasing the probability of the time i, i+1, i+2, and i+3 reception qualities being different.

In modulated signal B, the same information is transmitted at times i and i+1, and the same information is transmitted at times i+2 and i+3. For example, at time i, S2(i) is transmitted with the signal point arrangement in FIG. 3A; at time i+1, S2(i)' is transmitted with the signal point arrangement in FIG. 3B; at time i+2, S2(i+2) is transmitted with the signal point arrangement in FIG. 3A; and at time i+3, S2(i+2)' is transmitted with the signal point arrangement in FIG. 3B.

In modulated signal C, different information is transmitted at times i, i+1, i+2, and i+3. The modulated signal C signal point arrangement may be as shown in FIG. 3A, for example.

As described above, the same information is transmitted four times in modulated signal A, and the same information is transmitted twice in modulated signal B. By changing the number of times the same information is transmitted in modulated signal A and modulated signal B in this way, demodulation operation is made possible whereby modulated signal A is demodulated, then modulated signal B is demodulated, and then modulated signal C is demodulated. By this means, reception quality can be improved further than in the case of the embodiment, and the data transmission speed can be improved.

Figure 23:
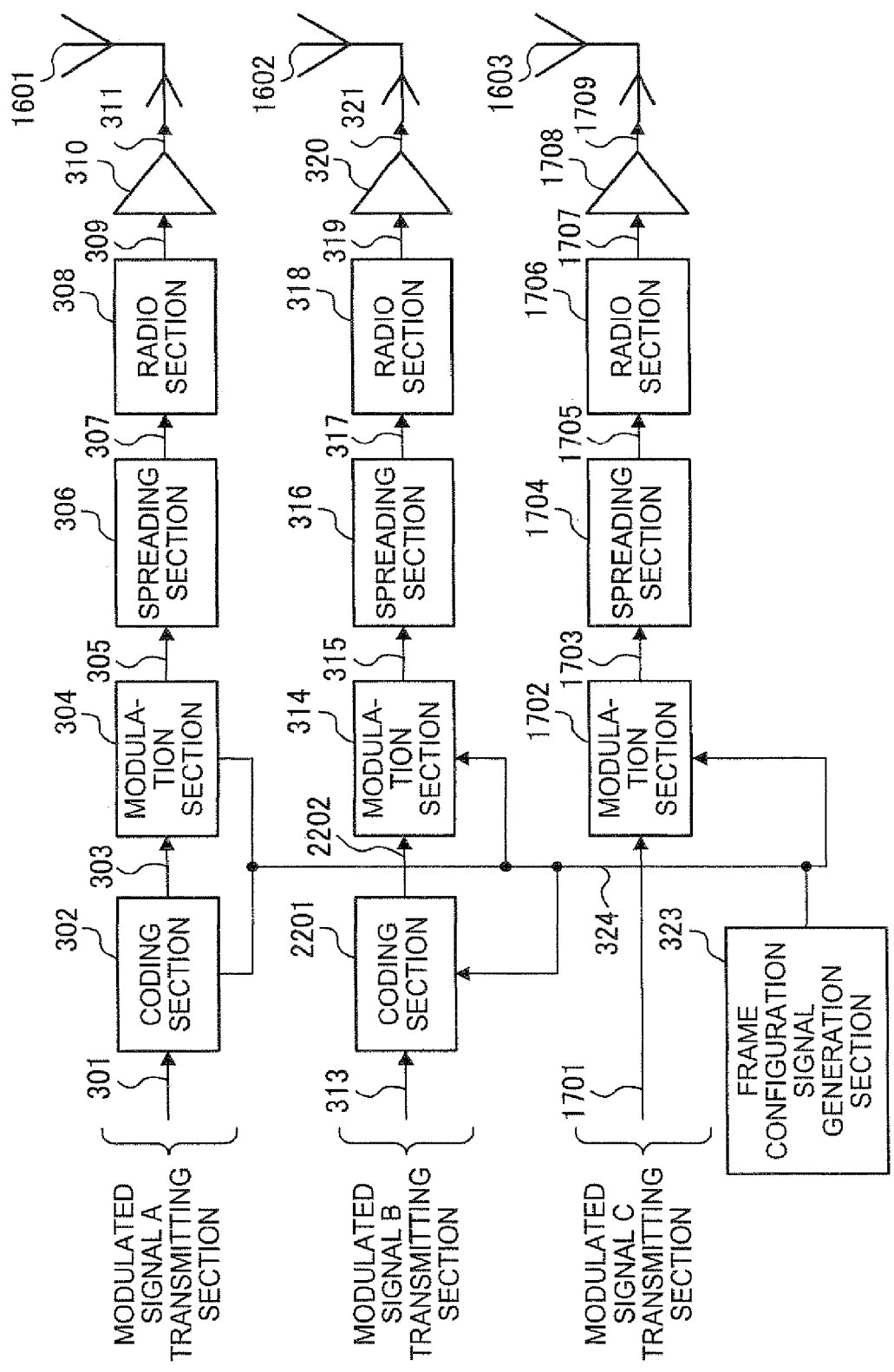
FIG. 23 is a block diagram showing a sample configuration of a transmitting apparatus according to Embodiment 2.

Signals with the frame configurations shown in FIG. 22 can be formed, for example, by a transmitting apparatus 2200 with the configuration shown in FIG. 23. In FIG. 23, in which parts corresponding to those in FIG. 18 are assigned the same codes as in FIG. 18, transmitting apparatus 2200 differs from transmitting apparatus 1700 in FIG. 18 in having a coding section 2201.

Coding section 2201 has modulated signal B transmit digital signal 313 and frame configuration signal 324 as input, and obtains a modulated signal B transmit digital signal 2202 by coding transmit digital signal 313 in accordance with the frame configuration in FIG. 22, and outputs this transmit digital signal 2202.

Transmit signals with the frame configurations in FIG. 22 transmitted from transmitting apparatus 2200 are received by receiving apparatus 1800 shown in FIG. 19. When demodulating transmit signals with the frame configurations in FIG. 22, demodulation section 1820 may have the configuration shown in FIG. 24, for example.

Figure 24:
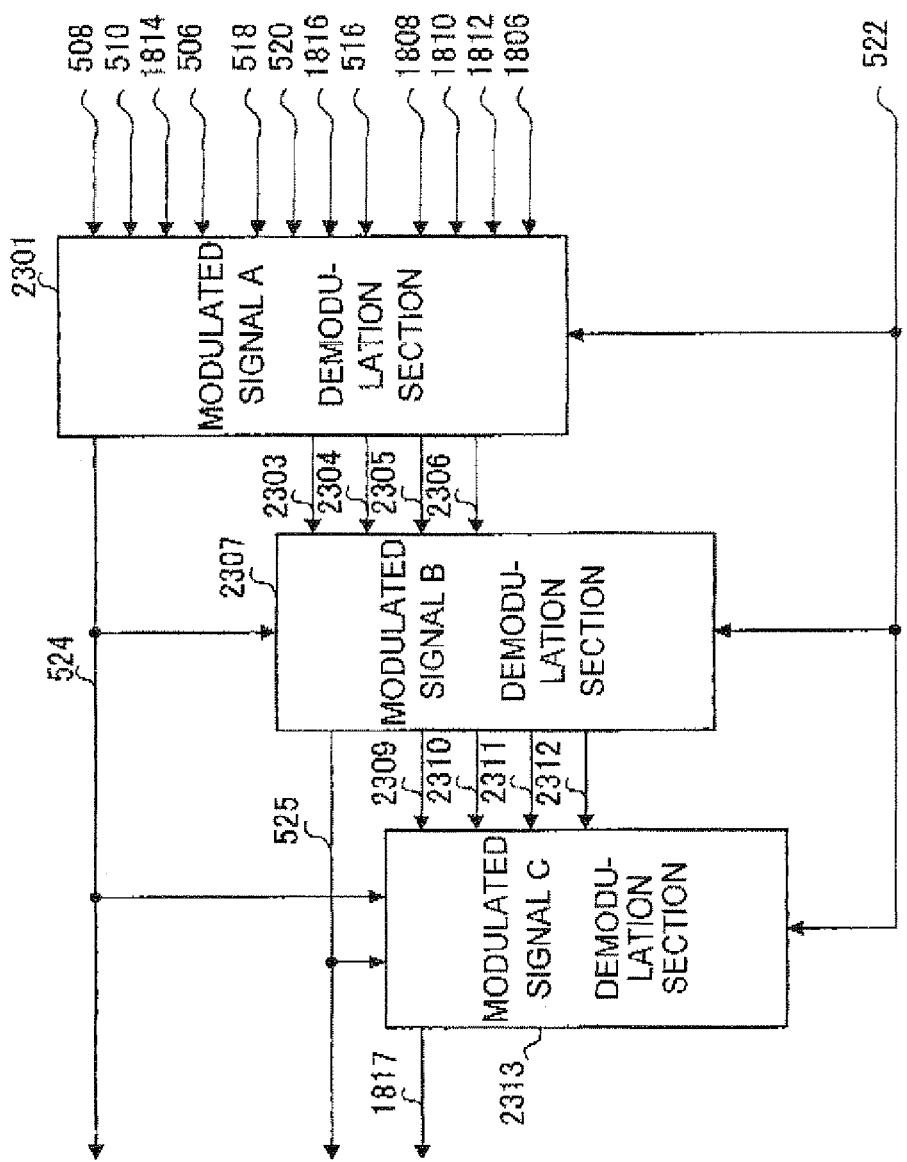
FIG. 24 is a block diagram showing a sample configuration of a demodulation section according to Embodiment 2.

Demodulation section 1820 in FIG. 24 will now be described.

A modulated signal A demodulation section 2301 has modulated signal A transmission path estimation signals 508, 518, and 1808, modulated signal B transmission path estimation signals 510, 520, and 1810, modulated signal C transmission path estimation signals 1814, 1816, and 1812, post-despreading received quadrature baseband signals 506, 516, and 1806, and frame synchronization signal 522 as input, and outputs modulated signal A received digital signal 524, a first soft decision value signal 2303, a second soft decision value signal 2304, a third soft decision value signal 2305, and a fourth soft decision value signal 2306.

A modulated signal B demodulation section 2307 has first soft decision value signal 2303, second soft decision value signal 2304, third soft decision value signal 2305, fourth soft decision value signal 2306, modulated signal A received digital signal 524, and frame synchronization signal 522 as input, and outputs modulated signal B received digital signal 525, a first soft decision value signal 2309, a second soft decision value signal 2310, a third soft decision value signal 2311, and a fourth soft decision value signal 2312.

A modulated signal C demodulation section 2313 has first soft decision value signal 2309, second soft decision value signal 2310, third soft decision value signal 2311, fourth soft decision value signal 2312, modulated signal A received digital signal 524, modulated signal B received digital signal 525, and frame synchronization signal 522 as input, and outputs modulated signal C received digital signal 1817.

Next, the operation of demodulation section 1820 when transmit signals with the frame configurations in FIG. 22 are received will be described. Using modulated signals at times i, i+1, i+2, and i+3 in the frame configurations in FIG. 22, modulated signal A demodulation section 2301 outputs modulated signal A received digital signal 524 by demodulating modulated signal A, and outputs the time i soft decision value signal as first soft decision value signal 2303, the time i+1 soft decision value signal as second soft decision value signal 2304, the time i+2 soft decision value signal as third soft decision value signal 2305, and the time i+3 soft decision value signal as fourth soft decision value signal 2306.

Then modulated signal B demodulation section 2307 has first soft decision value signal 2303, second soft decision value signal 2304, third soft decision value signal 2305, fourth soft decision value signal 2306, and modulated signal A received digital signal 524 as input, and employing the modulated signal A received digital signal 524 result and using first soft decision value signal 2303 and second soft decision value signal 2304, demodulates information S2(i) and S2(i)' transmitted at times i and i+1 of modulated signal B in FIG. 22. Also, employing the modulated signal A received digital signal 524 result and using third soft decision value signal 2305 and fourth soft decision value signal 2306, modulated signal B demodulation section 2307 demodulates information S2(i+2) and S2(i+2)' transmitted at times i+2 and i+3 of modulated signal B in FIG. 22. Then modulated signal B demodulation section 2307 outputs these demodulation results as modulated signal B received digital signal 525.

Modulated signal C demodulation section 2313 has first soft decision value signal 2309, second soft decision value signal 2310, third soft decision value signal 2311, fourth soft decision value signal 2312, modulated signal A received digital signal 524, and modulated signal B received digital signal 525 as input, and employing modulated signal A received digital signal 524 and modulated signal B received digital signal 525, and using first soft decision value signal 2309, demodulates information S3(i) of modulated signal C transmitted at time i. Similarly, employing modulated signal A received digital signal 524 and modulated signal B received digital signal 525, and using second soft decision value signal 2310, modulated signal C demodulation section 2313 demodulates information S3(i+1) transmitted in modulated signal C of time i+1. Similarly, employing modulated signal A received digital signal 524 and modulated signal B received digital signal 525, and using third soft decision value signal 2311, modulated signal C demodulation section 2313 demodulates information S3(i+2) transmitted in modulated signal C of time i+2. Similarly, employing modulated signal A received digital signal 524 and modulated signal B received digital signal 525, and using fourth soft decision value signal 2312, modulated signal C demodulation section 2313 demodulates information S3(i+3) transmitted in modulated signal C of time i+3.

Thus, by transmitting modulated signals with the same data a plurality of times in modulated signal A and modulated signal B, and making the number of times the same data is transmitted in modulated signal A greater than the number of times the same data is transmitted in modulated signal B, demodulated data with good error rate performances can be obtained for all of modulated signals A, B, and C on the receiving side by first performing demodulation of modulated signal A, then performing demodulation of modulated signal B based on the modulated signal A demodulation result, and then performing modulated signal C demodulation based on the modulated signal A and modulated signal B demodulation results. Also, error rate performances can be improved while maintaining a higher data transmission speed than when space-time block coding is used.

(2-4) Variant Example 4

Figure 25:
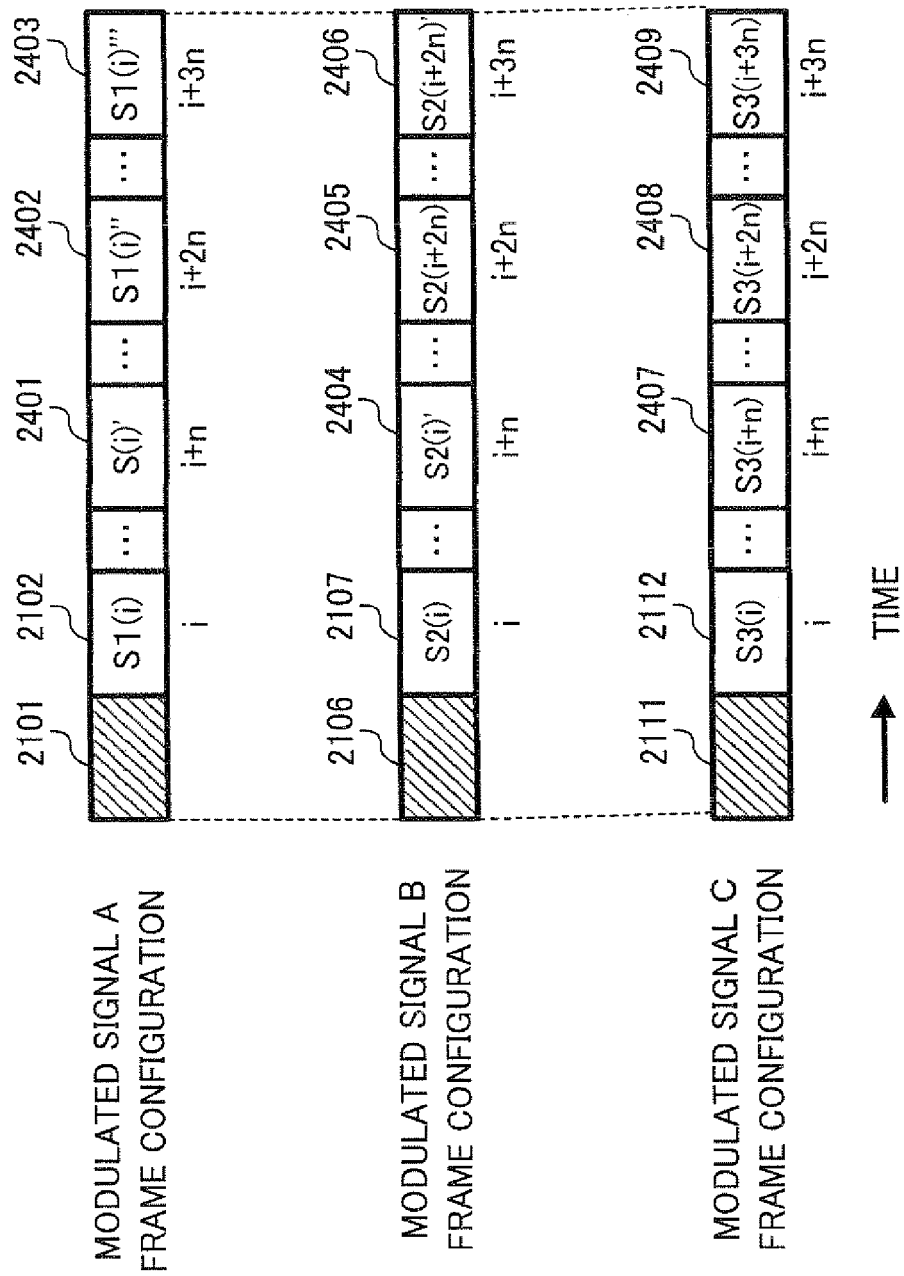
FIG. 25 is a drawing showing sample frame configurations of modulated signals according to Embodiment 2.

Here, it is proposed that the frame configurations transmitted by transmitting apparatus 1700 be as shown in FIG. 25. In FIG. 25, parts corresponding to those in FIG. 22 are assigned the same codes as in FIG. 22. The difference between the frame configurations in FIG. 25 and the frame configurations in FIG. 22 is that, in the frame configurations in FIG. 22 modulated symbols of the same data are transmitted at time 1 intervals, whereas in the frame configurations in FIG. 25 modulated symbols of the same data are transmitted at time n intervals.

Here, if n is such that the relationships $h11(i) \approx h11(i+n) \approx h11(i+2n) \approx h11(i+3n)$, $h12(i) \approx h12(i+n) \approx h12(i+2n) \approx h12(i+3n)$, $h13(i) \approx h13(i+n) \approx h13(i+2n) \approx h13(i+3n)$, $h21(i) \approx h21(i+n) \approx h21(i+2n) \approx h21(i+3n)$, $h22(i) \approx h22(i+n) \approx h22(i+2n) \approx h22(i+3n)$, $h23(i) \approx h23(i+n) \approx h23(i+2n) \approx h23(i+3n)$, $h31(i) \approx h31(i+n) \approx h31(i+2n) \approx h31(i+3n)$, $h32(i) \approx h32(i+n) \approx h32(i+2n) \approx h32(i+3n)$, and $h33(i) \approx h33(i+n) \approx h33(i+2n) \approx h33(i+3n)$ hold true, operations can be executed in the same way as when signals with the frame configurations in FIG. 22 are transmitted. That is to say, operations can be executed in the same way as in the description of frame configurations in FIG. 22, considering a FIG. 22 time i+1 operation as a FIG. 25 time i+n operation, a FIG. 22 time i+2 operation as a FIG. 25 time i+2n operation, and a FIG. 22 time i+3 operation as a FIG. 25 time i+3n operation.

(2-5) Variant Example 5

Figure 26:
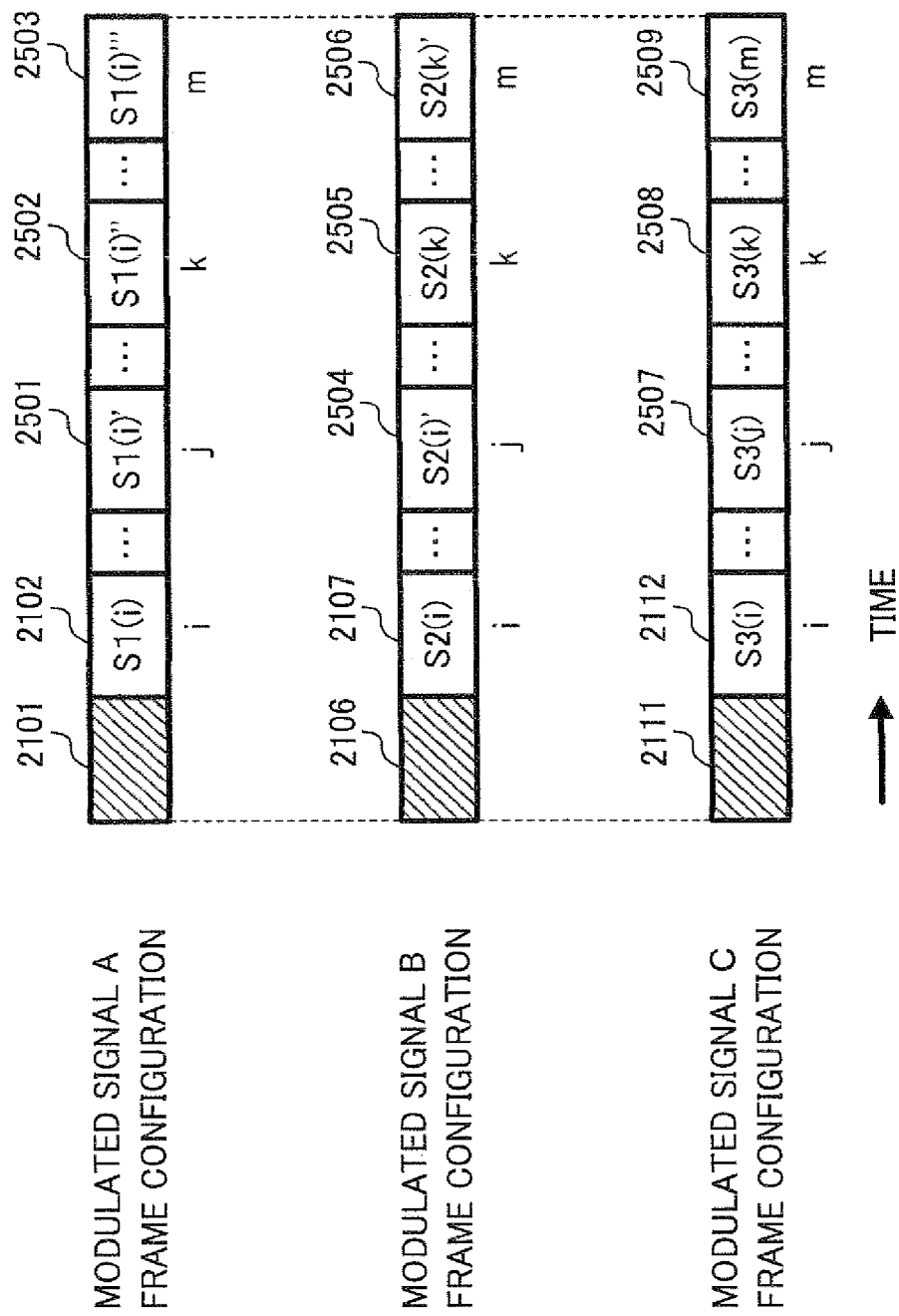
FIG. 26 is a drawing showing sample frame configurations of modulated signals according to Embodiment 2.

Here, it is proposed that the frame configurations transmitted by transmitting apparatus 1700 be as shown in FIG. 26. In FIG. 26, parts corresponding to those in FIG. 22 are assigned the same codes as in FIG. 22.

The difference between the frame configurations in FIG. 26 and the frame configurations in FIG. 22 is that, in the frame configurations in FIG. 22 modulated symbols of the same data are transmitted at time 1 intervals, whereas in the frame configurations in FIG. 26 modulated symbols of the same data are transmitted at times i, j, k, and m.

Here, the following relationships hold true: $h11(i) \neq h11(j) \neq h11(k) \neq h11(m)$, $h12(i) \neq h12(j) \neq h12(k) \neq h12(m)$, $h13(i) \neq h13(j) \neq h13(k) \neq h13(m)$, $h21(i) \neq h21(j) \neq h21(k) \neq h21(m)$, $h22(i) \neq h22(j) \neq h22(k) \neq h22(m)$, $h23(i) \neq h23(j) \neq h23(k) \neq h23(m)$, $h31(i) \neq h31(j) \neq h31(k) \neq h31(m)$, $h32(i) \neq h32(j) \neq h32(k) \neq h32(m)$, $h33(i) \neq h33(j) \neq h33(k) \neq h33(m)$.

Operations can be executed in the same way as in the description of frame configurations in FIG. 22, considering a FIG. 22 time i+1 operation as a FIG. 26 time j operation, a FIG. 22 time i+2 operation as a FIG. 26 time k operation, and a FIG. 22 time i+3 operation as a FIG. 26 time m operation. However, in the frame configurations in FIG. 26, symbols for estimating the time j radio wave propagation environment are necessary separately from radio wave propagation environment estimation symbols 2101, 2106, and 2111. Similarly, symbols for estimating the time k radio wave propagation environment are necessary separately from radio wave propagation environment estimation symbols 2101, 2106, and 2111, and symbols for estimating the time m radio wave propagation environment are necessary separately from radio wave propagation environment estimation symbols 2101, 2106, and 2111.

(2-6) Variant Example 6

In this embodiment, the modulated signal A and B modulation method has been described as QPSK. Below, setting methods of modulation methods suitable for forming modulated signals A and B are considered.

For example, if 16QAM is used as the modulation method for modulated signals A and B, the density of signal points in the I-Q plane increases, making it difficult to produce great changes in Euclidian distances even if phase rotation is effected, with the result that significant improvements in reception quality cannot be expected.

A possible means of solving this problem—that is, effecting phase rotation and producing changes in Euclidian distances—is to use BPSK as the modulated signal A modulation method, and 8PSK, 16QAM, 64QAM, 128QAM, or 256QAM as the modulated signal B modulation method. An advantage of doing this is that signal points are arranged regularly in reception. It is all the more desirable if the modulated signal A transmission power and modulated signal B transmission power are set to suitable values.

Some examples are given below. When modulated signal A is a QPSK signal and modulated signal B is a 16QAM signal, a suitable setting would be modulated signal A transmission power:modulated signal B transmission power=2:10.

When modulated signal A is a QPSK signal and modulated signal B is a 64QAM signal, a suitable setting would be modulated signal A transmission power:modulated signal B transmission power=2:42.

When modulated signal A is a BPSK signal and modulated signal B is a 16QAM signal, a suitable setting would be modulated signal A transmission power:modulated signal B transmission power=1:10.

When modulated signal A is a BPSK signal and modulated signal B is a 64QAM signal, a suitable setting would be modulated signal A transmission power:modulated signal B transmission power=1:42.

(2-7) Variant Example 7

Transmitting apparatus configurations are not limited to the configurations in FIG. 18 and FIG. 23. Also, the receiving apparatus configuration is not limited to the configuration in FIG. 19, and demodulation section configurations are not limited to the configurations in FIG. 20 and FIG. 24.

In this embodiment, frame configurations for transmitting three kinds of modulated signals, A, B, and C, have been described, but the present invention can be similarly implemented if n (n≥4) different modulated signals are transmitted Essentially, the same kind of effect as in this embodiment can be obtained as long as there is a modulated signal that transmits data a plurality of times among n kinds of modulated signal.

Frame configurations are not limited to those shown in FIG. 15, FIG. 16, FIG. 21, FIG. 22, FIG. 25, and FIG. 26, and the same kind of effect can be obtained as long as the same data is transmitted a plurality of times, changing the signal point arrangement mode. In this embodiment, also, a frame configuration whereby the same data is transmitted twice in modulated signal A and a frame configuration whereby the same data is transmitted four times in modulated signal A have been described with a frame configuration whereby the same data is transmitted twice in modulated signal B, but frame configurations are not limited to these, and the present invention can also be similarly implemented with frame configurations whereby the same data is transmitted n (n≥4) times in modulated signals A and B. Here, as the value of n increases, the apparent data transmission speed at which transmission is possible with modulated signals A and B declines, but error rate performances when modulated signals A, B, and C are demodulated improve, and therefore making n larger the poorer the radio wave propagation environment enables the effective data transmission speed to be increased.

In this embodiment, coding of modulated signal A, modulated signal B, and modulated signal C is performed with respect to the time axis direction. That is to say, in the examples in this embodiment, modulated signals of the same data are transmitted at different times in modulated signal A. However, the coding of this embodiment can be performed in the frequency axis direction, especially when using a multicarrier system of which OFDM is an example. That is to say, modulated signal A could have a plurality of identical data symbols placed on different carriers.

In this embodiment, improving the reception quality of modulated signal A also improves the reception quality of modulated signal B and modulated signal C.っている。

In addition, improving the reception quality of modulated signal B also improves the reception quality of modulated signal C. If, in addition to this embodiment, block coding, convolutional coding such as Viterbi coding or turbo coding, or coding such as LDPC coding, is executed on modulated signals A and B, the reception quality of modulated signals A and B can be further improved, enabling the reception quality of modulated signal C also to be further improved.

Block coding, convolutional coding such as Viterbi coding or turbo coding, and error correction coding such as LDPC coding, are not limited to execution on modulated signals A and B only, but may be executed for all of modulated signals A, B, and C. In this case, modulated signals B and C are demodulated after demodulation of modulated signal A.

(3) Embodiment 3

In this embodiment, a case is described in which Embodiment 1, Embodiment 2, and OFDM are combined.

Figure 27:
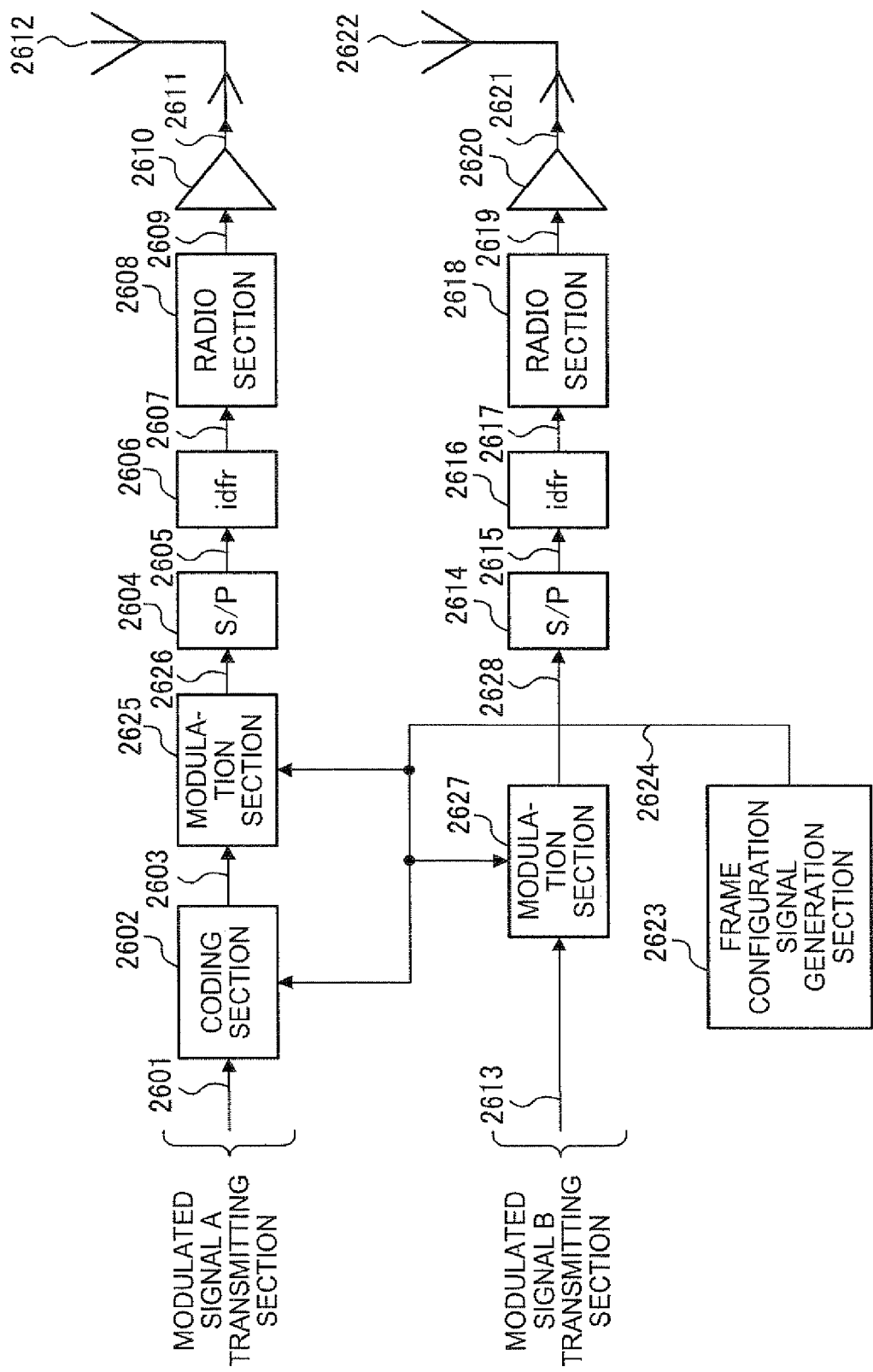
FIG. 27 is a block diagram showing a sample configuration of a transmitting apparatus according to Embodiment 3.

FIG. 27 shows a sample configuration of a transmitting apparatus according to this embodiment. A coding section 2602 has a modulated signal A transmit digital signal 2601 and frame configuration signal 2624 as input, and outputs a post-coding transmit digital signal 2603. A modulation section 2625 has post-coding transmit digital signal 2603 and frame configuration signal 2624 as input, and outputs a transmit quadrature baseband signal 2626 in accordance with frame configuration signal 2624. A serial/parallel conversion section 2604 has transmit orthogonal baseband signal 2626 and frame configuration signal 2624 as input, and outputs a parallel signal 2605. An inverse Fourier transform section 2606 has parallel signal 2605 as input, and outputs a post-inverse-Fourier-transform signal 2607. A radio section 2608 converts post-inverse-Fourier-transform signal 2607 from baseband frequency to radio frequency, and outputs a post-conversion modulated signal 2609. A power amplifier 2610 amplifies the power of modulated signal 2609, and outputs a post-amplification modulated signal 2611. Modulated signal 2611 is output from an antenna 2612 as a radio wave.

A modulation section 2627 has a modulated signal B transmit digital signal 2613 and frame configuration signal 2624 as input, and outputs a transmit quadrature baseband signal 2628. A serial/parallel conversion section 2614 has transmit quadrature baseband signal 2628 as input, and outputs a parallel signal 2615. An inverse Fourier transform section 2616 has parallel signal 2615 as input, and outputs a post-inverse-Fourier-transform signal 2617. A radio section 2618 converts post-inverse-Fourier-transform signal 2617 from baseband frequency to radio frequency, and outputs a post-conversion modulated signal 2619 fixes the power of modulated signal 2619, and outputs a post-amplification modulated signal 2621. Modulated signal 2621 is output from an antenna 2622 as a radio wave.

Figure 28:
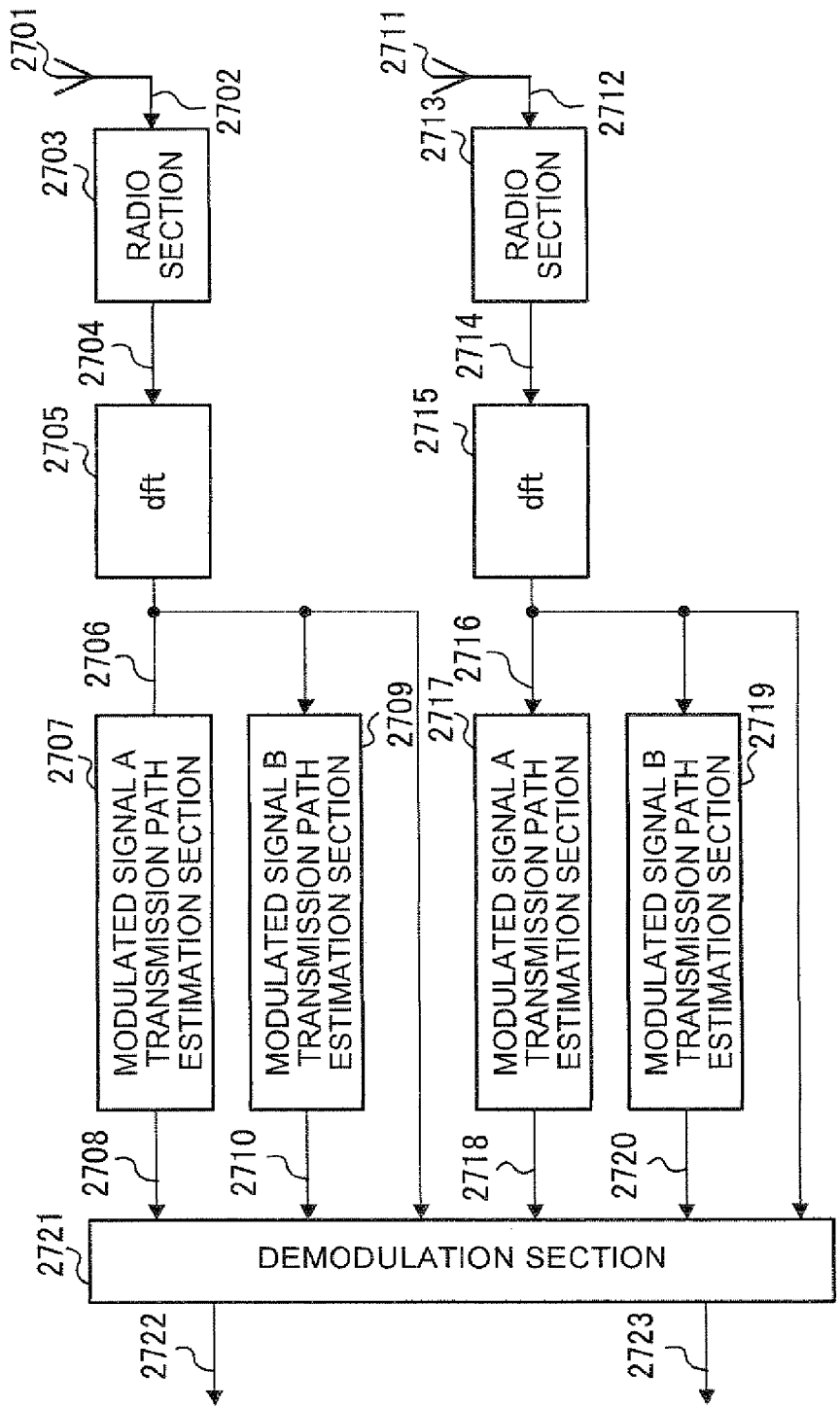
FIG. 28 is a block diagram showing a sample configuration of a receiving apparatus according to Embodiment 3.

FIG. 28 shows a sample configuration of a receiving apparatus according to this embodiment. A radio section 2703 has a received signal 2702 received by an antenna 2701 as input, and outputs a received quadrature baseband signal 2704. A Fourier transform section 2705 has received quadrature baseband signal 2704 as input, and outputs a post-Fourier-transform signal 2706.

A modulated signal A transmission path estimation section 2707 has post-Fourier-transform signal 2706 as input, and outputs a modulated signal A transmission path estimation signal group 2708. A modulated signal B transmission path estimation section 2709 has post-Fourier-transform signal 2706 as input, and outputs a modulated signal B transmission path estimation signal group 2710.

A radio section 2713 has a received signal 2712 received by an antenna 2711 as input, and outputs a received quadrature baseband signal 2714. A Fourier transform section 2715 has received quadrature baseband signal 2714 as input, and outputs a post-Fourier-transform signal 2716.

A modulated signal A transmission path estimation section 2717 has post-Fourier-transform signal 2716 as input, and outputs a modulated signal A transmission path estimation signal group 2718. A modulated signal B transmission path estimation section 2719 has post-Fourier-transform signal 2716 as input, and outputs a modulated signal B transmission path estimation signal group 2720.

A demodulation section 2721 has modulated signal A transmission path estimation signal groups 2708 and 2718, modulated signal B transmission path estimation signal groups 2710 and 2720, and post-Fourier-transform signals 2706 and 2716 as input, and outputs a modulated signal A received digital signal 2722 and modulated signal B received digital signal 2723.

Figure 29A:
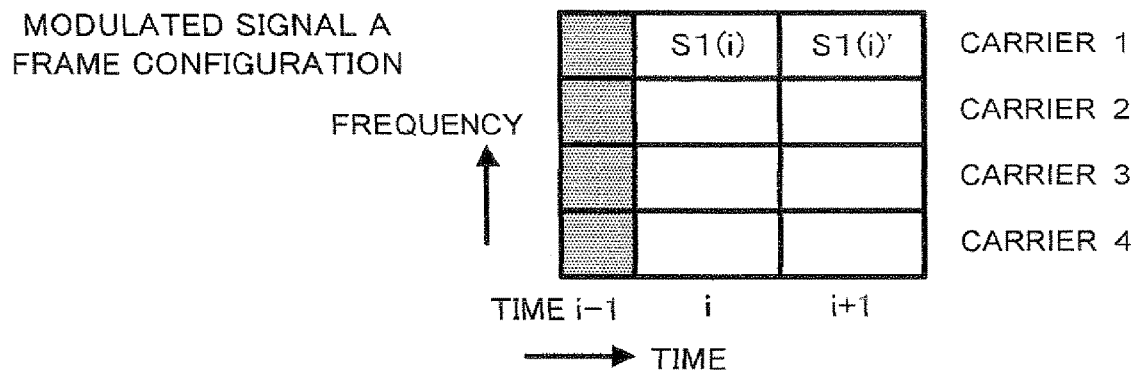
FIG. 29A and FIG. 29B are drawings showing sample frame configurations of modulated signals according to Embodiment 1.
Figure 29B:
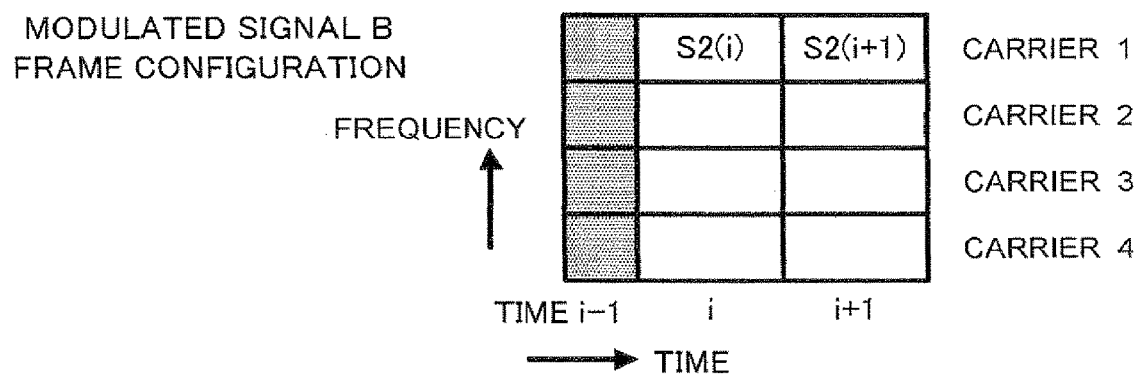

FIG. 29A and FIG. 29B show sample frame configurations according to this embodiment, in which reference code 2801 denotes radio wave propagation environment estimation symbols and reference code 2802 denotes data symbols, coded in the time axis direction. Modulated signal A is coded across times i and i+1 in carrier 1. Modulated signal B is coded across times i and i+1 in carrier 1.

Modulated signal A transmits S1(i) at time i and S1(i)' at time i+1 in carrier 1. Above-mentioned S1(i) and S1(i)' are modulated symbols formed by changing the signal point arrangement of the same data.

Modulated signal B transmits S2(i) at time i and S2(i+1) at time i+1 in carrier 1. S2(i) and S2(i+1) are modulated symbols formed from different data.

Figure 30A:
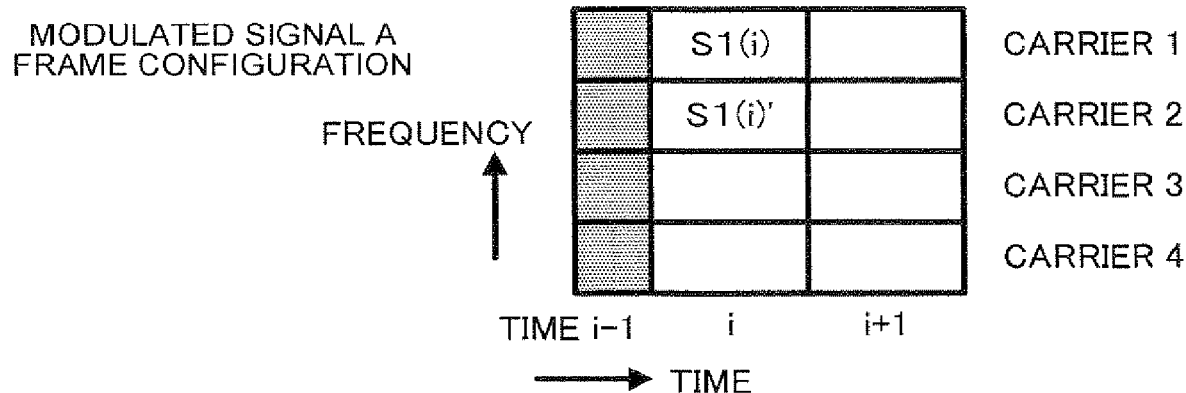
FIG. 30A and FIG. 30B are drawings showing sample frame configurations of modulated signals according to Embodiment 3.
Figure 30B:
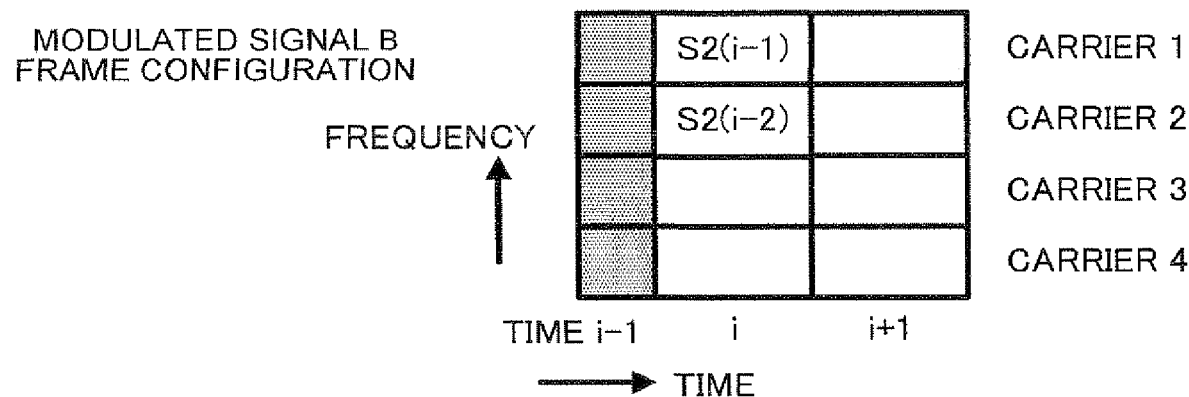

FIG. 30A and FIG. 30B show other sample frame configurations according to this embodiment, with parts identical to those in FIG. 29A and FIG. 29B assigned the same codes as in FIG. 29A and FIG. 29B. In the case shown in FIG. 30A and FIG. 30B, modulated symbols are coded in the frequency axis direction. Modulated signal A is coded across carrier 1 and carrier 2 at time i. Modulated signal B is coded across carrier 1 and carrier 2 at time i.

Modulated signal A transmits S1(i) in carrier 1 and S1(i)' in carrier 2 at time i.

Modulated signal B transmits S2(i−1) in carrier 1 and S2(i−2) in carrier 2 at time i. Here, S2(i−1) and S2(i−2) are modulated symbols formed from different data.

Figure 31A:
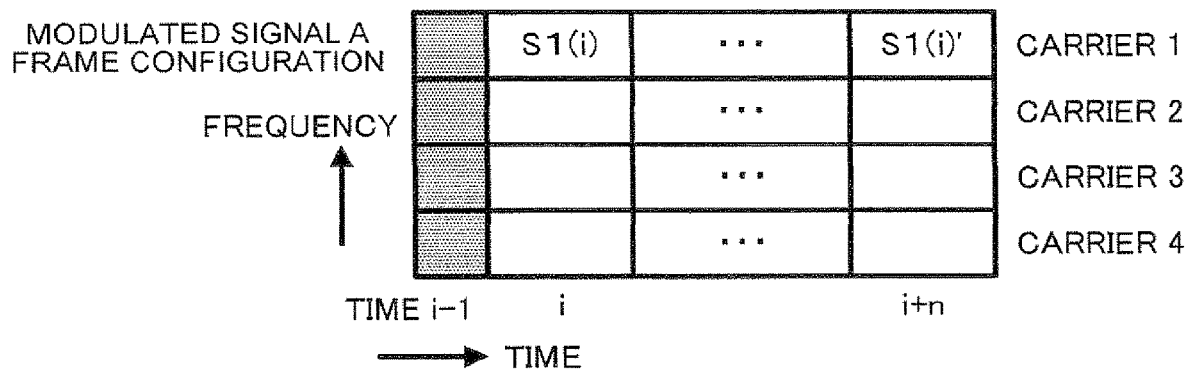
FIG. 31A and FIG. 31B are drawings showing sample frame configurations of modulated signals according to Embodiment 3.
Figure 31B:
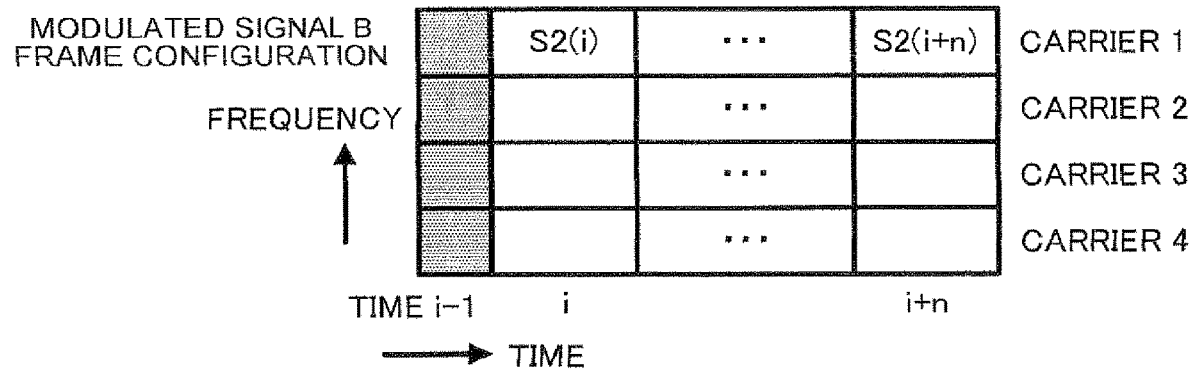

FIG. 31A and FIG. 31B show other sample frame configurations according to this embodiment, with parts identical to those in FIG. 29A and FIG. 29B assigned the same codes as in FIG. 29A and FIG. 29B. In the case shown in FIG. 31A and FIG. 31B, modulated symbols are coded in the time axis direction. Modulated signal A is coded at time i and time i+n in carrier Modulated signal B is coded at time i and time i+n in carrier 1.

Modulated signal A transmits S1(i) at time i and S1(i)' at time i+n in carrier 1. Modulated signal B transmits S2(i) at time i and S2(i+1) at time i+n in carrier 1.

Figure 32A:
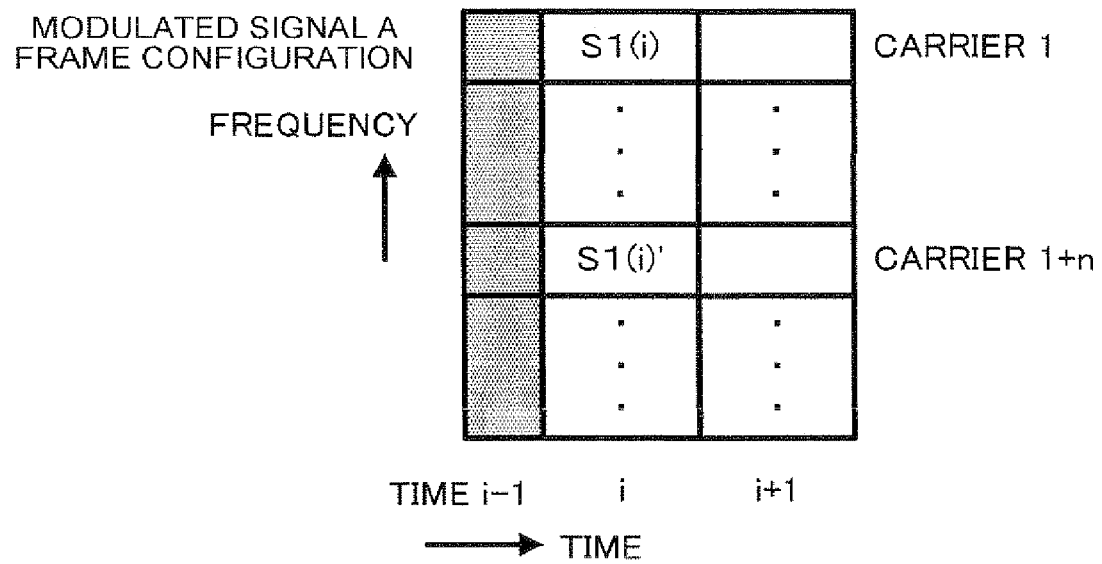
FIG. 32A and FIG. 32B are drawings showing sample frame configurations of modulated signals according to Embodiment 3.
Figure 32B:
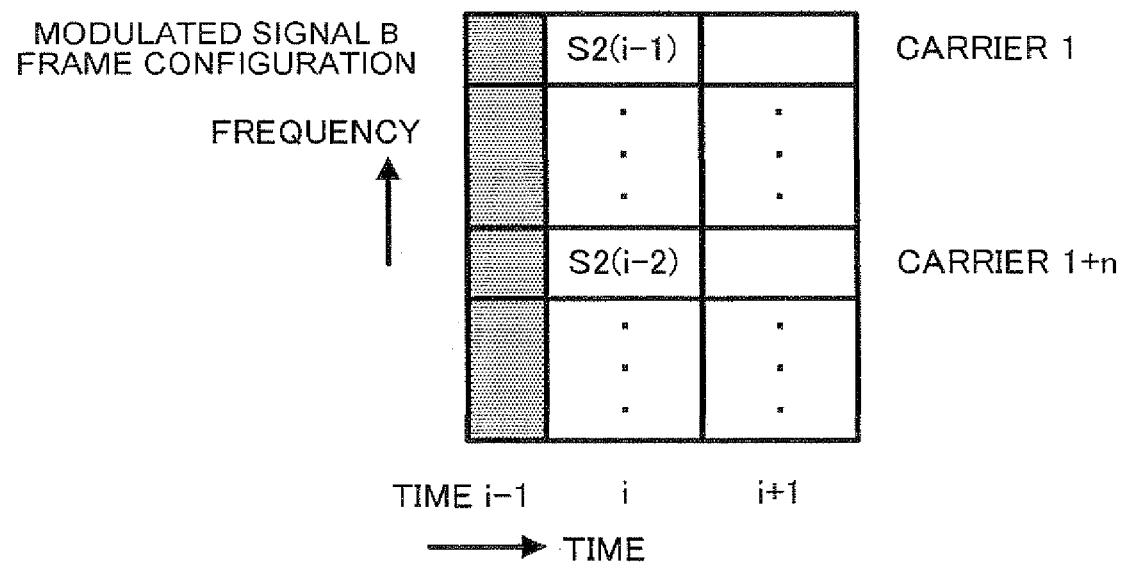

FIG. 32A and FIG. 32B show other sample frame configurations according to this embodiment, with parts identical to those in FIG. 29A and FIG. 29B assigned the same codes as in FIG. 29A and FIG. 29B. In the case shown in FIG. 32A and FIG. 32B, modulated symbols are coded in the frequency axis direction Modulated signal A is coded in carrier 1 and carrier 1+n at time I Modulated signal B is coded in carrier 1 and carrier 1+n at time i.

Modulated signal A transmits S1(i) in carrier 1 and S1(i)' in carrier 1+n at time i. Modulated signal B transmits S2(i−1) in carrier 1 and S2(i−2) in carrier 1+n at time i.

Figure 33A:
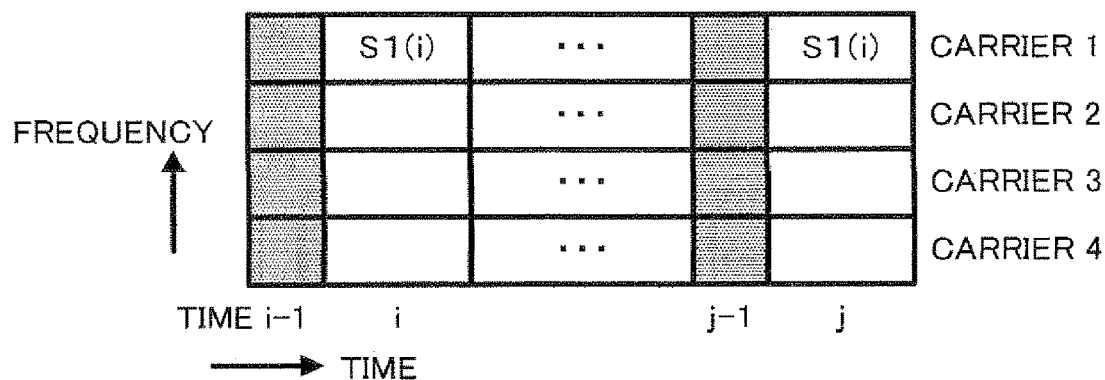
FIG. 33A and FIG. 33B are drawings showing sample frame configurations of modulated signals according to Embodiment 3.
Figure 33B:
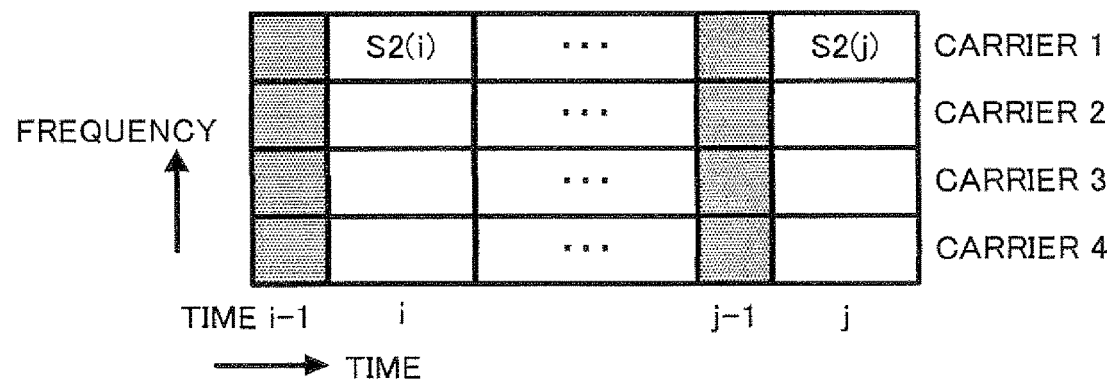

FIG. 33A and FIG. 33B show other sample frame configurations according to this embodiment, with parts identical to those in FIG. 29A and FIG. 29B assigned the same codes as in FIG. 29A and FIG. 29B. In the case shown in FIG. 33A and FIG. 33B, modulated symbols are coded in the time axis direction. Modulated signal A is coded at time i and time j in carrier 1. Modulated signal B is coded at time i and time j in carrier 1.

Modulated signal A transmits S1(i) at time i and S1(i)' at time j in carrier 1. Modulated signal B transmits S2(i−1) at time i and S2(i+n) at time j in carrier 1.

Figure 34A:
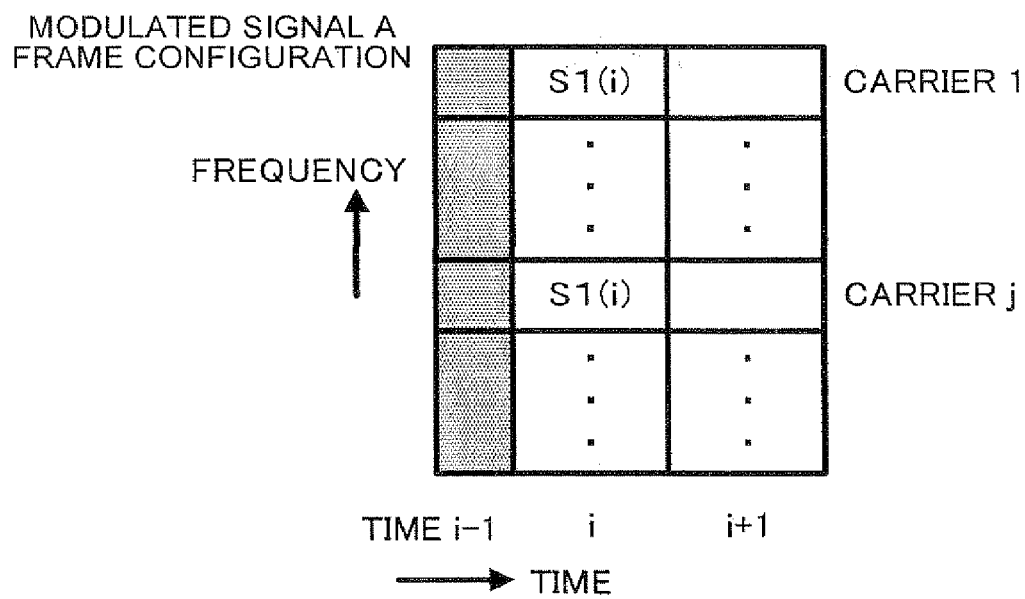
FIG. 34A and FIG. 34B are drawings showing sample frame configurations of modulated signals according to Embodiment 3.
Figure 34B:
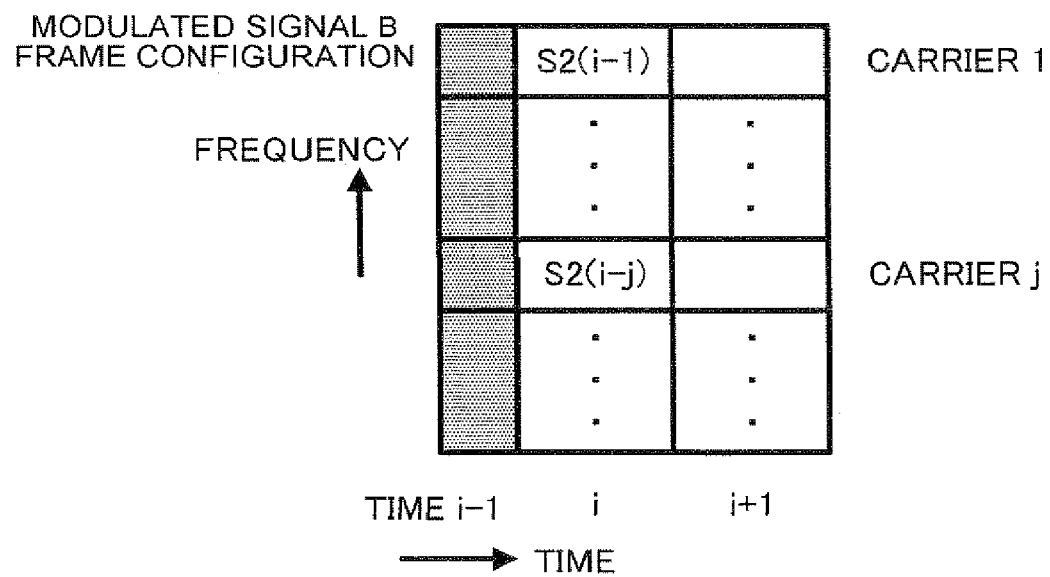

FIG. 34A and FIG. 34B show other sample frame configurations according to this embodiment, with parts identical to those in FIG. 29A and FIG. 29B assigned the same codes as in FIG. 29A and FIG. 29B. In the case shown in FIG. 34A and FIG. 34B, modulated symbols are coded in the frequency axis direction. Modulated signal A is coded in carrier 1 and carrier j at time i. Modulated signal B is coded in carrier 1 and carrier j at time i.

Modulated signal A transmits S1(i) in carrier 1 and S1(i)' in carrier j at time i.

Modulated signal B transmits S2(i−1) in carrier 1 and S2(i−j) in carrier j at time i.

Figure 35A:
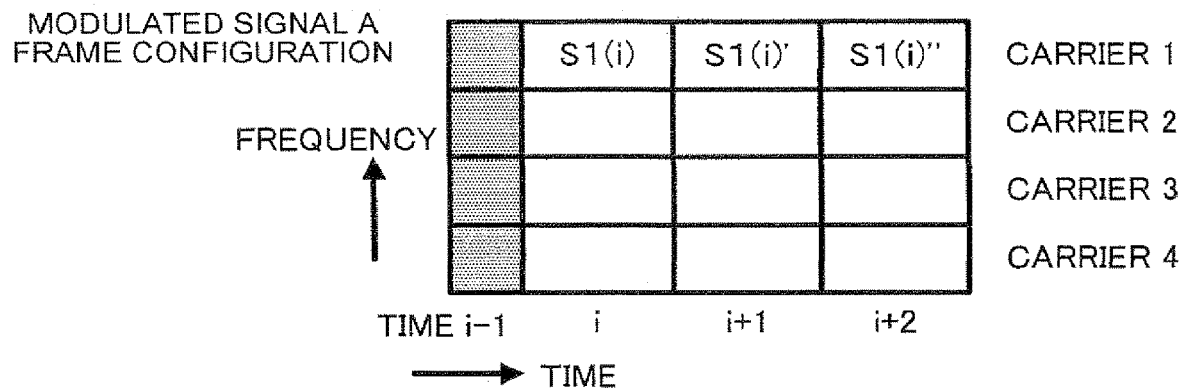
FIG. 35A and FIG. 35B are drawings showing sample frame configurations of modulated signals according to Embodiment 3.
Figure 35B:
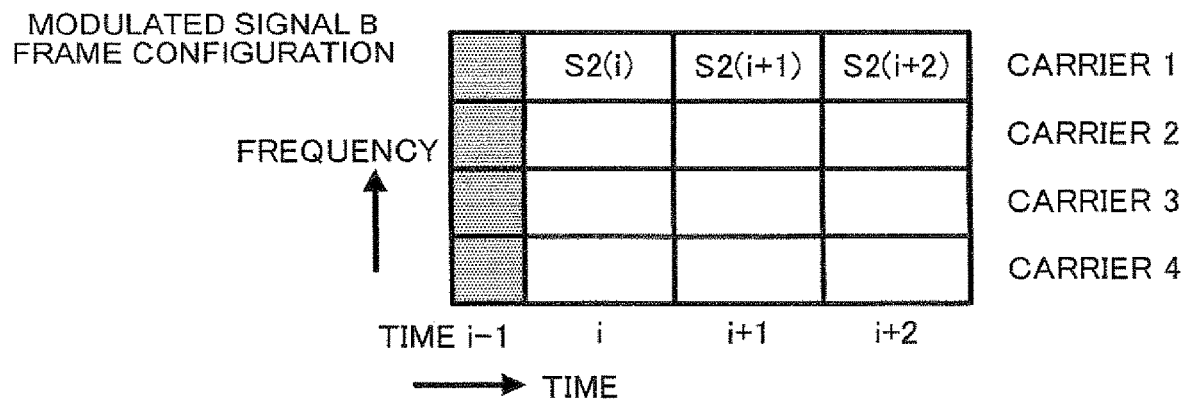

FIG. 35A and FIG. 35B show other sample frame configurations according to this embodiment, with parts identical to those in FIG. 29A and FIG. 29B assigned the same codes as in FIG. 29A and FIG. 29B. Modulated signal A is coded at time i, time i+1, and time i+2 in carrier 1. Modulated signal B is coded at time i, time i+1, and time i+2 in carrier 1.

Modulated signal A transmits S1(i) at time i, transmits and S1(i)' at time i+1, and transmits S1(i)" at time i+2, in carrier 1. Here, S1(i), S1(i)', and S1(i)" are modulated symbols formed by changing the signal point arrangement of the same data. S2(i+1) at time i+1, and transmits and S2(i+2) at time i+2, in carrier 1. Here, S2(i), S2(i+1), and S2(i+2) are obtained by demodulating different data.

Figure 36A:
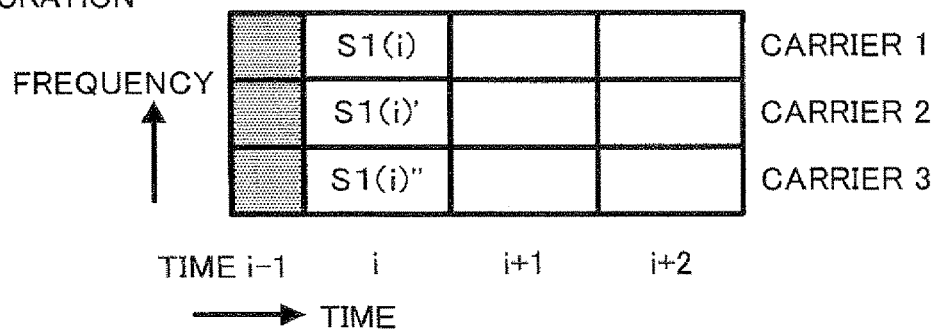
FIG. 36A and FIG. 36B are drawings showing sample frame configurations of modulated signals according to Embodiment 3.
Figure 36B:
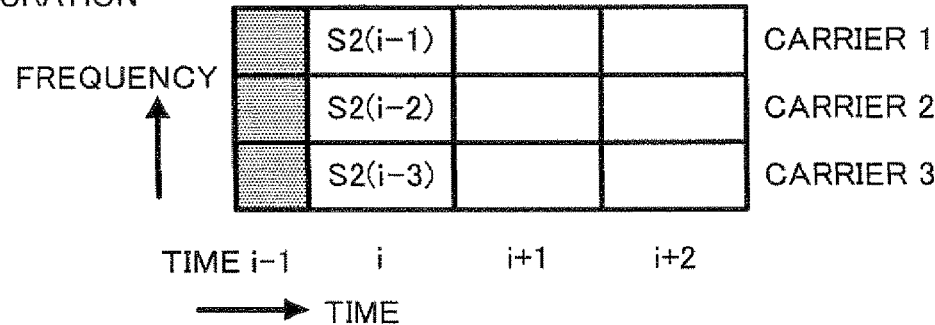

FIG. 36A and FIG. 36B show other sample frame configurations according to this embodiment, with parts identical to those in FIG. 29A and FIG. 29B assigned the same codes as in FIG. 29A and FIG. 29B. Modulated signal A is coded in carrier 1, carrier 2, and carrier 3 at time i. Modulated signal B is coded in carrier 1, carrier 2, and carrier 3 at time i.

Modulated signal A transmits S1(i) in carrier 1, transmits S1(i)' in carrier 2, and transmits S1(i)" in carrier 3, at time i. Modulated signal B transmits S2(i−1) in carrier 1, transmits S2(i−2) in carrier 2, and transmits S2(i−3) in carrier 3, at time i.

FIG. 37A and FIG. 37B show other sample frame configurations according to this embodiment, with parts identical to those in FIG. 29A and FIG. 29B assigned the same codes as in FIG. 29A and FIG. 29B. Modulated signal A transmits the same data by means of symbols S1(i), S1(i)', and S1(i)" with different signal point arrangements at time i, time j, and time k, in carrier 1 (the same signal point arrangements may also be used). Modulated signal B transmits different data by means of symbols S1(i), S2(j), and S2(k) at time i, time j, and time k, in carrier 1.

Figure 38A:
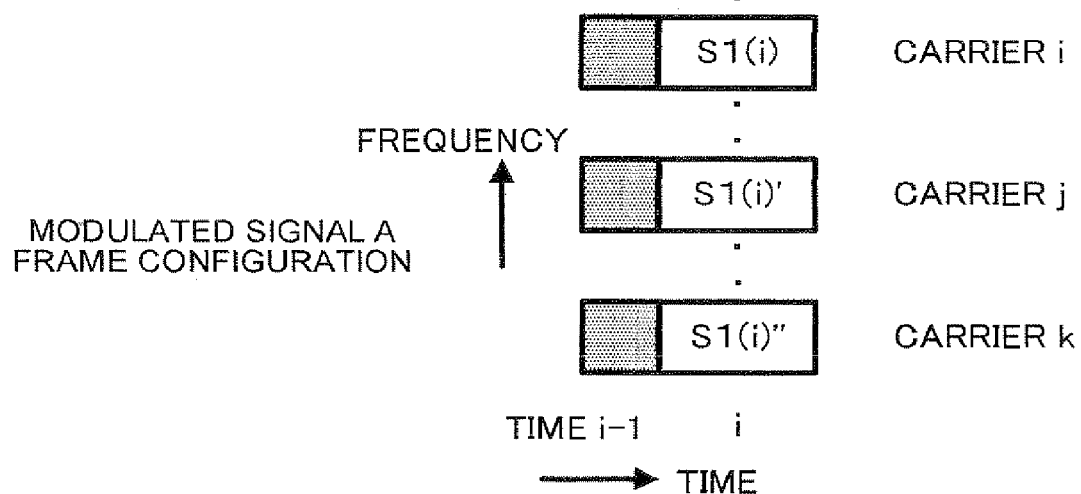
FIG. 38A and FIG. 38B are drawings showing sample frame configurations of modulated signals according to Embodiment 3.
Figure 38B:
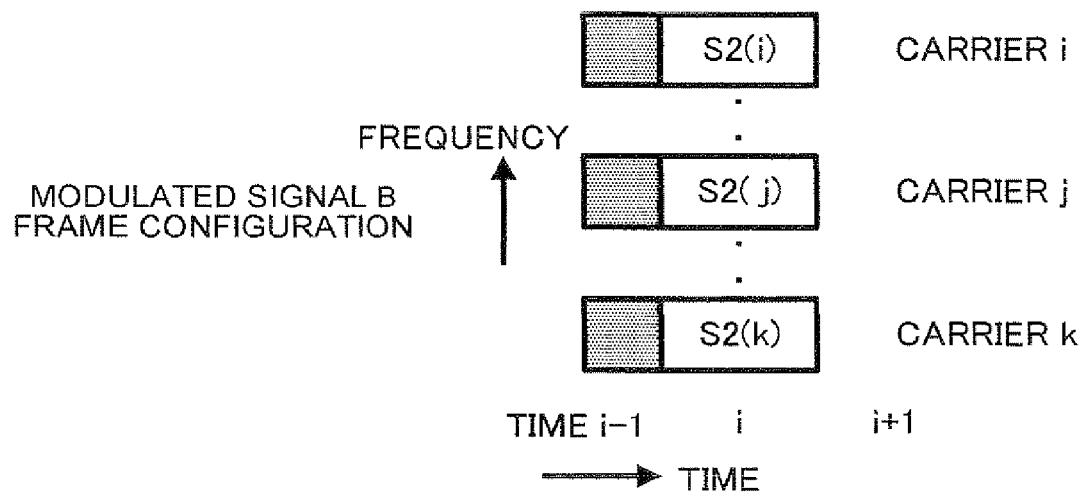

FIG. 38A and FIG. 38B show other sample frame configurations according to this embodiment, with parts identical to those in FIG. 29A and FIG. 29B assigned the same codes as in FIG. 29A and FIG. 29B. Modulated signal A transmits the same data by means of symbols S1(i), S1(i)', and S1(i)" with different signal point arrangements in carrier i, carrier j, and carrier k, at time i (the same signal point arrangements may also be used). Modulated signal B transmits different data by means of symbols S1(i), S2(j), and S2(k) in carrier i, carrier j, and carrier k, at time i.

FIG. 39A through FIG. 39C show other sample frame configurations according to this embodiment, with parts identical to those in FIG. 29A and FIG. 29B assigned the same codes as in FIG. 29A and FIG. 29B. Modulated signal A transmits the same data by means of symbols S1(i) and S1(i)' with different signal point arrangements at time i and time i+1 in carrier 1. Modulated signal B transmits different data by means of symbols S2(i) and S2(i+1) at time i and time i+1 in carrier 1. Modulated signal C transmits different data by means of symbols S3(i) and S3(i+1) at time i and time i+1 in carrier 1.

Figure 40A:
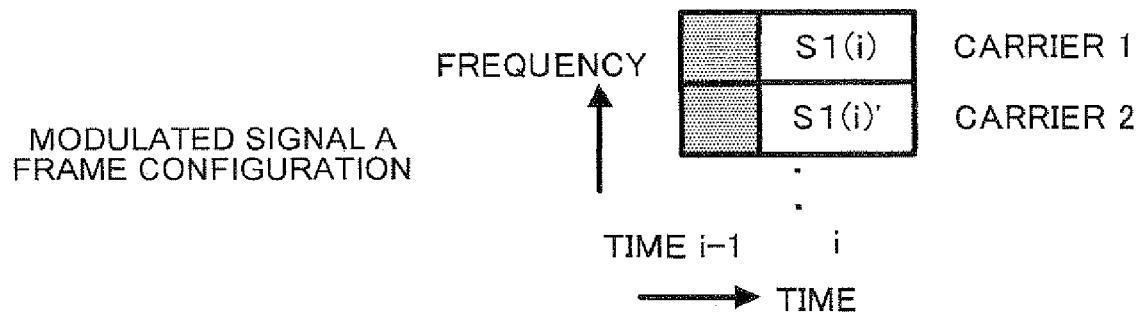
FIG. 40A through FIG. 40C are drawings showing sample frame configurations of modulated signals according to Embodiment 3.
Figure 40B:
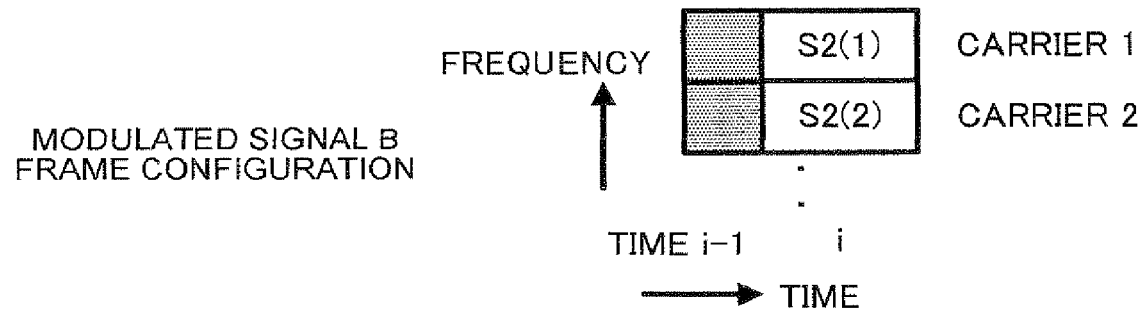
Figure 40C:
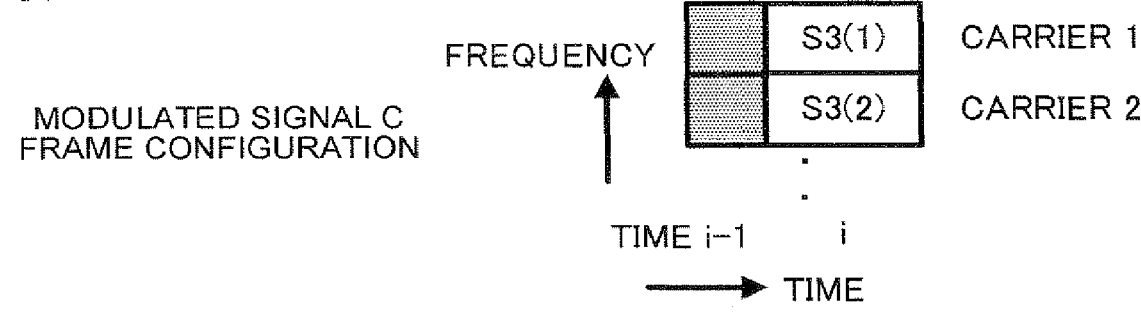

FIG. 40A through FIG. 40C show other sample frame configurations according to this embodiment, with parts identical to those in FIG. 29A and FIG. 29B assigned the same codes as in FIG. 29A and FIG. 29B. Modulated signal A transmits the same data by means of symbols S1(i) and S1(i)' with different signal point arrangements in carrier 1 and carrier 2 at time i. Modulated signal B transmits different data by means of symbols S2(1) and S2(2) in carrier 1 and carrier 2 at time i. Modulated signal C transmits different data by means of symbols S3(1) and S3(2) in carrier 1 and carrier 2 at time i.

Figure 41A:
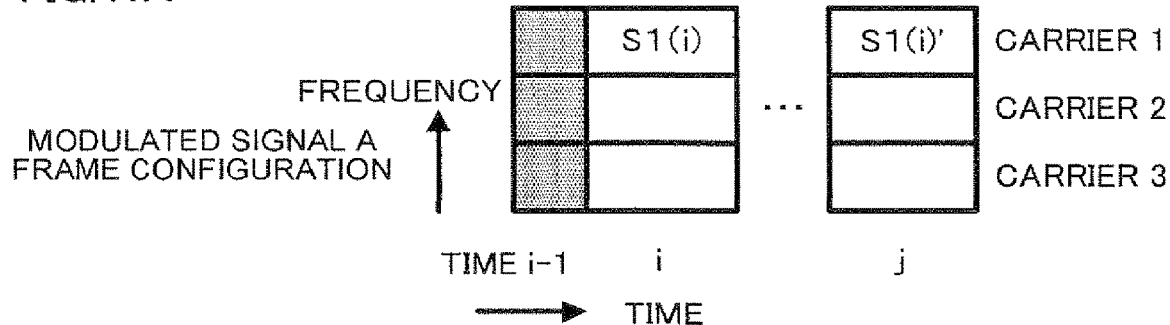
FIG. 41A through FIG. 41C are drawings showing sample frame configurations of modulated signals according to Embodiment 3.
Figure 41B:
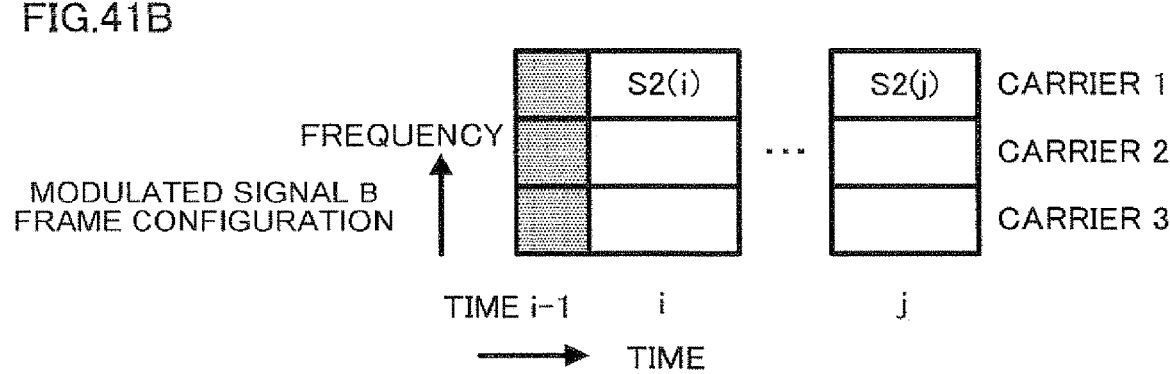
Figure 41C:
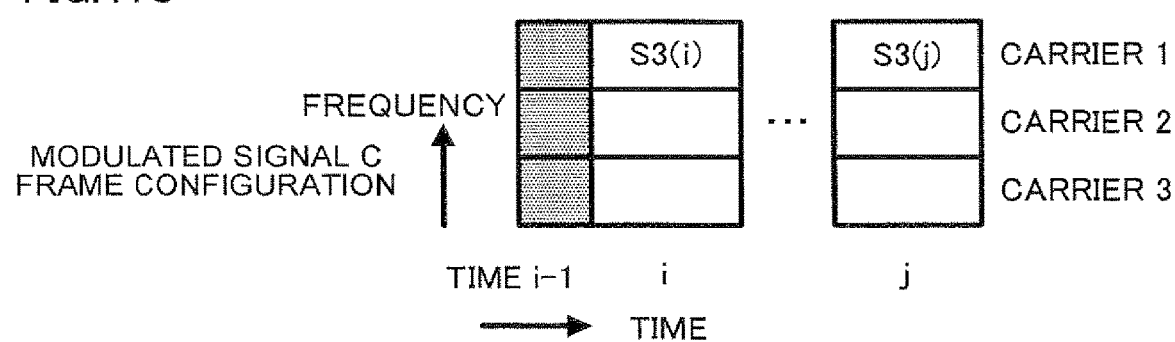

FIG. 41A through FIG. 41C show other sample frame configurations according to this embodiment, with parts identical to those in FIG. 29A and FIG. 29B assigned the same codes as in FIG. 29A and FIG. 29B. Modulated signal A transmits the same data by means of symbols S1(i) and S1(i)' with different signal point arrangements at time i and time j in carrier 1 (the same signal point arrangements may also be used). Modulated signal B transmits different data by means of symbols S2(i) and S2(j) at time i and time j in carrier 1. Modulated signal C transmits different data by means of symbols S3(i) and S3(j) at time i and time j in carrier 1.

FIG. 42A through FIG. 42C show other sample frame configurations according to this embodiment, with parts identical to those in FIG. 29A and FIG. 29B assigned the same codes as in FIG. 29A and FIG. 29B. Modulated signal A transmits the same data by means of symbols S1(i) and S1(i)' with different signal point arrangements in carrier i and carrier j at time i. Modulated signal B transmits different data by means of symbols S2(i) and S2(j) in carrier i and carrier j at time i. Modulated signal C transmits different data by means of symbols S3(i) and S3(j) in carrier i and carrier j at time i.

Figure 43A:
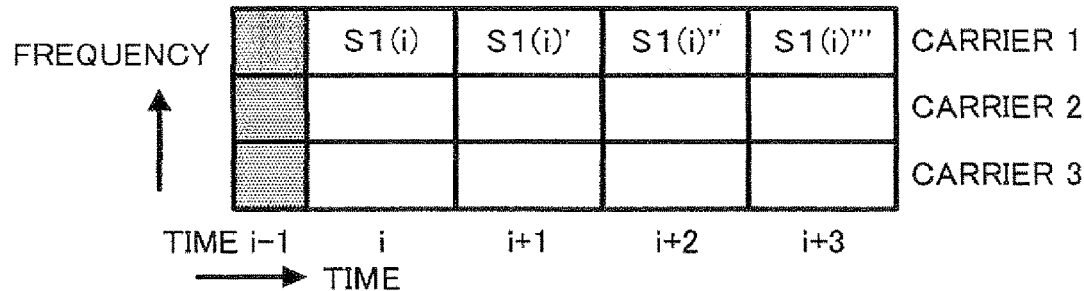
FIG. 43A through FIG. 43C are drawings showing sample frame configurations of modulated signals according to Embodiment 3.
Figure 43B:
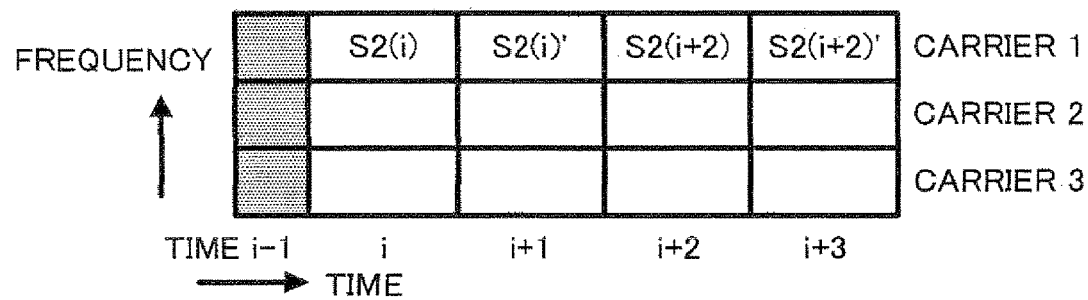
Figure 43C:
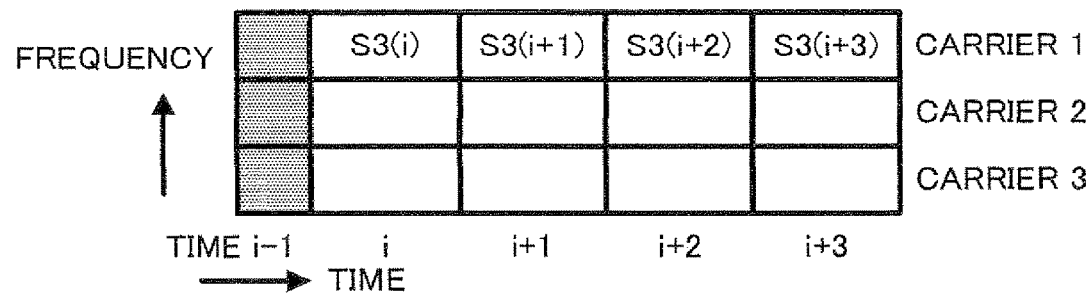

FIG. 43A through FIG. 43C show other sample frame configurations according to this embodiment, with parts identical to those in FIG. 29A and FIG. 29B assigned the same codes as in FIG. 29A and FIG. 29B. Modulated signal A transmits the same data by means of symbols S1(i), S1(i)', S1(i)", and S1(i)''', with different signal point arrangements at time i, time i+1, time i+2, and time i+3 in carrier 1. Modulated signal B transmits the same data by means of symbols S2(i) and S2(i)' with different signal point arrangements at time i and time i+1, and transmits the same data by means of symbols S2(i+2) and S2(i+2)' with different signal point arrangements at time i+2 and time i+3, in carrier 1. Modulated signal C transmits different data by means of symbols S3(i), S3(i+1), S3(i+2), and S3(i+3) at time i, time i+1, time i+2, and time i+3, in carrier 1.

Figure 44A:
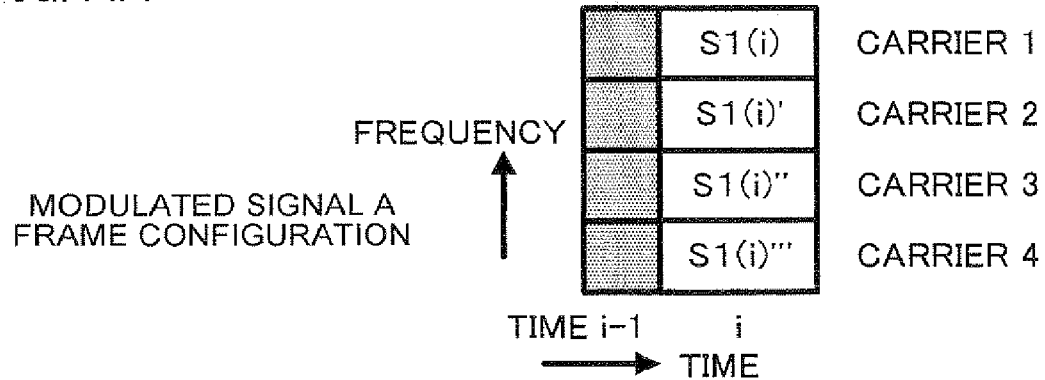
FIG. 44A through FIG. 44C are drawings showing sample frame configurations of modulated signals according to Embodiment 3.
Figure 44B:
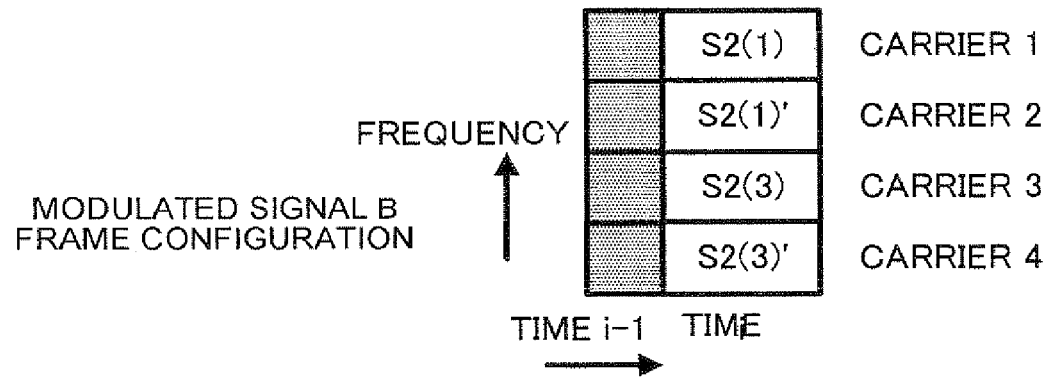
Figure 44C:
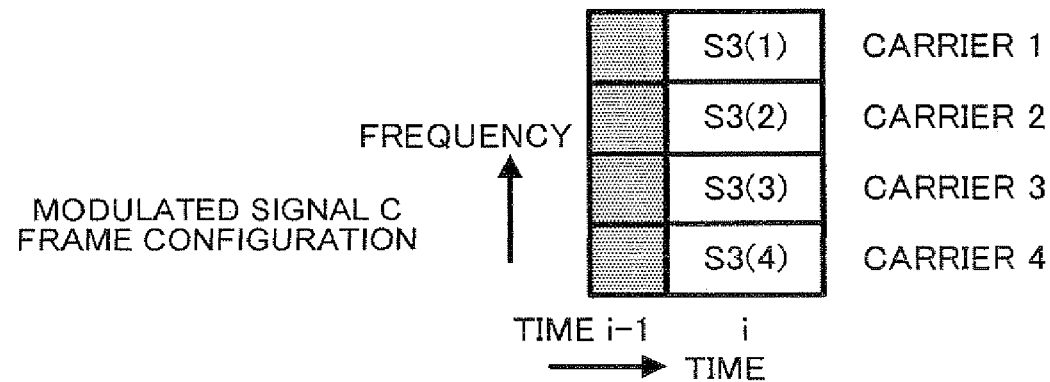

FIG. 44A through FIG. 44C show other sample frame configurations according to this embodiment, with parts identical to those in FIG. 29A and FIG. 29B assigned the same codes as in FIG. 29A and FIG. 29B. Modulated signal A transmits the same data by means of symbols S1(i), S1(i)', S1(i)", and S1(i)''', with different signal point arrangements in carrier 1, carrier 2, carrier 3, and carrier 4, at time i. Modulated signal B transmits the same data by means of symbols S2(1) and S2(1)' with different signal point arrangements in carrier 1 and carrier 2, and transmits the same data by means of symbols S2(3) and S2(3)' with different signal point arrangements in carrier 3 and carrier 4, at time i. Modulated signal C transmits different data by means of symbols S3(1), S3(2), S3(3), and S3(4) in carrier 1, carrier 2, carrier 3, and carrier 4, at time i.

Figure 45A:
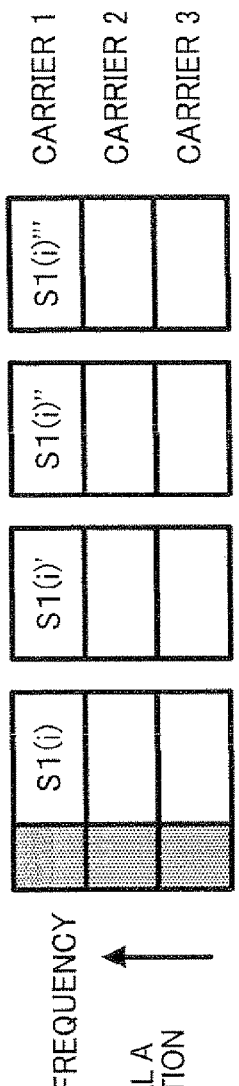
FIG. 45A through FIG. 45C are drawings showing sample frame configurations of modulated signals according to Embodiment 3.
Figure 45B:
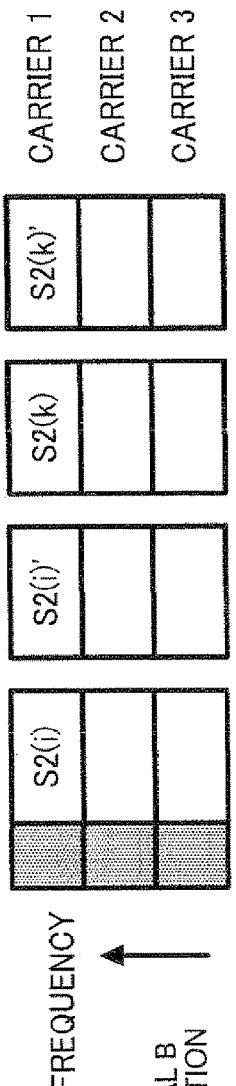
Figure 45C:
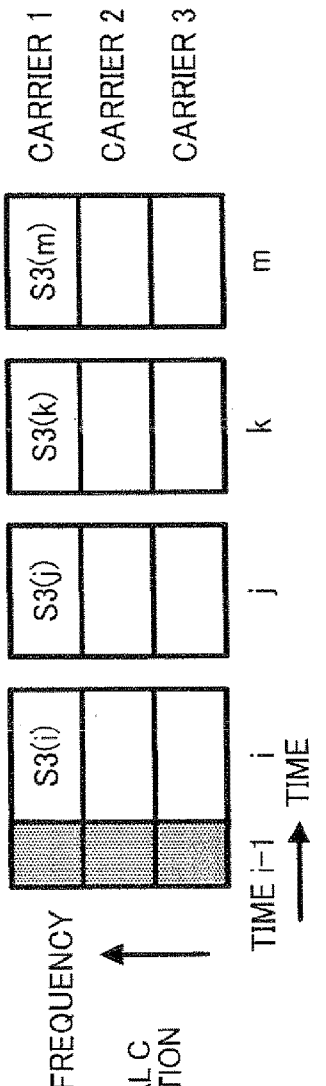

FIG. 45A through FIG. 45C show other sample frame configurations according to this embodiment, with parts identical to those in FIG. 29A and FIG. 29B assigned the same codes as in FIG. 29A and FIG. 29B. Modulated signal A transmits the same data by means of symbols S1(i), S1(i)', S1(i)", and S1(i)''', with different signal point arrangements at time i, time j, time k, and time m in carrier 1. Modulated signal B transmits the same data by means of symbols S2(i) and S2(i)' with different signal point arrangements at time i and time j, and transmits the same data by means of symbols S2(k) and S2(k)' with different signal point arrangements at time k and time m, in carrier 1. Modulated signal C transmits different data by means of symbols S3(i), S3(j), S3(k), and S3(m) at time i, time j, time k, and time m in carrier 1.

FIG. 46A through FIG. 46C show other sample frame configurations according to this embodiment, with parts identical to those in FIG. 29A and FIG. 29B assigned the same codes as in FIG. 29A and FIG. 29B. Modulated signal A transmits the same data by means of symbols S1(i), S1(i)', S1(i)", and S1(i)''', with different signal point arrangements in carrier i, carrier j, carrier k, and carrier m, at time i. Modulated signal B transmits the same data by means of symbols S2(i) and S2(i)' with different signal point arrangements in carrier i and carrier j, and transmits the same data by means of symbols S2(k) and S2(k)' with different signal point arrangements in carrier k and carrier m, at time i. Modulated signal C transmits different data by means of symbols S3(i), S3(j), S3(k), and S3(m) in carrier i, carrier j, carrier k, and carrier m, at time i.

The operation of this embodiment will now be described in detail using FIG. 2A, FIG. 2B, FIG. 3A through FIG. 3C, FIG. 5, FIG. 14, FIG. 25, FIG. 27, FIG. 28, FIG. 29A, FIG. 29B, FIG. 30A, FIG. 30B, FIG. 31A, FIG. 31B, FIG. 32A, FIG. 32B, FIG. 33A, FIG. 33B, FIG. 34A, FIG. 34B, FIG.

35A, FIG. 35B, FIG. 36A, FIG. 36B, FIG. 37A, FIG. 37B, FIG. 38A, FIG. 38B, FIG. 39A through FIG. 39C, FIG. 40A through FIG. 40C, FIG. 41A through FIG. 41C, FIG. 42A through FIG. 42C, FIG. 43A through FIG. 43C, FIG. 44A through FIG. 44C, FIG. 45A through FIG. 45C, and FIG. 46A through FIG. 46C.

FIG. 29A and FIG. 29B show an example of the frame configurations of modulated signal A and modulated signal B transmitted by transmitting apparatus 2600 in FIG. 27. Modulated signal transmitted from the modulated signal A transmitting section in FIG. 27 is the modulated signal A frame configuration in FIG. 29A, and the frame configuration of a modulated signal transmitted from the modulated signal B transmitting section in FIG. 27 is the modulated signal B frame configuration in FIG. 29B.

Characteristics of the frame configurations in FIG. 29A and FIG. 29B are that modulated signal A transmits the same data by means of symbols S1(i) and S1(i)' with different signal point arrangements at time i and time i+1 in carrier 1, while modulated signal B transmits different data by means of symbols S2(i) and S2(i+1) at time i and time i+1 in carrier 1.

Drawings showing the S1(i) and S1(i)' signal point arrangements in the I-Q plane are FIG. 3A through FIG. 3C. The modulation method is QPSK. Assume, for example, that in FIG. 29A (0, 0) is transmitted as S1(i) information at time i. The signal points at this time are as shown in FIG. 3A. Then (0, 0) is transmitted as information at time i+1 as shown in FIG. 3B, for example. The same applies to (0, 1), (1, 0), and (1, 1). The time i+1 signal point arrangement is not limited to that shown in FIG. 3B, and the signal point arrangement in FIG. 3C may be used instead.

Thus in receiving apparatus 2700, to consider carrier 1, since the modulated signal point arrangements are different at time i and time i+1, the modulated signal A and modulated signal B demodulation precision differs at time i and time i+1.

Therefore, the modulated signal B demodulation precision can be improved by demodulating modulated signal A at a time when the demodulation precision is good, and then performing modulated signal B demodulation using that result. That is to say, demodulation precision can be improved for both modulated signals A and B.

The operation of transmitting apparatus 2600 when modulated signals A and B with the frame configurations in FIG. 29A and FIG. 29B are formed by transmitting apparatus 2600 will now be explained.

A frame configuration signal generation section 2623 outputs FIG. 29A and FIG. 29B frame configuration information as frame configuration signal 2624. Coding section 2602 has transmit digital signal 2601 and frame configuration signal 2624 as input, codes transmit digital signal 2601 in accordance with the modulated signal A frame configuration in FIG. 29A, and outputs post-coding transmit digital signal 2603.

Modulation section 2625 has post-coding transmit digital signal 2603 and frame configuration signal 2624 as input, and outputs transmit quadrature baseband signal 2626 in accordance with the modulated signal A frame configuration in FIG. 29A.

A serial/parallel conversion section 2604 has transmit quadrature baseband signal 2626 and frame configuration signal 2624 as input, and outputs a parallel signal 2605. Modulation section 2625 may be configured as shown in FIG. 5, for example.

In FIG. 5, mapping section X 402 maps signal points as shown in FIG. 3A. Mapping section Y 404 maps signal points as shown in FIG. 3B or FIG. 3C.

For example, in the frame configurations in FIG. 29A and FIG. 29B, to consider carrier 1, when frame configuration signal 2624 indicates a modulated signal A, carrier 1, time i symbol, mapping section X 402 executes mapping on the input digital signal, and outputs first mapped transmit quadrature baseband signal 403.

On the other hand, when frame configuration signal 2624 indicates a modulated signal A, carrier 1, time i+1 symbol, mapping section Y 404 executes mapping on the input digital signal, and outputs second mapped transmit quadrature baseband signal 405.

Signal selection section 407 has first mapped transmit quadrature baseband signal 403, second mapped transmit quadrature baseband signal 405, and frame configuration signal 324 as input, selects the signal indicated by frame configuration signal 324, and outputs selected transmit quadrature baseband signal 305.

Here, as an example, a case has been described in which coding is performed using the frame configurations in FIG. 29A and FIG. 29B—that is, time i and time i+1—but implementation is possible in the same way when coding is performed at times i and i+n as in FIG. 31A and FIG. 31B. That is to say, implementation is possible in the same way, considering an above-described time i+1 operation as a time i+n operation.

Also, the description has focused on carrier 1, but implementation is possible in the same way when coding is similarly executed for carriers other than carrier 1.

Next, the receiving apparatus configuration will be described.

FIG. 28 shows the configuration of a receiving apparatus according to this embodiment. Receiving antenna 2701 in FIG. 28 corresponds to antenna 109 in FIG. 2B, and receiving antenna 2711 corresponds to antenna 110 in FIG. 2B.

The operation for carrier 1 is described below as an example. Modulated signal A transmission path estimation section 2707 in FIG. 28 finds carrier 1 channel fluctuation h11(t) (where t designates the time) using modulated signal A, carrier 1, time i radio wave propagation environment estimation symbol 2801 in FIG. 29A. Similarly, modulated signal B transmission path estimation section 2709 finds carrier 1 channel fluctuation h12(t) using modulated signal B, carrier 1, time i radio wave propagation environment estimation symbol 2801 in FIG. 29B. Modulated signal A transmission path estimation section 2717 finds carrier 1 channel fluctuation h21(t) (where t designates the time) using modulated signal A, carrier 1, time i radio wave propagation environment estimation symbol 2801 in FIG. 29A. Similarly, modulated signal B transmission path estimation section 2719 finds carrier 1 channel fluctuation h22(t) using modulated signal B, carrier 1, time i radio wave propagation environment estimation symbol 2801 in FIG. 29B.

Then, at time i, if the carrier 1 signal received by receiving antenna 2701 is designated R1(i), and the carrier 1 signal received by receiving antenna 2711 is designated R2(i), equation (1) holds true. Similarly, at time i+1, equation (2) holds true. S1(i) and S2(i) can be obtained from the relationship in equation (1), and S1(i)' and S2(i+1) can be obtained from the relationship in equation (2).

Also, $h11(i) \fallingdotseq h11(i+1)$, $h12(i) \fallingdotseq h12(i+1)$, $h21(i) \fallingdotseq h21(i+1)$, and $h22(i) \fallingdotseq h22(i+1)$. At this time, the matrices of equation (1) and equation (2) are almost equal matrices, but the (S1(i), S2(i)) and (S1(i)', S2(i+1)) vectors are different, and therefore the likelihoods of the obtained data are different.

This embodiment makes use of this characteristic to improve receive data quality. The actual demodulation (decoding) procedure of receiving apparatus 2700 is as follows.
<1> Time i detection is performed, and (S1(i), S2(i)) is obtained.
<2> Time i+1 detection is performed, and (S1(i)', S2(i+1)) is obtained.
<3> The time i and time i+1 reception qualities are compared.

If the time i reception quality is better, (S1(i), S2(i)) data obtained in time i detection is used directly. Then S2(i+1) data is obtained by estimating S1(i)' of time i+1 from S1(i) obtained in time i detection, and using that result.

On the other hand, if the time i+1 reception quality is better, (S1(i)', S2(i+1)) data obtained in time i+1 detection is used directly. Then S2(i) data is obtained by estimating S1(i) of time i from S1(i)' obtained in time i+1 detection, and using that result.

In receiving apparatus 2700, modulated signal A received digital signal 2722 and modulated signal B received digital signal 2723 are obtained by performing this kind of demodulation processing in demodulation section 2721.

The detailed configuration of demodulation section 2721 in FIG. 28 is as shown in FIG. 8, and its operation is described below.

In FIG. 8, signal 508 corresponds to 2708 in FIG. 28, signal 510 corresponds to 2710 in FIG. 28, signal 506 corresponds to 2706 in FIG. 28, signal 518 corresponds to 2718 in FIG. 28, signal 520 corresponds to 2720 in FIG. 28, and signal 516 corresponds to 2716 in FIG. 28.

As an example, a case will here be described in which transmitting apparatus 2600 in FIG. 27 transmits both modulated signal A and modulated signal B as QPSK modulated signals. The following description relates to carrier 1.

It is possible to transmit a total of 4 bits: 2 bits in modulated signal A and 2 bits in modulated signal B. That is to say, it is possible to transmit 0000, 0001, . . . , 1111. It is assumed that the upper 2 bits are the 2 bits transmitted in modulated signal A, and the lower 2 bits are the 2 bits transmitted in modulated signal B.

The operation of demodulation section 2721 in FIG. 28 will now be explained.

For carrier 1 and time i, demodulation section 2721 finds signal points in the 16 signal point (0000, 0001, . . . , 1111) I-Q plane using the modulated signal A transmission path estimation signal group 2708 carrier 1 component and modulated signal B transmission path estimation signal group 2710 carrier 1 component. The state at this time corresponds to the 16 signal points 1302 in FIG. 14.

Then demodulation section 2721 finds the reception state in the I-Q plane from the post-Fourier-transform signal 2706 carrier 1 component. The state at this time corresponds to signal point 1301 in FIG. 14.

Figure 14:
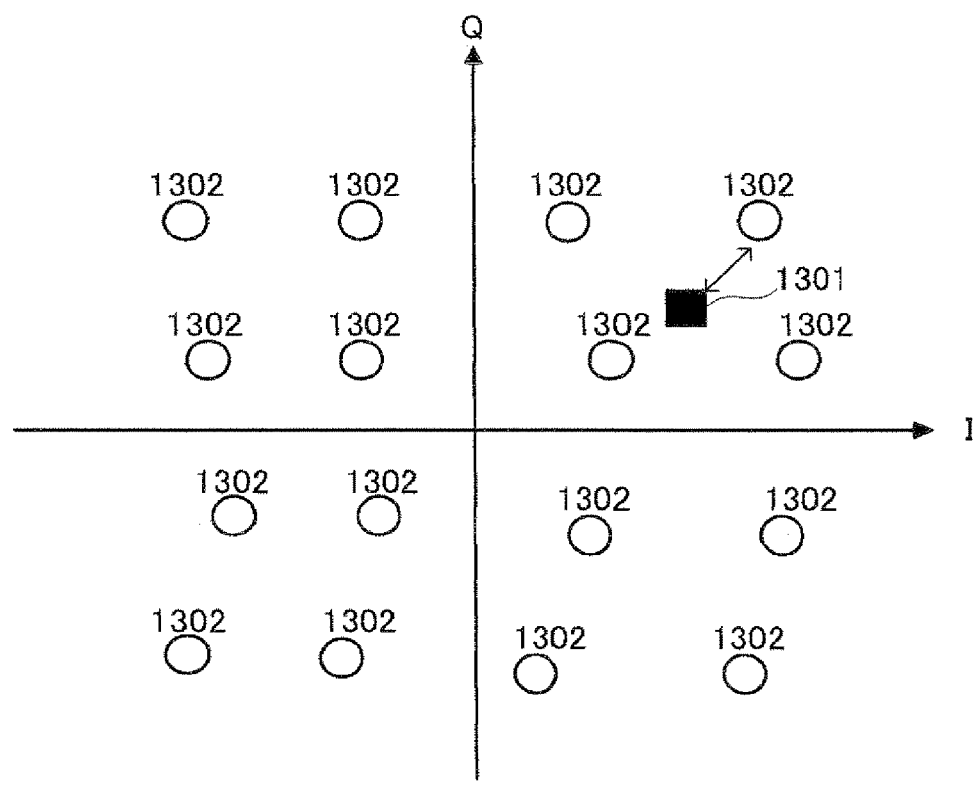
FIG. 14 is a drawing showing a reception state according to Embodiment 1.

Next, demodulation section 2721 calculates, for example, the square of the distance in the I-Q plane between signal point 1301 and all the signal points indicated by reference code 1302 in FIG. 14. That is to say, the square of the distance between signal point 1302 of transmit bits 0000 and signal point 1301 (X0000(i)) is found, and in the same way the squares of the distances between signal points 1302 of transmit bits 0001, . . . , 1111 and signal point 1301 (X0001(i), . . . , X1111(i)) are found.

Similarly, for carrier 1 and time i in FIG. 29A and FIG. 29B, demodulation section 2721 finds signal points in the 16 signal point (0000, 0001, . . . , 1111) I-Q plane using the modulated signal A transmission path estimation signal group 2718 carrier 1 component and modulated signal B transmission path estimation signal group 2720 carrier 1 component. The state at this time corresponds to the 16 signal points 1302 in FIG. 14.

Then demodulation section 2721 finds the reception state in the I-Q plane from the post-Fourier-transform signal 2716 carrier 1 component. The state at this time corresponds to signal point 1301 in FIG. 14.

Next, demodulation section 2721 calculates, for example, the square of the distance in the I-Q plane between signal point 1301 and all the signal points indicated by reference code 1302 in FIG. 14. That is to say, the square of the distance between signal point 1302 of transmit bits 0000 and signal point 1301 (Y0000(i)) is found, and in the same way the squares of the distances between signal points 1302 of transmit bits 0001, . . . , 1111 and signal point 1301 (Y0001(i), . . . , Y1111(i)) are found.

Demodulation section 2721 then finds the sum of X0000(i) and Y0000(i), Z0000(i)=X0000(i)+Y0000(i), and similarly finds Z0001(i), . . . , Z1111(i). In the same way, demodulation section 2721 finds Z0000(i+1), Z0001(i+1), . . . , Z1111(i+1) for time i+1.

Next, demodulation section 2721 compares the likelihoods of time i and time i+1 receive data.

For example, demodulation section 2721 searches for the smallest value among Z0000(i), Z0001(i), . . . , Z1111(i). Let that value be designated F(i). Then demodulation section 2721 searches for the second-smallest value. Let that value be designated S(i).

Similarly, demodulation section 2721 searches for the smallest value among Z0000(i+1), Z0001(i+1), . . . , Z1111(i+1). Let that value be designated F(i+1). Then demodulation section 2721 searches for the second-smallest value. Let that value be designated S(i+1).

Then, for example, demodulation section 2721 finds R(i)=F(i)/S(i), and R(i+1)=F(i+1)/S(i+1).

When R(i+1)>R(i), demodulation section 2721 determines that the time i reception quality is better, and determines that the 4 bits providing F(i) are correct data. Then the 2 data bits transmitted in modulated signal A at time i and time i+1 and the 2 data bits transmitted in modulated signal B at time i are obtained. The 2 bits transmitted in modulated signal B at time i+1 are then determined making use of the fact that the 2 bits transmitted in modulated signal A have been determined. For example, if the 2 bits transmitted in modulated signal A are 00, the 2 bits transmitted in modulated signal B at time i+1 are determined by searching for the item with the smallest value among Z0000(i+1), Z0001(i+1), Z0010(i+1), and Z0011(i+1). Similarly, if the 2 bits transmitted in modulated signal A are 01, the 2 bits transmitted in modulated signal B at time i+1 are determined by searching for the item with the smallest value among Z0100(i+1), Z0101(i+1), Z0110(i+1), and Z0111(i+1). The 2 bits transmitted in modulated signal B at time i+1 are also determined in the same way when the 2 bits transmitted in modulated signal A are 10 or 11.

When R(i)>R(i+1), demodulation section 2721 determines that the time i+1 reception quality is better, and determines that the 4 bits providing F(i+1) are correct data. Then the 2 data bits transmitted in modulated signal A at time i and time i+1 and the 2 data bits transmitted in modulated signal B at time i+1 are obtained. The 2 bits transmitted in modulated signal B at time i are then determined making use of the fact that the 2 bits transmitted in modulated signal A have been determined. For example, if the 2 bits transmitted in modulated signal A are 00, the 2 bits transmitted in modulated signal B at time i are determined by searching for the item with the smallest value among Z0000(i), Z0001(i), Z0010(i), and Z0011(i). Similarly, if the 2 bits transmitted in modulated signal A are 01, the 2 bits transmitted in modulated signal B at time i are determined by searching for the item with the smallest value among Z0100(i), Z0101(i), Z0110(i), and Z0111(i). The 2 bits transmitted in modulated signal B at time i are also determined in the same way when the 2 bits transmitted in modulated signal A are 10 or 11.

The detailed configuration of demodulation section 2721 in FIG. 28 is as shown in FIG. 8. Operations in FIG. 8 are described below.

As described above, modulated signal A and B demodulation section 608 in FIG. 8 outputs data transmitted in modulated signal A at time i and time i+1 as modulated signal A received digital signal 524. Also, modulated signal A and B demodulation section 608 outputs Z0000(i), ..., Z1111(i) as first soft decision value signal 701, and outputs Z0000(i+1), ..., Z1111(i+1) as second soft decision value signal 702. Furthermore, modulated signal A and B demodulation section 608 outputs received digital signal 525-1 of modulated signal B of either time i or time i+1.

Modulated signal B demodulation section 703 has Z0000(i), ..., Z1111(i) comprising first soft decision value signal 701 and Z0000(i+1), ..., Z1111(i+1) comprising second soft decision value signal 702 as input, and, as described above, performs modulated signal B demodulation based on the time i and time i+1 reception qualities, and outputs modulated signal B received digital signal 525-2 of a different time from 525-1.

Although the carrier 1 decoding method has been described here, decoding can be performed in the same way when coding is similarly performed in a carrier other than carrier 1 if the above operations are considered as being for the other carrier. That is to say, carrier n decoding can be performed by means of the FIG. 28 post-Fourier-transform signal carrier n component, modulated signal A transmission path estimation signal group carrier n component, and modulated signal B transmission path estimation signal group carrier n component. Next, a case in which the frame configurations shown in FIG. 31A and FIG. 31B are used will be described. With the frame configurations shown in FIG. 31A and FIG. 31B, coding is performed at times i and i+n. Therefore, if n is such that the relationships h11(i)≒h11(i+n), h12(i)≒h12(i+n), h21(i)≒h21(i+n), and h22(i)≒h22(i+n) hold true, implementation is possible by carrying out the same kind of processing as with the frame configurations in FIG. 29A and FIG. 29B. That is to say, operations can be executed in the same way as in the description for FIG. 29A and FIG. 29B, considering a time i+1 operation as a time i+n operation.

Next, a case in which the frame configurations shown in FIG. 33A and FIG. 33B are used will be described. At this time, the fact that the times at times i and j are totally different, and therefore the radio wave propagation environments are totally different, is important.

The operation for carrier 1 is described below as an example. At time i, equation (1) holds true. Similarly, at time j, equation (3) holds true. At this time, in the receiving apparatus, h11(i), h12(i), h21(i), and h22(i) are estimated using, for example, carrier 1 time i−1 radio wave propagation environment estimation symbol 2801 in FIG. 33A. Similarly, in the receiving apparatus, h11(j), h12(j), h21(j), and h22(j) are estimated using, for example, carrier 1 time j−1 radio wave propagation environment estimation symbol 2801 in FIG. 33B. Here, since the radio wave propagation environment differs greatly for times i and j, h11(i)≠h11(j), h12(i)≠h12(j), h21(i)≠h21(j), and h22(i)≠h22(j). Therefore, time i and j reception qualities are totally different.

A description will now be given of signal point arrangements in the I-Q plane for time i and time j taking the above into consideration. Examples of modulated signal A signal point arrangements in the I-Q plane are shown in FIG. 3A through FIG. 3C. When the frame configurations shown in FIG. 33A and FIG. 33B are used, the time i and j signal point arrangements may, for example, both be as shown in FIG. 3A, or may differ, with the time i signal point arrangement as shown in FIG. 3A and the time j signal point arrangement as shown in FIG. 3B. This is because, unlike in the case of the frame configurations in FIG. 29A, FIG. 29B, FIG. 31A, and FIG. 31B, the radio wave propagation environment differs for times i and j, and therefore the reception quality is different at times i and j even if the signal point arrangement is not intentionally varied.

The decoding procedure is described in detail below. This can be considered as similar to the operation in the case of the frame configurations in FIG. 29A and FIG. 29B. That is to say, time i+1 operations can be thought of as being replaced by time j operations.

The actual demodulation (decoding) procedure performed by receiving apparatus 2700 on signals with the frame configurations shown in FIG. 33A and FIG. 33B is as follows.

<1> Time i detection is performed, and (S1(i), S2(i)) is obtained.

<2> Time j detection is performed, and (S1(i), S2(j)) is obtained.

<3> The time i and time j reception qualities are compared.

If the time i reception quality is better, (S1(i), S2(i)) data is obtained in time i detection. Then S1(i) of time j is estimated from S1(i) obtained in time i detection, and S2(j) is obtained using that result.

If the time j reception quality is better, (S1(i), S2(j)) data is obtained in time j detection. Then S1(i) of time i is estimated from S1(i) obtained in time j detection, and S2(i) is obtained using that result.

In demodulation section 2721 in FIG. 28, modulated signal A received digital signal 2722 and modulated signal B received digital signal 2723 are obtained by performing the above procedure.

The detailed configuration of demodulation section 2721 in FIG. 28 is as shown in FIG. 8, and its operation is described below.

In FIG. 8, signal 508 corresponds to 2708 in FIG. 28, signal 510 corresponds to 2710 in FIG. 28, signal 506 corresponds to 2706 in FIG. 28, signal 518 corresponds to 2718 in FIG. 28, signal 520 corresponds to 2720 in FIG. 28, and signal 516 corresponds to 2716 in FIG. 28.

As an example, a case will here be described in which transmitting apparatus 2600 in FIG. 27 transmits both modulated signal A and modulated signal B as QPSK modulated signals in carrier 1 using the frame configurations in FIG. 33A and FIG. 33B.

It is possible to transmit a total of 4 bits: 2 bits in modulated signal A and 2 bits in modulated signal B. That is to say, it is possible to transmit 0000, 0001, ..., 1111. It is assumed that the upper 2 bits are the 2 bits transmitted in modulated signal A, and the lower 2 bits are the 2 bits transmitted in modulated signal B.

The operation of demodulation section 2721 in FIG. 28 will now be explained.

At time i, demodulation section 2721 finds signal points in the 16 signal point (0000, 0001, ..., 1111) I-Q plane using the modulated signal A transmission path estimation signal group 2708 carrier 1 component and modulated signal B transmission path estimation signal group 2710 carrier 1 component. The state at this time corresponds to the 16 signal points 1302 in FIG. 14. Then demodulation section 2721 finds the reception state in the I-Q plane from the post-Fourier-transform signal 2706 carrier 1 component. The state at this time corresponds to signal point 1301 in FIG. 14.

Next, demodulation section 2721 calculates, for example, the square of the distance in the I-Q plane between signal point 1301 and all the signal points indicated by reference code 1302 in FIG. 14. That is to say, the square of the distance between signal point 1302 of transmit bits 0000 and signal point 1301 ($X0000(i)$) is found, and in the same way the squares of the distances between signal points 1302 of transmit bits 0001, ..., 1111 and signal point 1301 ($X0001(i), ..., X1111(i)$) are found.

Similarly, at time i in FIG. 33A and FIG. 33B, demodulation section 2721 finds signal points in the 16 signal point (0000, 0001, ..., 1111) I-Q plane using the modulated signal A transmission path estimation signal group 2718 carrier 1 component and modulated signal B transmission path estimation signal group 2720 carrier 1 component. The state at this time corresponds to the 16 signal points 1302 in FIG. 14.

Then demodulation section 2721 finds the reception state in the I-Q plane from the post-Fourier-transform signal 2716 carrier 1 component. The state at this time corresponds to signal point 1301 in FIG. 14.

Next, demodulation section 2721 calculates, for example, the square of the distance in the I-Q plane between signal point 1301 and all the signal points indicated by reference code 1302 in FIG. 14. That is to say, the square of the distance between signal point 1302 of transmit bits 0000 and signal point 1301 ($Y0000(i)$) is found, and in the same way the squares of the distances between signal points 1302 of transmit bits 0001, ..., 1111 and signal point 1301 ($Y0001(i), ..., Y1111(i)$) are found.

Demodulation section 2721 then finds the sum of $X0000(i)$ and $Y0000(i)$, $Z0000(i)=X0000(i)+Y0000(i)$, and similarly finds $Z0001(i), ..., Z1111(i)$. In the same way, demodulation section 2721 finds $Z0000(j), Z0001(j), ..., Z1111(j)$ for time j.

Here, when time i determination is performed, radio wave propagation environment estimation is performed using, for example, the FIG. 33A and FIG. 33B time i-1 radio wave propagation environment estimation symbol 2801 carrier 1 symbols. On the other hand, when time j determination is performed, radio wave propagation environment estimation is performed using, for example, the FIG. 33A and FIG. 33B time j-1 radio wave propagation environment estimation symbol 2801 carrier 1 symbols.

Next, demodulation section 2721 compares the likelihoods of time i and time j receive data.

For example, demodulation section 2721 searches for the smallest value among $Z0000(i), Z0001(i), ..., Z1111(i)$. Let that value be designated $F(i)$. Then demodulation section 2721 searches for the second-smallest value. Let that value be designated $S(i)$.

Similarly, demodulation section 2721 searches for the smallest value among $Z0000(j), Z0001(j), ..., Z1111(j)$. Let that value be designated $F(j)$. Then demodulation section 2721 searches for the second-smallest value. Let that value be designated $S(j)$.

Then, for example, demodulation section 2721 finds $R(i)=F(i)/S(i)$, and $R(j)=F(j)/S(j)$.

When $R(j)>R(i)$, demodulation section 2721 determines that the time i reception quality is better, and determines that the 4 bits providing $F(i)$ are correct data. Then the 2 data bits transmitted in modulated signal A at time i and time j and the 2 data bits transmitted in modulated signal B at time i are obtained. The 2 bits transmitted in modulated signal B at time j are then determined making use of the fact that the 2 bits transmitted in modulated signal A have been determined. For example, if the 2 bits transmitted in modulated signal A are 00, the 2 bits transmitted in modulated signal B at time j are determined by searching for the item with the smallest value among $Z0000(j), Z0001(j), Z0010(j)$, and $Z0011(j)$. Similarly, if the 2 bits transmitted in modulated signal A are 01, the 2 bits transmitted in modulated signal B at time j are determined by searching for the item with the smallest value among $Z0100(j), Z0101(j), Z0110(j)$, and $Z0111(j)$. The 2 bits transmitted in modulated signal B at time j are also determined in the same way when the 2 bits transmitted in modulated signal A are 10 or 11.

When $R(i)>R(j)$, demodulation section 2721 determines that the time j reception quality is better, and determines that the 4 bits providing $F(j)$ are correct data. Then the 2 data bits transmitted in modulated signal A at time i and time j and the 2 data bits transmitted in modulated signal B at time j are obtained. The 2 bits transmitted in modulated signal B at time i are then determined making use of the fact that the 2 bits transmitted in modulated signal A have been determined. For example, if the 2 bits transmitted in modulated signal A are 00, the 2 bits transmitted in modulated signal B at time i are determined by searching for the item with the smallest value among $Z0000(i), Z0001(i), Z0010(i)$, and $Z0011(i)$. Similarly, if the 2 bits transmitted in modulated signal A are 01, the 2 bits transmitted in modulated signal B at time i are determined by searching for the item with the smallest value among $Z0100(i), Z0101(i), Z0110(i)$, and $Z0111(i)$. The 2 bits transmitted in modulated signal B at time i are also determined in the same way when the 2 bits transmitted in modulated signal A are 10 or 11.

The detailed configuration of demodulation section 2721 in FIG. 28 is as shown in FIG. 8. Operations in FIG. 8 are described below.

As described above, modulated signal A and B demodulation section 608 in FIG. 8 outputs data transmitted in modulated signal A at time i and time j as modulated signal A received digital signal 524. Also, modulated signal A and B demodulation section 608 outputs $Z0000(i), ..., Z1111(i)$ as first soft decision value signal 701, and outputs $Z0000(j), ..., Z1111(j)$ as second soft decision value signal 702. Furthermore, modulated signal A and B demodulation section 608 outputs received digital signal 525-1 of modulated signal B of either time i or time j.

Modulated signal B demodulation section 703 has $Z0000(i), ..., Z1111(i)$ comprising first soft decision value signal 701 and $Z0000(j), ..., Z1111(j)$ comprising second soft decision value signal 702 as input, and, as described above, performs modulated signal B demodulation based on the time i and time j reception qualities, and outputs modulated signal B received digital signal 525-2 of a different time from 525-1.

Although carrier 1 time i and time j modulated signal A and modulated signal B demodulation has been described here, implementation is possible by carrying out the same kind of processing when coding is similarly performed in a carrier other than carrier 1.

Next, a detailed description will be given of a case where coding is performed in the frequency axis direction, which is possible when using a multicarrier system such as OFDM. That is to say, items on which above-described coding in the time axis direction is performed are subjected to coding in the frequency axis direction.

Next, a case in which the frame configurations shown in FIG. 30A and FIG. 30B are used will be described. Characteristics of the frame configurations in FIG. 30A and FIG. 30B are that modulated signal A transmits the same data by means of symbols S1(i) and S1(i)' with different signal point arrangements in carrier 1 and carrier 2 at time i, while modulated signal B transmits different data by means of symbols S2(i−1) and S2(i−2) in carrier 1 and carrier 2 at time i.

Drawings showing the S1(i) and S1(i)' signal point arrangements in the I-Q plane are FIG. 3A through FIG. 3C. The modulation method is QPSK. Assume, for example, that in FIG. 30A (0, 0) is transmitted as S1(i) information in carrier 1 at time i.

The signal points at this time are as shown in FIG. 3A. Then (0, 0) is transmitted as information in carrier 2 at time i as shown in FIG. 3B, for example. The same applies to (0, 1), (1, 0), and (1, 1). The carrier 2, time i signal point arrangement is not limited to that shown in FIG. 3B, and transmission may also be performed using the signal point arrangement in FIG. 3C. Thus, at time i, the same information is transmitted with different signal point arrangements in carrier 1 and carrier 2.

Thus in the receiving apparatus, to consider time i, since the received modulated signal point arrangements are different in carrier 1 and carrier 2, the carrier 1 modulated signal A and modulated signal B demodulation precision and the carrier 2 modulated signal A and modulated signal B demodulation precision are different. The modulated signal B demodulation precision can then be improved by demodulating modulated signal A at a time when the demodulation precision is good, and then performing modulated signal B demodulation using that result. That is to say, demodulation precision can be improved for both modulated signals A and B.

The operation of transmitting apparatus 2600 when modulated signals A and B with the frame configurations in FIG. 30A and FIG. 30B are formed by transmitting apparatus 2600 will now be explained.

Frame configuration signal generation section 2623 outputs FIG. 30A and FIG. 30B frame configuration information as frame configuration signal 2624. Coding section 2602 has transmit digital signal 2601 and frame configuration signal 2624 as input, codes transmit digital signal 2601 in accordance with the modulated signal A frame configuration in FIG. 30A, and outputs post-coding transmit digital signal 2603.

Modulation section 2625 has post-coding transmit digital signal 2603 and frame configuration signal 2624 as input, and outputs transmit quadrature baseband signal 2626 in accordance with the modulated signal A frame configuration in FIG. 30A. Modulation section 2625 may be configured as shown in FIG. 5, for example.

In FIG. 5, mapping section X 402 maps signal points as shown in FIG. 3A. Mapping section Y 404 maps signal points as shown in FIG. 3B or FIG. 3C.

For example, in the frame configurations in FIG. 30A and FIG. 30B, to consider time i, when frame configuration signal 2624 indicates a modulated signal A, carrier 1, time i symbol, mapping section X 402 executes mapping on the input digital signal, and outputs first mapped transmit quadrature baseband signal 403.

On the other hand, when frame configuration signal 2624 indicates a modulated signal A, carrier 2, time i symbol, mapping section Y 404 executes mapping on the input digital signal, and outputs second mapped transmit quadrature baseband signal 405.

Signal selection section 407 has first mapped transmit quadrature baseband signal 403, second mapped transmit quadrature baseband signal 405, and frame configuration signal 324 as input, selects the signal indicated by frame configuration signal 324, and outputs selected transmit quadrature baseband signal 305.

Here, as an example, a case has been described in which coding is performed using the frame configurations in FIG. 30A and FIG. 30B—that is, across carrier 1 and carrier 2 at time i—but implementation is possible in the same way when coding is performed across carrier 1 and carrier n as in FIG. 32A and FIG. 32B. That is to say, implementation is possible in the same way, considering an above-described carrier 2 operation as a carrier n operation. Also, the description has focused on time i, but implementation is possible in the same way when coding is similarly executed at times other than time i, and furthermore implementation is also possible in the same way when coding is executed across carriers other than carrier 1 and carrier 2 at time i.

Next, the receiving apparatus configuration will be described. FIG. 28 shows the configuration of a receiving apparatus according to this embodiment. Receiving antenna 2701 in FIG. 28 corresponds to antenna 109 in FIG. 2B, and receiving antenna 2711 corresponds to antenna 110 in FIG. 2B.

The operation at time i is described below as an example. A description will first be given for carrier 1. Modulated signal A transmission path estimation section 2707 in FIG. 28 finds carrier 1 channel fluctuation h11,1(t) (where t designates the time) using modulated signal A, carrier 1, time i radio wave propagation environment estimation symbol 2801 in FIG. 30A. Similarly, modulated signal B transmission path estimation section 2709 finds carrier 1 channel fluctuation h12,1(t) using modulated signal B, carrier 1, time i radio wave propagation environment estimation symbol 2801 in FIG. 30B. Modulated signal A transmission path estimation section 2717 finds carrier 1 channel fluctuation h21,1(t) using modulated signal A, carrier 1, time i radio wave propagation environment estimation symbol 2801 in FIG. 30A. Similarly, modulated signal B transmission path estimation section 2719 finds carrier 1 channel fluctuation h22,1(t) using modulated signal B, carrier 1, time i radio wave propagation environment estimation symbol 2801 in FIG. 30B.

Then, at time i, if the carrier 1 signal received by receiving antenna 2701 is designated R1,1(i), and the carrier 1 signal received by receiving antenna 2711 is designated R2,1(i), the following equation holds true.

$$\begin{pmatrix} R1,1(i) \\ R2,1(i) \end{pmatrix} = \begin{pmatrix} h11,1(i) & h12,1(i) \\ h21,1(i) & h22,1(i) \end{pmatrix} \begin{pmatrix} S1(i) \\ S2(i-1) \end{pmatrix} \quad (11)$$

Similarly, for carrier 2, the following equation holds true.

$$\begin{pmatrix} R1,2(i) \\ R2,2(i) \end{pmatrix} = \begin{pmatrix} h11,2(i) & h12,2(i) \\ h21,2(i) & h22,2(i) \end{pmatrix} \begin{pmatrix} S1(i)' \\ S2(i-2) \end{pmatrix} \quad (12)$$

S1(i) and S2(i−1) can be obtained from the relationship in equation (11), and S1(i)' and S2(i−2) can be obtained from the relationship in equation (12).

Also, h11,1(i)≅h11,2(i), h12,1(i)≅h12,2(i), h21,1(i)≅h21,2(i), and h22,1(i)≅h22,2(i). At this time, the matrices of equation (11) and equation (12) are almost equal matrices, but the (S1(i), S2(i−1)) and (S1(i)', S2(i−2)) vectors are different, and therefore the likelihoods of the obtained data are different.

This embodiment makes use of this characteristic to improve receive data quality. The actual demodulation (decoding) procedure of receiving apparatus 2700 is as follows.
<1> Time i, carrier 1 detection is performed, and (S1(i), S2(i−1)) is obtained.
<2> Time i, carrier 2 detection is performed, and (S1(i)', S2(i−2)) is obtained.
<3> The carrier 1 and carrier 2 reception qualities are compared.

If the carrier 1 reception quality is better, (S1(i), S2(i−1)) data is obtained in carrier 1 detection. Then S1(i)' of carrier 2 is estimated from S1(i) obtained in carrier 1 detection, and S2(i−2) is obtained using that result.

If the carrier 2 reception quality is better, (S1(i)', S2(i−2)) data is obtained in carrier 2 detection. Then S1(i) of carrier 1 is estimated from S1(i)' obtained in carrier 2 detection, and S2(i−1) is obtained using that result.

In receiving apparatus 2700, modulated signal A received digital signal 2722 and modulated signal B received digital signal 2723 are obtained by performing this kind of demodulation processing in demodulation section 2721.

The detailed configuration of demodulation section 2721 in FIG. 28 is as shown in FIG. 8, and its operation is described below.

In FIG. 8, signal 508 corresponds to 2708 in FIG. 28, signal 510 corresponds to 2710 in FIG. 28, signal 506 corresponds to 2706 in FIG. 28, signal 518 corresponds to 2718 in FIG. 28, signal 520 corresponds to 2720 in FIG. 28, and signal 516 corresponds to 2716 in FIG. 28.

As an example, a case will here be described in which transmitting apparatus 2600 in FIG. 27 performs QPSK modulation for both modulated signal A and modulated signal B using the frame configurations in FIG. 30A and FIG. 30B. The following description relates to carrier 1 and carrier 2.

It is possible to transmit a total of 4 bits: 2 bits in modulated signal A and 2 bits in modulated signal B. That is to say, it is possible to transmit 0000, 0001, . . . , 1111. It is assumed that the upper 2 bits are the 2 bits transmitted in modulated signal A, and the lower 2 bits are the 2 bits transmitted in modulated signal B.

The operation of demodulation section 2721 in FIG. 28 will now be explained.

For carrier 1 and time i, demodulation section 2721 finds signal points in the 16 signal point (0000, 0001, . . . , 1111) I-Q plane using the modulated signal A transmission path estimation signal group 2708 carrier 1 component and modulated signal B transmission path estimation signal group 2710 carrier 1 component. The state at this time corresponds to the 16 signal points 1302 in FIG. 14.

Then demodulation section 2721 finds the reception state in the I-Q plane from the post-Fourier-transform signal 2706 carrier 1 component. The state at this time corresponds to signal point 1301 in FIG. 14.

Next, demodulation section 2721 calculates, for example, the square of the distance in the I-Q plane between signal point 1301 and all signal points 1302 shown in FIG. 14. That is to say, the square of the distance between signal point 1302 of transmit bits 0000 and signal point 1301 (X0000(i)) is found, and in the same way the squares of the distances between signal points 1302 of transmit bits 0001, . . . , 1111 and signal point 1301 (X0001(i), . . . , X1111(i)) are found.

Similarly, for carrier 1 and time i in FIG. 30A and FIG. 30B, demodulation section 2721 finds signal points in the 16 signal point (0000, 0001, . . . , 1111) I-Q plane using the modulated signal A transmission path estimation signal group 2718 carrier 1 component and modulated signal B transmission path estimation signal group 2720 carrier 1 component. The state at this time corresponds to the 16 signal points 1302 in FIG. 14.

Then demodulation section 2721 finds the reception state in the I-Q plane from the post-Fourier-transform signal 2716 carrier 1 component. The state at this time corresponds to signal point 1301 in FIG. 14.

Next, demodulation section 2721 calculates, for example, the square of the distance in the I-Q plane between signal point 1301 and all signal points 1302 shown in FIG. 14. That is to say, the square of the distance between signal point 1302 of transmit bits 0000 and signal point 1301 (Y0000(i)) is found, and in the same way the squares of the distances between signal points 1302 of transmit bits 0001, . . . , 1111 and signal point 1301 (Y0001(i), . . . , Y1111(i)) are found.

Demodulation section 2721 then finds the sum of X0000(i) and Y0000(i), Z0000(i)=X0000(i)+Y0000(i), and similarly finds Z0001(i), . . . , Z1111(i). In the same way, demodulation section 2721 finds Z0000(i), Z0001(i), . . . , Z1111(i) for carrier 2.

Next, demodulation section 2721 compares the likelihoods of carrier 1 and carrier 2 receive data.

For example, in carrier 1, demodulation section 2721 searches for the smallest value among Z0000(i), Z0001(i), . . . , Z1111(i). Let that value be designated F(i). Then demodulation section 2721 searches for the second-smallest value. Let that value be designated S(i).

Similarly, in carrier 2, demodulation section 2721 searches for the smallest value among Z0000(i), Z0001(i), . . . , Z1111(i). Let that value be designated F(i). Then demodulation section 2721 searches for the second-smallest value. Let that value be designated S(i).

Then, for example, demodulation section 2721 finds R,1(i)=F(i)/S(i) for carrier 1, and R,2(i)=F(i)/S(i) for carrier 2.

When R,2(i)>R,1(i), demodulation section 2721 determines that the carrier 1 reception quality is better, and determines that the 4 bits providing carrier 1 F(i) are correct data. Then the 2 data bits transmitted in modulated signal A in carrier 1 and carrier 2 and the 2 data bits transmitted in carrier 1 modulated signal B are obtained. The 2 bits transmitted in carrier 2 modulated signal B at time i+1 are then determined making use of the fact that the 2 bits transmitted in modulated signal A have been determined. For example, if the 2 bits transmitted in modulated signal A are 00, the 2 bits transmitted in carrier 2 modulated signal B are determined by searching for the item with the smallest value among carrier 2 Z0000(i), Z0001(i), Z0010(i), and Z0011(i). Similarly, if the 2 bits transmitted in modulated signal A are 01, the 2 bits transmitted in carrier 2 modulated signal B are determined by searching for the item with the smallest value among carrier 2 Z0100(i), Z0101(i), Z0110(i), and Z0111(i). The 2 bits transmitted in carrier 2 modulated signal B are also determined in the same way when the 2 bits transmitted in modulated signal A are 10 or 11.

When R,1(i)>R,2(i), demodulation section 2721 determines that the carrier 2 reception quality is better, and determines that the 4 bits providing carrier 2 F(i) are correct data. Then the 2 data bits transmitted in modulated signal A in carrier 1 and carrier 2 and the 2 data bits transmitted in carrier 2 modulated signal B are obtained. The 2 bits transmitted in carrier 1 modulated signal B are then determined making use of the fact that the 2 bits transmitted in modulated signal A have been determined. For example, if the 2 bits transmitted in modulated signal A are 00, the 2 bits transmitted in carrier 1 modulated signal B are determined by searching for the item with the smallest value among carrier 1 Z0000(i), Z0001(i), Z0010(i), and Z0011(i). Similarly, if the 2 bits transmitted in modulated signal A are 01, the 2 bits transmitted in carrier 1 modulated signal B are determined by searching for the item with the smallest value among carrier 1 Z0100(i), Z0101(i), Z0110(i), and Z0111(i). The 2 bits transmitted in carrier 1 modulated signal B are also determined in the same way when the 2 bits transmitted in modulated signal A are 10 or 11.

The detailed configuration of demodulation section 2721 in FIG. 28 is as shown in FIG. 8. Operations in FIG. 8 are described below.

As described above, modulated signal A and B demodulation section 608 in FIG. 8 outputs data transmitted in modulated signal A in time i carrier 1 and carrier 2 as modulated signal A received digital signal 524. Also, modulated signal A and B demodulation section 608 outputs carrier 1 Z0000(i), . . . , Z1111(i) as first soft decision value signal 701, Z1111(i) as second soft decision value signal 702. Furthermore, modulated signal A and B demodulation section 608 outputs received digital signal 525-1 of modulated signal B of either time i carrier 1 or carrier 2.

Modulated signal B demodulation section 703 has carrier 1 Z0000(i), . . . , Z1111(i) comprising first soft decision value signal 701 and carrier 2 Z0000(i), . . . , Z1111(i) comprising second soft decision value signal 702 as input, and, as described above, performs modulated signal B demodulation based on the carrier 1 and carrier 2 reception qualities, and outputs modulated signal B received digital signal 525-2 of a different carrier from 525-1.

Although the decoding method for carrier 1 and carrier 2 has been described here, decoding can be performed in the same way by similarly executing the above-described operations when coding is similarly performed in carriers other than carrier 1 and carrier 2.

When the frame configurations shown in FIG. 32A and FIG. 32B are used, if n is such that the relationships h11,1(i)≈ h11,1+n(i), h12,1(i)≈ h12,1+n(i), h21,1(i)≈ h21, 1+n(i), and h22,1(i)≈ h22,1+n(i) hold true, implementation is possible by carrying out the same kind of processing as with the frame configurations in FIG. 30A and FIG. 30B. That is to say, operations can be executed in the same way, considering a carrier 2 operation as a carrier 1+n operation.

Next, a case in which the frame configurations shown in FIG. 34A and FIG. 34B are used will be described. In the case of frame configurations in FIG. 34A and FIG. 34B, the fact that the frequencies of carrier 1 and carrier j are totally different, and therefore the radio wave propagation environments are totally different, is important.

Here, the case of carrier 1 and carrier j will be described as an example. For time i and carrier 1, equation (11) holds true. For time i and carrier j, the following equation holds true.

$$\begin{pmatrix} R1,j(i) \\ R2,j(i) \end{pmatrix} = \begin{pmatrix} h11,j(i) & h12,j(i) \\ h21,j(i) & h22,j(i) \end{pmatrix} \begin{pmatrix} S1(i)' \\ S2(i-j) \end{pmatrix} \qquad (13)$$

At this time, in the receiving apparatus, h11,1(i), h12,1(i), h21,1(i), and h22,1(i) are estimated using, for example, carrier 1 time i−1 radio wave propagation environment estimation symbols 2801 in FIG. 34A and FIG. 34B. Similarly, in the receiving apparatus, h11,j(i), h12,j(i), h21,j(i), and h22,j(i) are estimated using, for example, carrier j time i−1 radio wave propagation environment estimation symbols 2801 in FIG. 34A and FIG. 34B. At this time, since the times are such that the radio wave propagation environment differs for carrier 1 and carrier j, h11,1(i)≠h11,j(i), h12,1(i)≠h12,j(i), h21,1(i)≠h21,j(i), and h22,1(i)≠h22,j(i). Therefore, carrier 1 and j reception qualities are totally different.

A description will now be given of signal point arrangements in the I-Q plane for carrier 1 and carrier j taking the above into consideration. Examples of modulated signal A signal point arrangements in the I-Q plane are shown in FIG. 3A through FIG. 3C. When the frame configurations shown in FIG. 34A and FIG. 34B are used, the carrier 1 and carrier j signal point arrangements may, for example, both be as shown in FIG. 3A, or may differ, with the carrier 1 signal point arrangement as shown in FIG. 3A and the carrier j signal point arrangement as shown in FIG. 3B. This is because, unlike in the case of the frame configurations in FIG. 29A, FIG. 29B, FIG. 31A, and FIG. 31B, the radio wave propagation environment differs for carrier 1 and carrier j, and there is therefore a difference in reception quality between carrier 1 and carrier j even if the signal point arrangement is not intentionally varied.

The decoding procedure is described in detail below. This can be considered as similar to the operation in the case of the frame configurations in FIG. 30A and FIG. 30B.

That is to say, carrier 2 operations can be thought of as being replaced by carrier j operations.

The actual demodulation (decoding) procedure performed by receiving apparatus 2700 on signals with the frame configurations shown in FIG. 34A and FIG. 34B is as follows.

<1> Time i, carrier 1 detection is performed, and (S1(i), S2(i−1)) is obtained.

<2> Time i, carrier j detection is performed, and (S1(i), S2(i−j)) is obtained.

<3> The carrier 1 and carrier j reception qualities are compared.

If the time i, carrier 1 reception quality is better, (S1(i), S2(i−1)) data is obtained in time i, carrier 1 detection. Then S1(i) of time i, carrier j is estimated from S1(i) obtained in time i, carrier 1 detection, and S2(i−j) is obtained using that result.

If the time i, carrier j reception quality is better, (S1(i), S2(i−j)) data is obtained in time i, carrier j detection. Then S1(i) of time i, carrier 1 is estimated from S1(i) obtained in time i, carrier j detection, and S2(i−1) is obtained using that result.

In demodulation section 2721 in FIG. 28, modulated signal A received digital signal 2722 and modulated signal B received digital signal 2723 are obtained by performing the above procedure.

The detailed configuration of demodulation section 2721 in FIG. 28 is as shown in FIG. 8, and its operation is described below.

In FIG. 8, signal 508 corresponds to 2708 in FIG. 28, signal 510 corresponds to 2710 in FIG. 28, signal 506 corresponds to 2706 in FIG. 28, signal 518 corresponds to 2718 in FIG. 28, signal 520 corresponds to 2720 in FIG. 28, and signal 516 corresponds to 2716 in FIG. 28.

As an example, a case will here be described in which transmitting apparatus 2600 in FIG. 27 performs transmission employing QPSK modulation for both modulated signal A and modulated signal B in carrier 1 and carrier j using the frame configurations in FIG. 34A and FIG. 34B.

It is possible to transmit a total of 4 bits: 2 bits in modulated signal A and 2 bits in modulated signal B. That is to say, it is possible to transmit 0000, 0001, . . . , 1111. It is assumed that the upper 2 bits are the 2 bits transmitted in modulated signal A, and the lower 2 bits are the 2 bits transmitted in modulated signal B.

The operation of demodulation section 2721 in FIG. 28 will now be explained.

At time i, demodulation section 2721 finds signal points in the 16 signal point (0000, 0001, . . . , 1111) I-Q plane using the modulated signal A transmission path estimation signal group 2708 carrier 1 component and modulated signal B transmission path estimation signal group 2710 carrier 1 component. The state at this time corresponds to the 16 signal points 1302 in FIG. 14.

Then demodulation section 2721 finds the reception state in the I-Q plane from the post-Fourier-transform signal 2706 carrier 1 component. The state at this time corresponds to signal point 1301 in FIG. 14.

Next, demodulation section 2721 calculates, for example, the square of the distance in the I-Q plane between signal point 1301 and all signal points 1302 shown in FIG. 14. That is to say, the square of the distance between signal point 1302 of transmit bits 0000 and signal point 1301 (X0000(i)) is found, and in the same way the squares of the distances between signal points 1302 of transmit bits 0001, . . . , 1111 and signal point 1301 (X0001(i), . . . , X1111(i)) are found.

Similarly, at time i in FIG. 34A and FIG. 34B, demodulation section 2721 finds signal points in the 16 signal point (0000, 0001, . . . , 1111) I-Q plane using the modulated signal A transmission path estimation signal group 2718 carrier 1 component and modulated signal B transmission path estimation signal group 2720 carrier 1 component. The state at this time corresponds to the 16 signal points 1302 in FIG. 14.

Then demodulation section 2721 finds the reception state in the I-Q plane from the post-Fourier-transform signal 2716 carrier 1 component. The state at this time corresponds to signal point 1301 in FIG. 14.

Next, demodulation section 2721 calculates, for example, the square of the distance in the I-Q plane between signal point 1301 and all signal points 1302 shown in FIG. 14. That is to say, the square of the distance between signal point 1302 of transmit bits 0000 and signal point 1301 (Y0000(i)) is found, and in the same way the squares of the distances between signal points 1302 of transmit bits 0001, . . . , 1111 and signal point 1301 (Y0001(i), . . . , Y1111(i)) are found.

Demodulation section 2721 then finds the sum of X0000 (i) and Y0000(i), Z0000(i)=X0000(i)+Y0000(i), and similarly finds Z0001(i), . . . , Z1111(i). Here, when time i determination is performed, radio wave propagation environment estimation is performed using, for example, the FIG. 34A and FIG. 34B time i−1 radio wave propagation environment estimation symbol 2801 carrier 1 and carrier j symbols.

Next, demodulation section 2721 compares the likelihoods of time i carrier 1 and carrier j receive data.

For example, demodulation section 2721 searches for the smallest value among carrier 1 Z0000(i), Z0001(i), . . . , Z1111(i). Let that value be designated F(i). Then demodulation section 2721 searches for the second-smallest value. Let that value be designated S(i).

Similarly, demodulation section 2721 searches for the smallest value among carrier j Z0000(i), Z0001(i), . . . , Z1111(i). Let that value be designated F(i). Then demodulation section 2721 searches for the second-smallest value. Let that value be designated S(i). Then, for example, demodulation section 2721 finds carrier 1 R(i)=F(i)/S(i), and carrier j R(i)=F(i)/S(i).

When carrier j R(i)>carrier 1 R(i), demodulation section 2721 determines that the carrier 1 reception quality is better, and determines that the 4 bits providing carrier 1 F(i) are correct data.

Then the 2 data bits transmitted in modulated signal A in carrier 1 and carrier j and the 2 data bits transmitted in carrier 1 modulated signal B are obtained. The 2 bits transmitted in carrier j modulated signal B are then determined making use of the fact that the 2 bits transmitted in modulated signal A have been determined. For example, if the 2 bits transmitted in modulated signal A are 00, the 2 bits transmitted in carrier j modulated signal B are determined by searching for the item with the smallest value among carrier j Z0000(i), Z0001(i), Z0010(i), and Z0011(i).

Similarly, if the 2 bits transmitted in modulated signal A are 01, the 2 bits transmitted in carrier j modulated signal B are determined by searching for the item with the smallest value among carrier j Z0100(i), Z0101(i), Z0110(i), and Z0111(i). The 2 bits transmitted in carrier j modulated signal B are also determined in the same way when the 2 bits transmitted in modulated signal A are 10 or 11. When carrier 1 R(i)>carrier j R(i), demodulation section 2721 determines that the carrier j reception quality is better, and determines that the 4 bits providing carrier j F(i) are correct data.

Then the 2 data bits transmitted in carrier 1 and carrier j modulated signal A and the 2 data bits transmitted in carrier j modulated signal B are obtained.

The 2 bits transmitted in carrier 1 modulated signal B are then determined making use of the fact that the 2 bits transmitted in modulated signal A have been determined. For example, if the 2 bits transmitted in modulated signal A are 00, the 2 bits transmitted in carrier 1 modulated signal B are determined by searching for the item with the smallest value among carrier 1 Z0000(i), Z0001(i), Z0010(i), and Z0011(i). Similarly, if the 2 bits transmitted in modulated signal A are 01, the 2 bits transmitted in carrier 1 modulated signal B are determined by searching for the item with the smallest value among carrier 1 Z0100(i), Z0101(i), Z0110 (i), and Z0111(i). The 2 bits transmitted in modulated signal B at time i are also determined in the same way when the 2 bits transmitted in modulated signal A are 10 or 11.

The detailed configuration of demodulation section 2721 in FIG. 28 is as shown in FIG. 8. Operations in FIG. 8 are described below.

As described above, modulated signal A and B demodulation section 608 in FIG. 8 outputs data transmitted in modulated signal A in carrier 1 and carrier j as modulated signal A received digital signal 524. Also, modulated signal A and B demodulation section 608 outputs carrier 1 Z0000 (i), . . . , Z1111(i) as first soft decision value signal 701, and outputs carrier j Z0000(i), . . . , Z1111(i) as second soft decision value signal 702. Furthermore, modulated signal A and B demodulation section 608 outputs received digital signal 525-1 of modulated signal B of either carrier 1 or carrier j.

Modulated signal B demodulation section 703 has carrier 1 Z0000(i), . . . , Z1111(i) comprising first soft decision value signal 701 and carrier j Z0000(i), . . . , Z1111(i) comprising second soft decision value signal 702 as input, and, as described above, performs modulated signal B demodulation based on the carrier 1 and carrier j reception qualities, and outputs modulated signal B received digital signal 525-2 of a different carrier from 525-1.

Although time i carrier 1 and carrier j modulated signal A and modulated signal B demodulation has been described here, implementation is possible by carrying out the same kind of processing when coding is similarly performed in carriers other than carrier 1 and carrier j.

FIG. 35A and FIG. 35B show sample frame configurations when the frame configurations in FIG. 10A are applied to an OFDM system. Implementation is also similarly possible for an OFDM system by carrying out the same kind of processing as for FIG. 10A frame configuration signals described in Embodiment 1.

FIG. 36A and FIG. 36B show frame configurations when coding is performed in the frequency axis direction, as opposed to the time direction coding of the frame configurations in FIG. 35A and FIG. 35B. The processing for FIG. 36A and FIG. 36B frame configuration signals can be implemented by combining the processing described in Embodiment 1 and the processing described in this embodiment.

FIG. 37A and FIG. 37B show sample frame configurations when the frame configurations in FIG. 10B are applied to an OFDM system. Implementation is also similarly possible for an OFDM system by carrying out the same kind of processing as for FIG. 10B frame configuration signals described in Embodiment 1.

FIG. 38A and FIG. 38B show frame configurations when coding is performed in the frequency axis direction, as opposed to the time direction coding of the frame configurations in FIG. 37A and FIG. 37B. The processing for FIG. 38A and FIG. 38B frame configuration signals can be implemented by combining the processing described in Embodiment 1 and the processing described in this embodiment.

FIG. 39A through FIG. 39C show sample frame configurations when the frame configurations in FIG. 15 are applied to an OFDM system. Implementation is also similarly possible for an OFDM system by carrying out the same kind of processing as for FIG. 15 frame configuration signals described in Embodiment 2.

FIG. 40A through FIG. 40C show frame configurations when coding is performed in the frequency axis direction, as opposed to the time direction coding of the frame configurations in FIG. 39A through FIG. 39C. The processing for FIG. 40A through FIG. 40C frame configuration signals can be implemented by combining the processing described in Embodiment 2 and the processing described in this embodiment.

FIG. 41A through FIG. 41C show sample frame configurations when the frame configurations in FIG. 16 are applied to an OFDM system. Implementation is also possible for an OFDM system by carrying out the same kind of implementation as in Embodiment 2.

FIG. 42A through FIG. 42C show frame configurations when coding is performed in the frequency axis direction, as opposed to the time direction coding of the frame configurations in FIG. 41A through FIG. 41C. The processing for FIG. 42A through FIG. 42C frame configuration signals can be implemented by combining the processing described in Embodiment 2 and the processing described in this embodiment.

FIG. 43A through FIG. 43C show sample frame configurations when the frame configurations in FIG. 22 are applied to an OFDM system. Implementation is also possible for an OFDM system by carrying out the same kind of implementation as in Embodiment 2.

FIG. 44A through FIG. 44C show frame configurations when coding is performed in the frequency axis direction, as opposed to the time direction coding of the frame configurations in FIG. 43A through FIG. 43C. The processing for FIG. 44A through FIG. 44C frame configuration signals can be implemented by combining the processing described in Embodiment 2 and the processing described in this embodiment.

FIG. 45A through FIG. 45C show sample frame configurations when the frame configurations in FIG. 26 are applied to an OFDM system. Implementation is also possible for an OFDM system by carrying out the same kind of implementation as in Embodiment 2.

FIG. 46A through FIG. 46C show frame configurations when coding is performed in the frequency axis direction, as opposed to the time direction coding of the frame configurations in FIG. 45A through FIG. 45C. The processing for FIG. 46A through FIG. 46C frame configuration signals can be implemented by combining the processing described in Embodiment 2 and the processing described in this embodiment.

In FIG. 35A and FIG. 35B, FIG. 36A and FIG. 36B, FIG. 39A through FIG. 39C, FIG. 40A through FIG. 40C, FIG. 43A through FIG. 43C, and FIG. 44A through FIG. 44C, examples have been described of coding as adjacent symbols along the time or frequency axis, but the present invention is not limited to this, and implementation is similarly possible for cases of 2, 3, . . . , n symbol separation.

The configuration of the transmitting apparatus is not limited to the configuration in FIG. 27, and the configuration of the modulation section is not limited to the configuration in FIG. 5. Also, the configurations of the receiving apparatus and demodulation section are not limited to the configurations in FIG. 8 and FIG. 28.

(4) Embodiment 4

In above Embodiments 1 through 3, it has mainly been proposed that at least one modulated signal among modulated signals transmitted from respective antennas be formed by modulating the same data a plurality of times while changing the signal point arrangement mode in the time direction or the frequency direction.

In this embodiment, the present invention is described as being effective in a case such as a line-of-sight environment if the signal point arrangement mode is changed in the time direction or frequency direction for at least one modulated signal, even though the signal point arrangement mode of the same data is not changed.

In this embodiment a modulated signal is formed without modulating the same data a plurality of times, enabling data transmission efficiency to be improved compared with Embodiments 1 through 3.

In this embodiment, as a preferred example, it is proposed that, in addition to Embodiments 1 through 3, interleaving processing be further executed on transmit data, and the signal point arrangement mode be changed in predetermined block units.

Figure 47A:
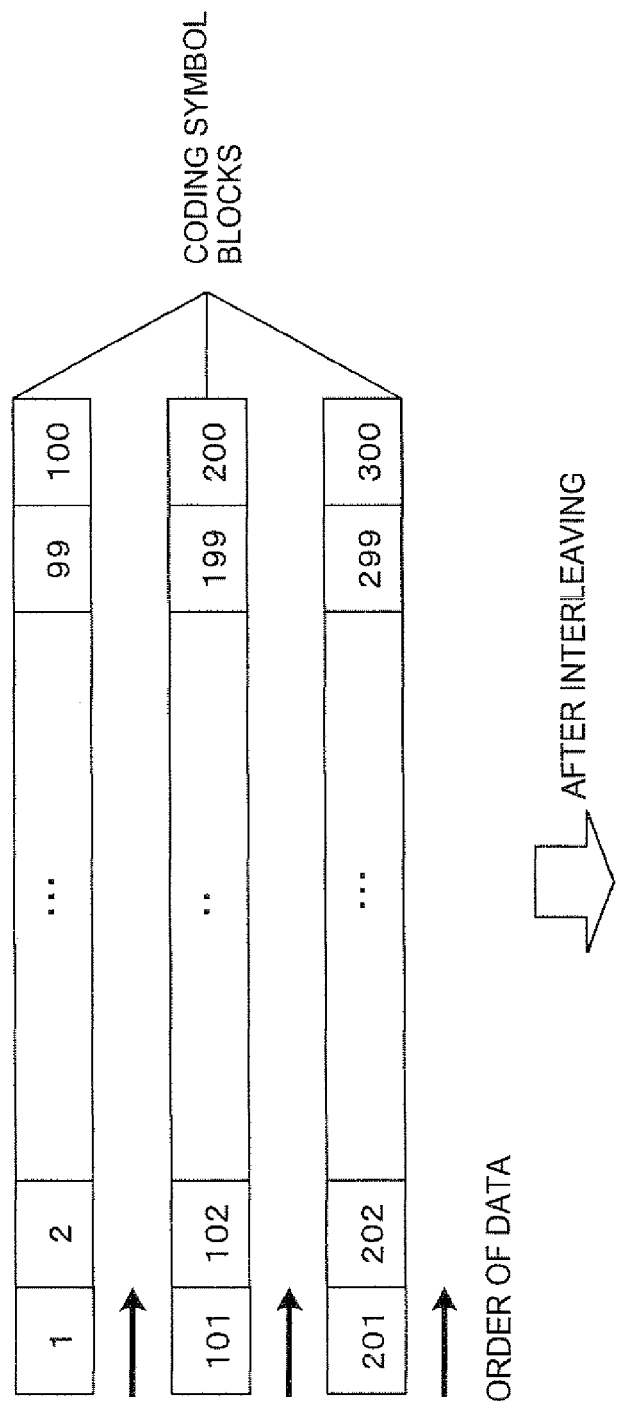
FIG. 47A and FIG. 47B are drawings provided to explain interleaving according to Embodiment 4.
Figure 47B:
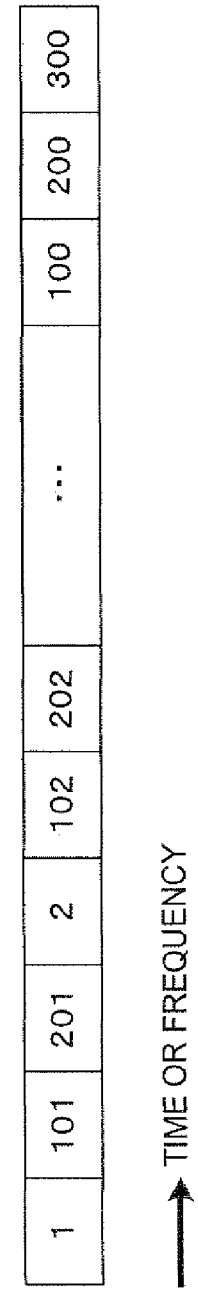

FIG. 47A and FIG. 47B show an example of the application of interleaving according to this embodiment. FIG. 47A shows the order of data prior to interleaving, and FIG. 47B shows the data sequence after interleaving. In the example shown in FIG. 47A and FIG. 47B, interleaving is performed vertically by reading data sequentially from left to right. Specifically, data is rearranged into the following order: data 1, data 101, data 201, data 2, data 102, data 202, . . . , data 100, data 200, data 300 (this data sequence being termed "pattern X").

Figure 48A:
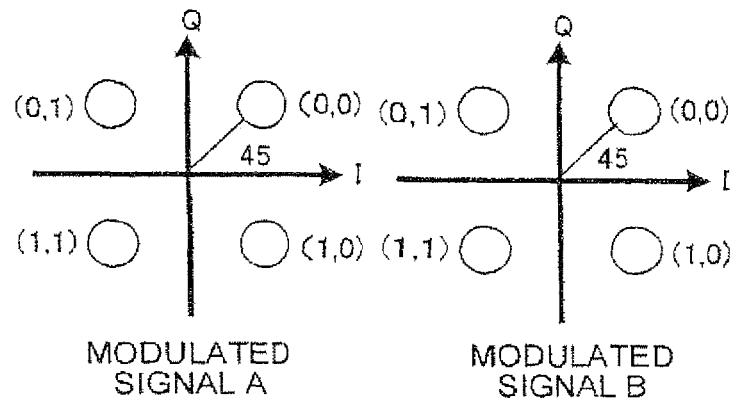
FIG. 48A through FIG. 48C are drawings showing sample signal point arrangements according to Embodiment 4.
Figure 48B:
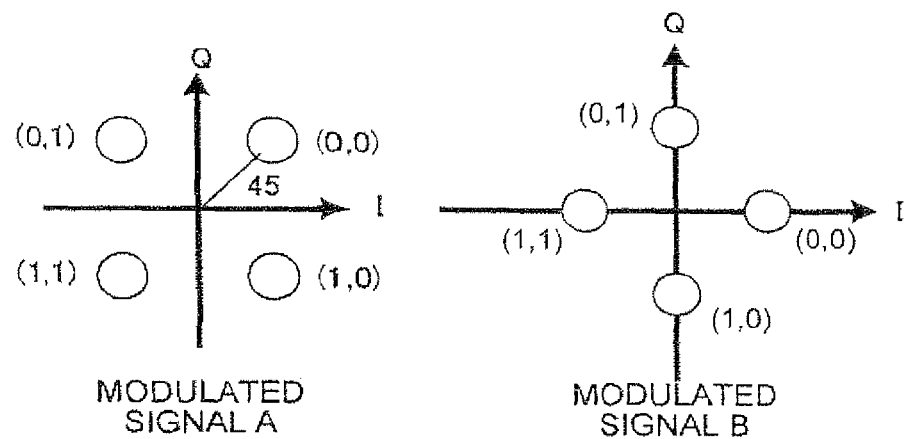
Figure 48C:
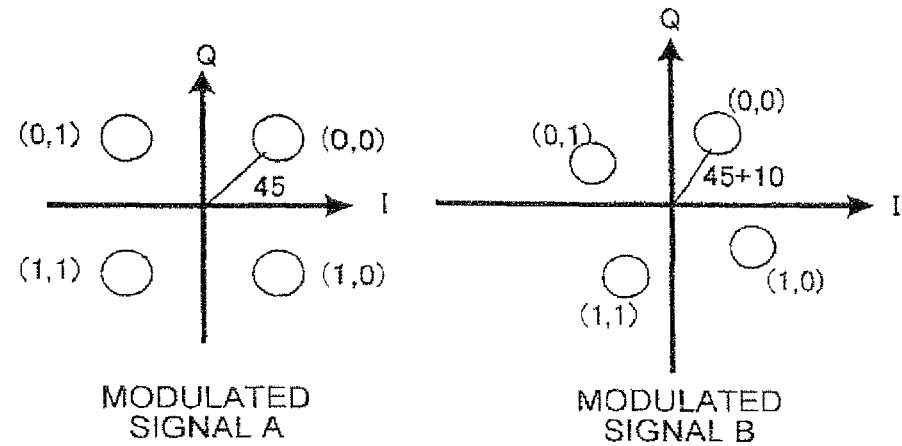

FIG. 48A through FIG. 48C show sample signal point arrangements of data rearranged as shown in FIG. 47B. FIG. 48A, FIG. 48B, and FIG. 48C each show sample signal point arrangements of modulated signal A and modulated signal B.

Here, I-Q plane signal point arrangements of the first through 100th symbols of pattern X are assumed to be as shown in FIG. 48A for modulated signals A and B. At this time, the phase formed between a signal point and the I-axis is assumed to be 45 degrees for both modulated signals A and B.

I-Q plane signal point arrangements of the 101st through 200th symbols of pattern X are assumed to be as shown in FIG. 48B for modulated signals A and B. At this time, the phase formed between a signal point and the I-axis is assumed to be 45 degrees for modulated signal A and 0 degrees for modulated signal B.

I-Q plane signal point arrangements of the 201st through 300th symbols of pattern X are assumed to be as shown in FIG. 48C for modulated signals A and B. At this time, the phase formed between a signal point and the I-axis is assumed to be 45 degrees for modulated signal A and 45+10 degrees for modulated signal B.

In this embodiment a case has been described in which 300 symbols are divided into three, but if 300 symbols are divided into m groups, the phase formed by a modulated signal A signal point and the I-axis is fixed at 45 degrees, and the phase formed by a modulated signal B signal point and the I-axis changes progressively as follows: 45 degrees, 0 degrees, 45+10 degrees, 10 degrees, . . . .

That is to say:
1) the phase formed by a modulated signal B signal point and the I-axis in the (2n−1)'th change of the signal point arrangement is 10n−10 degrees, and
2) the phase formed by a modulated signal B signal point and the I-axis in the 2n'th change of the signal point arrangement is 45+10n degrees, where n=1, 2, . . . . Thus, in this embodiment, the signal point arrangement mode is changed in predetermined block units. By this means, the effect of performing interleaving is obtained with the signal point arrangement mode, enabling time diversity gain to be obtained. The reason for this is explained by the operation of the receiving apparatus.

Figure 49:
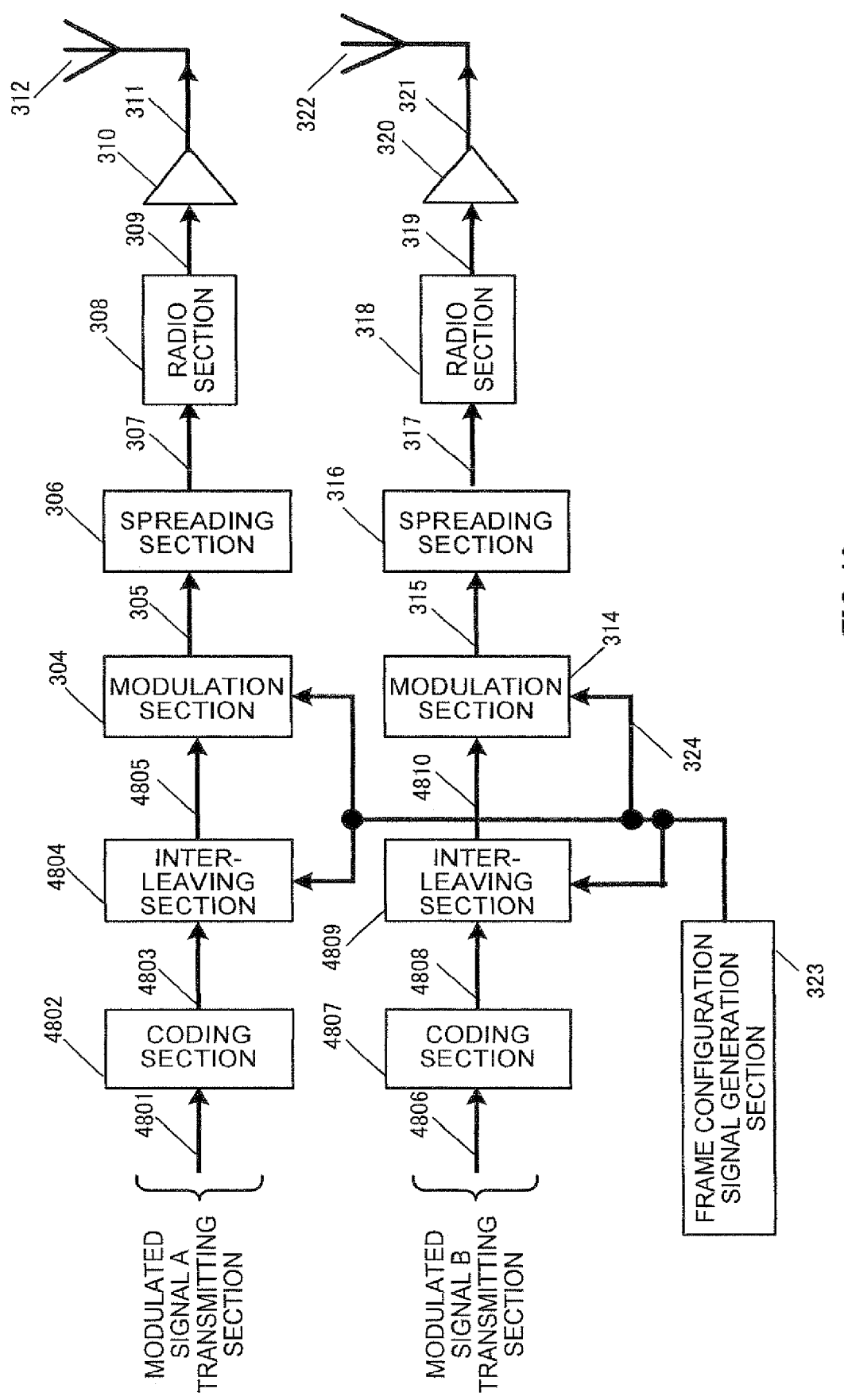
FIG. 49 is a block diagram showing a sample configuration of a transmitting apparatus according to Embodiment 4.

FIG. 49, in which parts corresponding to those in FIG. 4 are assigned the same codes as in FIG. 4, shows a sample configuration of a transmitting apparatus according to this embodiment. A coding section 4802 has a transmit digital signal 4801 as input, performs coding such as convolutional coding, turbo coding, or LDPC (Low Density Parity Check) coding on transmit digital signal 4801, and outputs a post-coding digital signal 4803.

An interleaving section 4804 has post-coding digital signal 4803 and frame configuration signal 324 as input, performs interleaving such as shown in FIG. 47A and FIG. 47B, for example, on post-coding digital signal 4803, and outputs a post-interleaving digital signal 4805.

Modulation section 304 has post-interleaving digital signal 4805 and frame configuration signal 324 as input, and outputs transmit quadrature baseband signal 305. The detailed configuration of modulation section 304 is as shown in FIG. 50.

Figure 50:
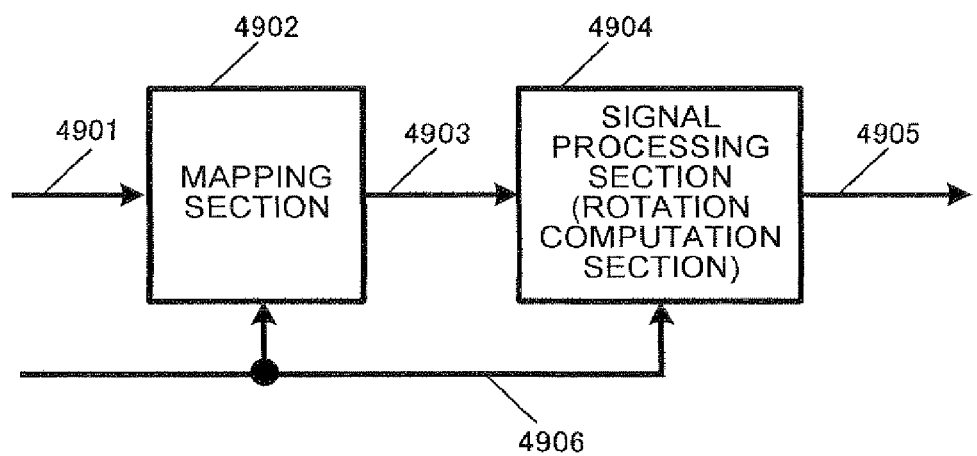
FIG. 50 is a block diagram showing a sample configuration of a modulation section according to Embodiment 4.

In FIG. 50, a mapping section 4902 has a post-interleaving digital signal 4901 and frame configuration signal 4906 as input, performs QPSK modulation in accordance with signal point arrangements such as shown in FIG. 48A, for example, on post-interleaving digital signal 4901, and outputs an quadrature baseband signal 4903.

A signal processing section (rotation computation section) 4904 has quadrature baseband signal 4903 and frame configuration signal 4906 as input, performs phase rotation so as to produce different signal point arrangements in predetermined block units as described above, and outputs a post-phase-rotation quadrature baseband signal 4905.

Coding section 4807 and interleaving section 4809 in FIG. 49 perform the same kind of operations as described above. Modulation section 314 has a post-interleaving digital signal as input, performs QPSK modulation, and outputs transmit quadrature baseband signal 315. At this time, modulation section 314 does not change the signal point arrangement for modulated signal B as shown in FIG. 48A, and therefore, unlike modulation section 304, need not have the signal processing section (rotation computation section) 4904 shown in FIG. 50.

Figure 51:
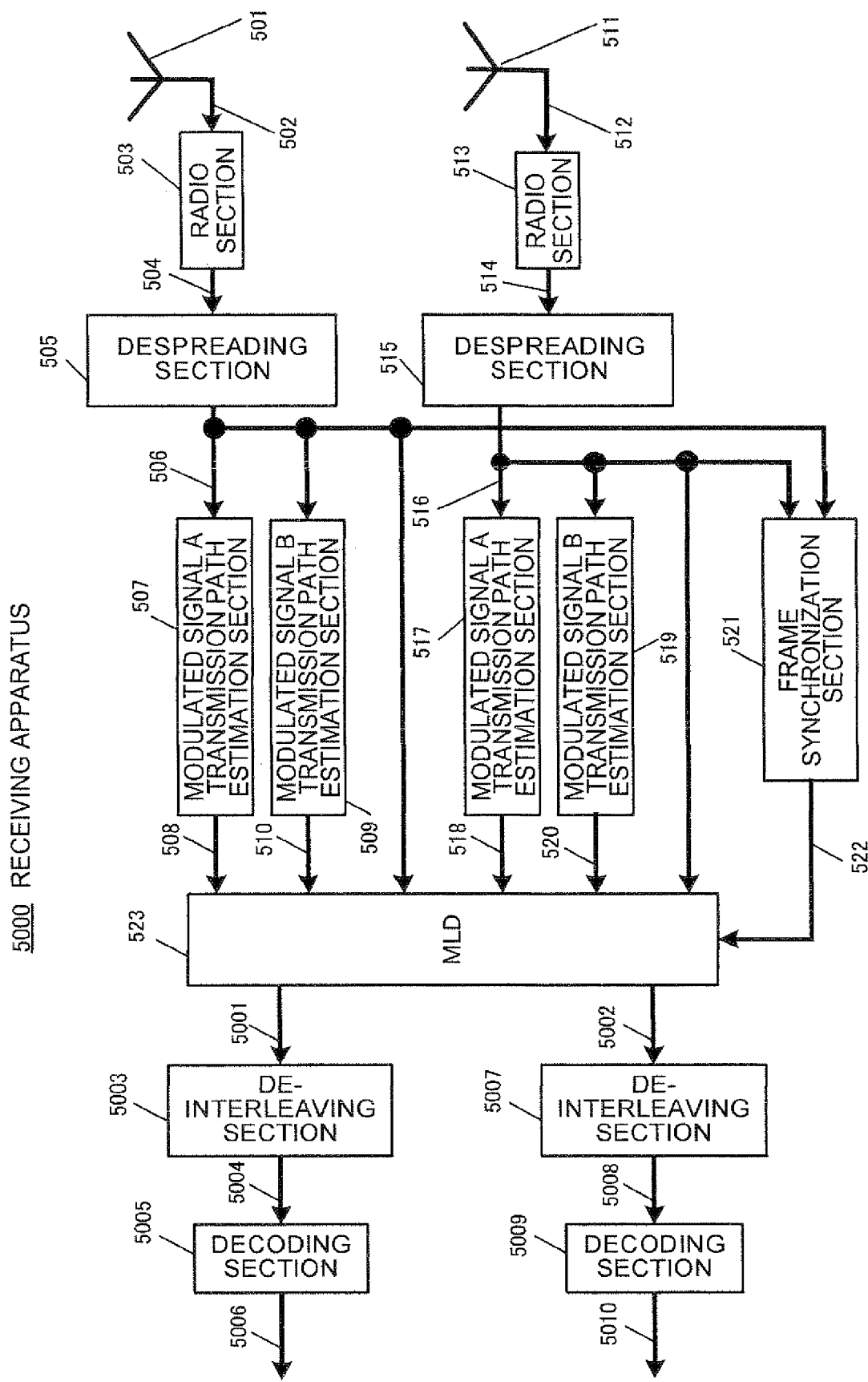
FIG. 51 is a block diagram showing a sample configuration of a receiving apparatus according to Embodiment 4.

FIG. 51 shows a sample configuration of a receiving apparatus according to this embodiment. Parts in FIG. 51 that operate in the same way as in FIG. 6 are assigned the same codes as in FIG. 6. An MLD (Maximum Likelihood Detection) section 523 finds a branch metric by finding candidate signal points, receive baseband signals, and Euclidian distances, and outputs a modulated signal A soft decision value 5001 and modulated signal B soft decision value 5002.

A de-interleaving section 5003 has modulated signal A soft decision value 5001 as input, de-interleaves this, and outputs a post-de-interleaving modulated signal A soft decision value 5004. A decoding section 5005 has post-de-interleaving modulated signal A soft decision value 5004 as input, performs soft decision decoding of this, and outputs a modulated signal A received digital signal 5006.

Similarly, a de-interleaving section 5007 has modulated signal B soft decision value 5002 as input, de-interleaves this, and outputs a post-de-interleaving modulated signal B soft decision value 5008. A decoding section 5009 has post-de-interleaving modulated signal B soft decision value 5008 as input, performs soft decision decoding of this, and outputs a modulated signal B received digital signal 5010.

Incidentally, a line-of-sight propagation environment will be considered. At this time, the channel matrix in equation (1) can be considered divided into direct wave component elements h11,d, h12,d, h21,d, h22,d, and scattered wave component elements h11,s, h12,s, h21,s, h22,s, and can be expressed by the following equation.

$$\begin{pmatrix} Rx_1 \\ Rx_2 \end{pmatrix} = \left( \rho_d \begin{pmatrix} h_{11,d} & h_{12,d} \\ h_{21,d} & h_{22,d} \end{pmatrix} + \rho_r \begin{pmatrix} h_{11,s} & h_{12,s} \\ h_{21,s} & h_{22,s} \end{pmatrix} \right) \begin{pmatrix} Tx_a \\ Tx_b \end{pmatrix} + \begin{pmatrix} n_1 \\ n_2 \end{pmatrix} \quad (14)$$

It is known that, if the direct wave elements fall into a stationary state, this indicates that the reception quality is totally different according to that state even if the received field strength is the same (see, for example, the document "Analysis of a MIMO System in Relation to Rice Fading," IEICE Technical Report RCS 2003-90, pp. 1-6, July 2003). In a line-of-sight environment in which direct waves are predominant, in particular, there is a possibility of a stationary state arising in which the effect of interleave patterns between modulated signals being made to differ is not fully evident.

When such a state is entered, satisfactory error rate performances are unlikely to be obtained even if the received field strength is sufficient. This is because cases arise in which the reception quality is poor due to the state of the direct wave matrix in equation (14) even though the received field strength is sufficient.

In this embodiment, the signal point arrangement mode of at least one modulated signal is varied, enabling the above-described degradation of reception quality to be improved. This is particularly suitable for cases where convolutional coding or the like is used and soft decisions are made in the receiving apparatus. The apparatus configuration and operation are as described above. The reason why reception quality improves when the above-described kind of configuration is used will now be explained in detail.

In FIG. 52A and FIG. 52B, reference code 5101 denotes signal points when a modulated signal A and B composite signal is received, and when both modulated signals A and B are QPSK signals as in FIG. 48A through FIG. 48C, there are 16 candidate signal points as shown in FIG. 52A and FIG. 52B. In FIG. 52A and FIG. 52B, reference code 5102 denotes virtual signal points when only modulated signal A is provisionally received. In actuality, since modulated signals A and B are transmitted simultaneously, the four 5102 points do not become candidate signal points.

It is here assumed that, when modulated signals such as shown in FIG. 48A are transmitted, the signal point arrangement is as shown in FIG. 52A in the receiving apparatus. Looking at the minimum Euclidian distance at this time, there are places where this is extremely small.

In a line-of-sight environment in which direct waves are predominant, when modulated signal A and modulated signal B are transmitted in the state shown in FIG. 48A, they continue to be received in this state, and good-quality data cannot be received if soft decision decoding is performed in this state.

To avoid this, in this embodiment, for example, modulated signal B is rotated through −45 degrees with respect to the arrangement in FIG. 48A as shown in FIG. 48B, and is rotated through 10 degrees with respect to the arrangement in FIG. 48A as shown in FIG. 48C. Then, when transmission is performed as shown in FIG. 48C, for example, the received signal points have the kind of signal point arrangement shown in FIG. 52B, the minimum Euclidian distances are increased, and reception quality is improved. When modulated signal B is subjected to various phase rotations in an environment in which direct waves are predominant, a variety of Euclidian distances are created, enabling an effect similar to a diversity effect to be obtained. This enables the quality of receive data to be improved.

As described above, in this embodiment a time diversity effect is obtained by forming at least one modulated signal while varying the signal point arrangement mode in the time direction, enabling receive data with improved error rate performances to be obtained.

In addition, a synergistic effect of interleaving together with changing of the signal point arrangement mode every interleave block makes it possible to prevent the Euclidian distances between candidate signal points and reception points becoming extremely small, enabling receive data with still further improved error rate performances to be obtained.

The angles through which the modulated signal B signal point arrangement is rotated are not limited to those mentioned above. However, if only 90 degree, 180 degree, and 270 degree angles of rotation are used, the received signal candidate signal point arrangement will not change, and therefore no effect will be obtained. Using angles of rotation from 0 degrees to 45 degrees or from −45 degrees to 0 degrees will achieve universality, and fixing the angles within this range will enable the configurations of rotation computation section 4904 in transmitting apparatus 4800 and MLD section 523 in receiving apparatus 5000 to be simplified.

In the above description, only modulated signal B is rotated, but implementation is possible in the same way if modulated signal A is also rotated. However, the effective improvement in reception quality does not differ greatly when both modulated signals are rotated and when only one is rotated. Therefore, from the standpoint of simplifying the configurations of rotation computation section 4904 in transmitting apparatus 4800 and MLD section 523 in receiving apparatus 5000, it is better to rotate only one modulated signal.

Next, descriptions will be given of different transmission methods from that described above.

Figure 53:
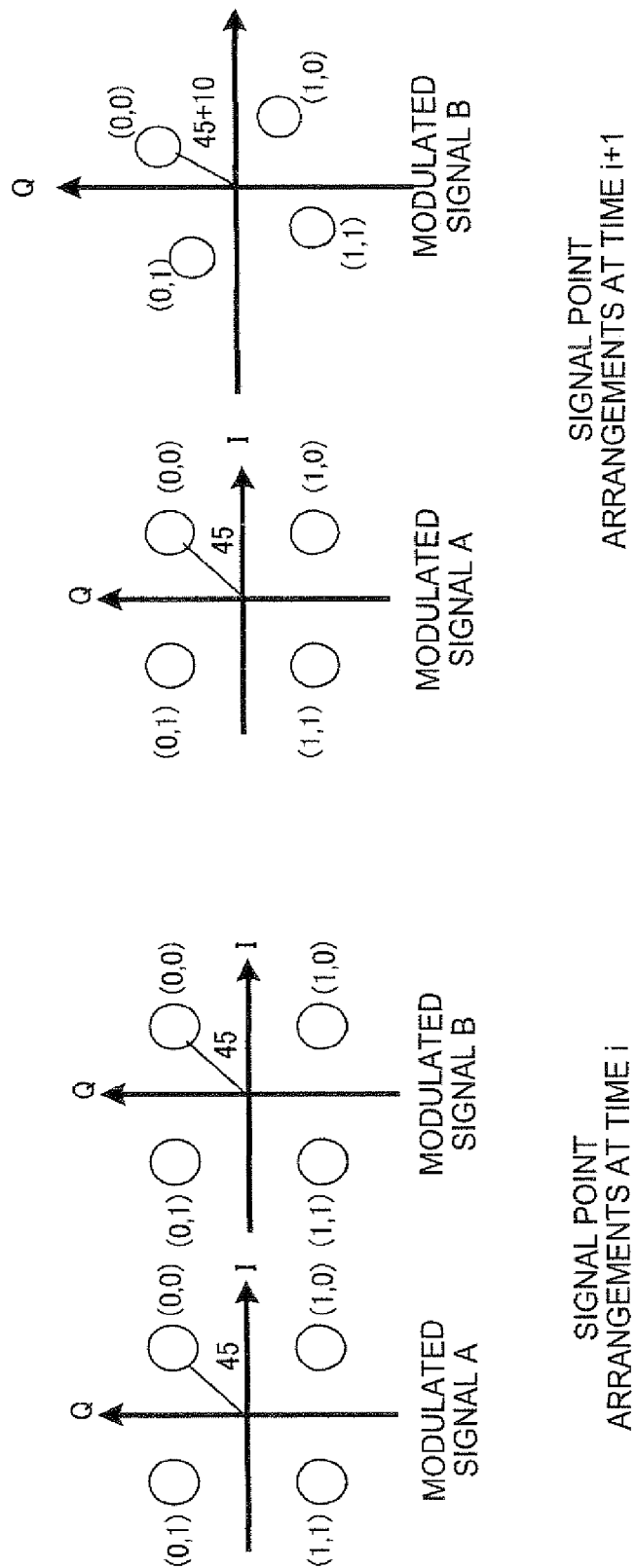
FIG. 53A and FIG. 53B are drawings showing sample signal point arrangements according to Embodiment 4.

As shown in FIG. 53A and FIG. 53B, the modulated signal B signal point arrangement at time T+i is rotated through $\theta_i$ degrees with respect to the signal point arrangement at time T. An example is considered here in which rotation is not applied to modulated signal A. In FIG. 53A and FIG. 53B, the relationship between the time i signal point arrangement and time i+1 signal point arrangement for modulated signal B is shown, this being assumed to be $\theta_i - \theta_{i-1} = 10$ degrees.

With this kind of transmission, as described above, in an environment in which direct waves are predominant the Euclidian distances between received signal points and candidate signal points are various, enabling an effect similar to a diversity effect to be obtained. This enables the error rate performances of receive data to be improved.

Also, if the relationship between the time i signal point arrangement and time i+1 signal point arrangement is made a fixed value of $\theta_i - \theta_{i-1} = 10$ degrees as in the example given here, the configurations of rotation computation section 4904 in transmitting apparatus 4800 and MLD section 523 in receiving apparatus 5000 can be simplified.

If $\theta_i - \theta_{i-1}$ is made 0, 90, 180, or 270 degrees, the positional relationships of candidate signal points in MLD section 523 of receiving apparatus 5000 do not vary between time i and time i+1, and there is no change in the relationships of Euclidian distances between received signal points and candidate signal points. As receiving apparatus 5000 consequently does not obtain a diversity effect and there is little effect of improving the data error rate, these are not suitable angles of rotation. Thinking along the same lines, it is also difficult to obtain a diversity effect if $\theta_i - \theta_{i-1}$ is made 45, 105, 225, or 315 degrees, and therefore these are also unsuitable values.

There is one kind of positional relationship of candidate signal points in the MLD section of the receiving apparatus when $\theta_i - \theta_{i-1}$ is 0, 90, 180, or 270 degrees, and two kinds when $\theta_i - \theta_{i-1}$ is 45, 105, 225, or 315 degrees, and a diversity effect is also difficult to obtain in these cases. That is to say, no very significant diversity effect is obtained using conventional QPSK or π/4 shift QPSK. However, this is not to say that there is no diversity effect at all.

In terms of setting suitable values, the design should provide for received signal candidate signal points to have a plurality of signal point arrangements (a plurality of minimum Euclidian distances). Possible examples include 5 degrees (angles providing the same kind of received signal candidate signal point arrangements as 5 degrees include 95, 185, 275, . . . , and 90/5=18 kinds of received signal candidate signal point arrangements are provided); 10 degrees (angles providing the same kind of received signal candidate signal point arrangements as 10 degrees include 100, 190, 280, . . . , and 90/10=9 kinds of received signal candidate signal point arrangements are provided); and 15 degrees (angles providing the same kind of received signal candidate signal point arrangements as 15 degrees include 105, 195, 285, . . . , and 90/15=6 kinds of received signal candidate signal point arrangements are provided). Other suitable values are those for which exact 90/x division is not possible.

Figure 54:
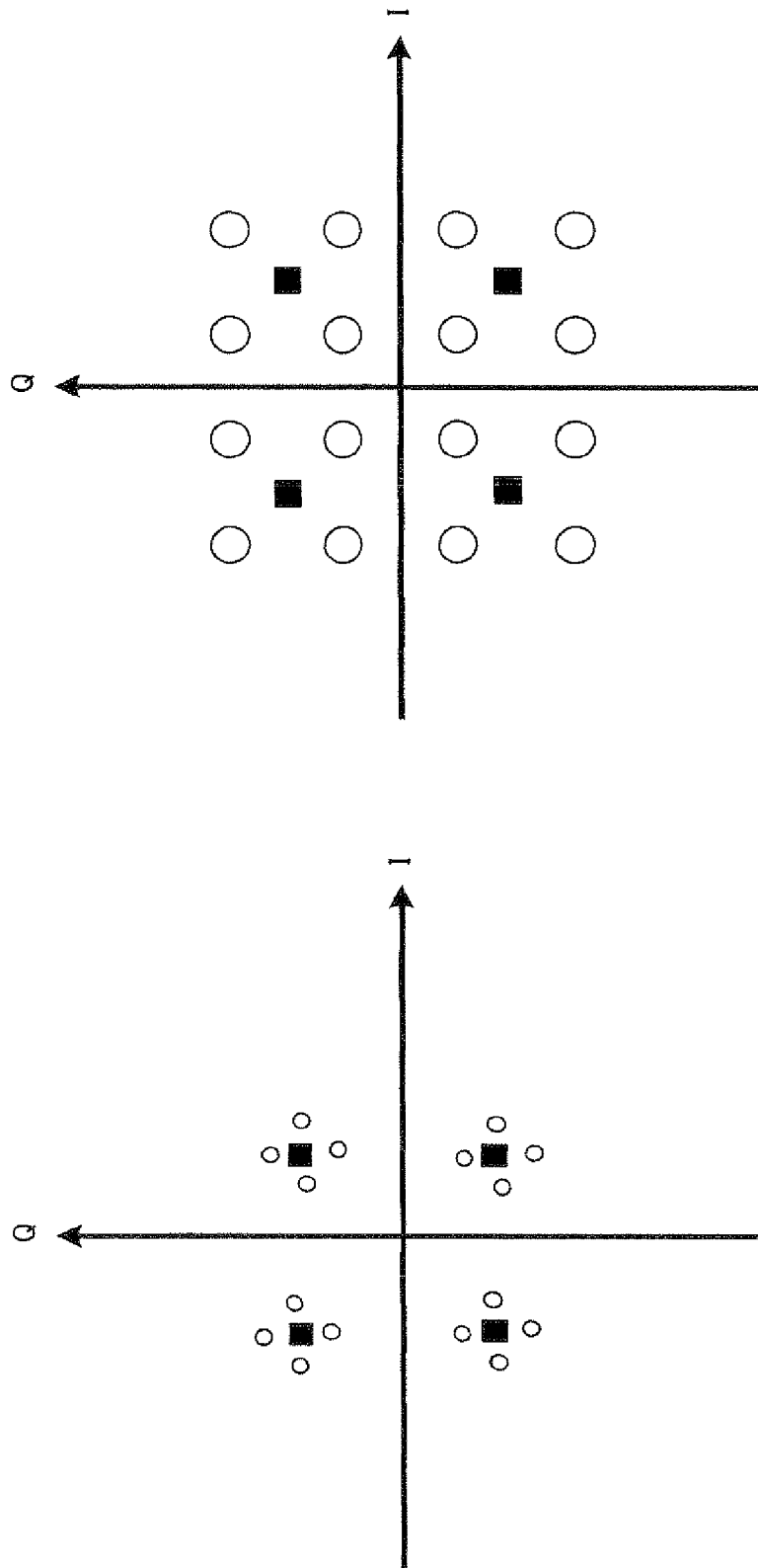
FIG. 54A is a drawing showing a reception signal point state in which the minimum Euclidian distance is small and reception quality is poor.
FIG. 54B is a drawing showing a reception signal point state in which the minimum Euclidian distance is large and reception quality is good.

In the above description, a case has been described in which only phase rotation is applied, but the signal point arrangement mode may also be changed by switching transmission power. Moreover, it is also possible to use a combination of transmission power and phase rotation. FIG. 54A and FIG. 54B show sample received signal candidate signal point arrangements when both phase rotation and transmission power switching are used. Euclidian distance relationships, and minimum Euclidian distances in particular, can also be changed in the same way as described above when both phase rotation and transmission power switching are used. By this means a diversity effect can be obtained and receive data error rate performances can be improved.

A method is also possible whereby coding is performed and phase rotation is effected for one modulated signal, while coding is not performed for the other modulated signal. This corresponds to the implementation of trellis coding modulation in a MIMO system proposed in "Channel coding with multilevel/phase signals," IEEE Transaction on Information Theory, vol. IT-28, pp. 55-67, January 1982. Trellis coding modulation is designed so that constraints are imposed on signal point transitions by performing coding, and by this means transition of signal points with distant Euclidian distances is performed.

In order to obtain an effect equivalent to this, it is important in a MIMO system to effect phase rotation. To consider two slots, for example, if the phase is rotated the signal point arrangements received at time T and time T+1 are different, and consequently the Euclidian distances are different. Therefore, effecting phase rotation and performing coding enable constraints to be imposed on signal point transitions in the same way as trellis coding modulation.

In this embodiment a case has been described in which spread spectrum communication is performed, but this is not a limitation, and implementation is also possible in the same way when there is no spreading section or despreading section—that is, for a single-carrier system. Application is also possible in the same way to a multicarrier system such as OFDM. In this case, in addition to a method that forms a modulated signal whose phase has been rotated in the time direction, the approach of changing the signal point arrangement in the time axis direction can also be extended to the frequency axis direction. Specifically, a different signal point arrangement (for example, rotation) can be provided for each subcarrier (carrier). A method whereby unique phase rotation is used for each subcarrier can be considered as an example of a simple configuration in this case. That is to say, with respect to the signal point arrangement of subcarrier 0, phase rotation of θ1 is applied to subcarrier 1, θ2 to subcarrier 2, . . . , and θn to subcarrier n. By this means a diversity effect can be obtained in the subcarrier direction (frequency direction), enabling receive data error rate performances to be improved in the same way as when a diversity effect is obtained in the time direction.

In this embodiment, implementation is also possible in the same way when LDPC, turbo coding, or the like is used as well as convolutional coding.

(5) Embodiment 5

In this embodiment it is proposed that feedback information indicating the modulated signal reception state be received from the communicating party, and the signal point arrangement mode be changed based on this feedback information.

Figure 55:
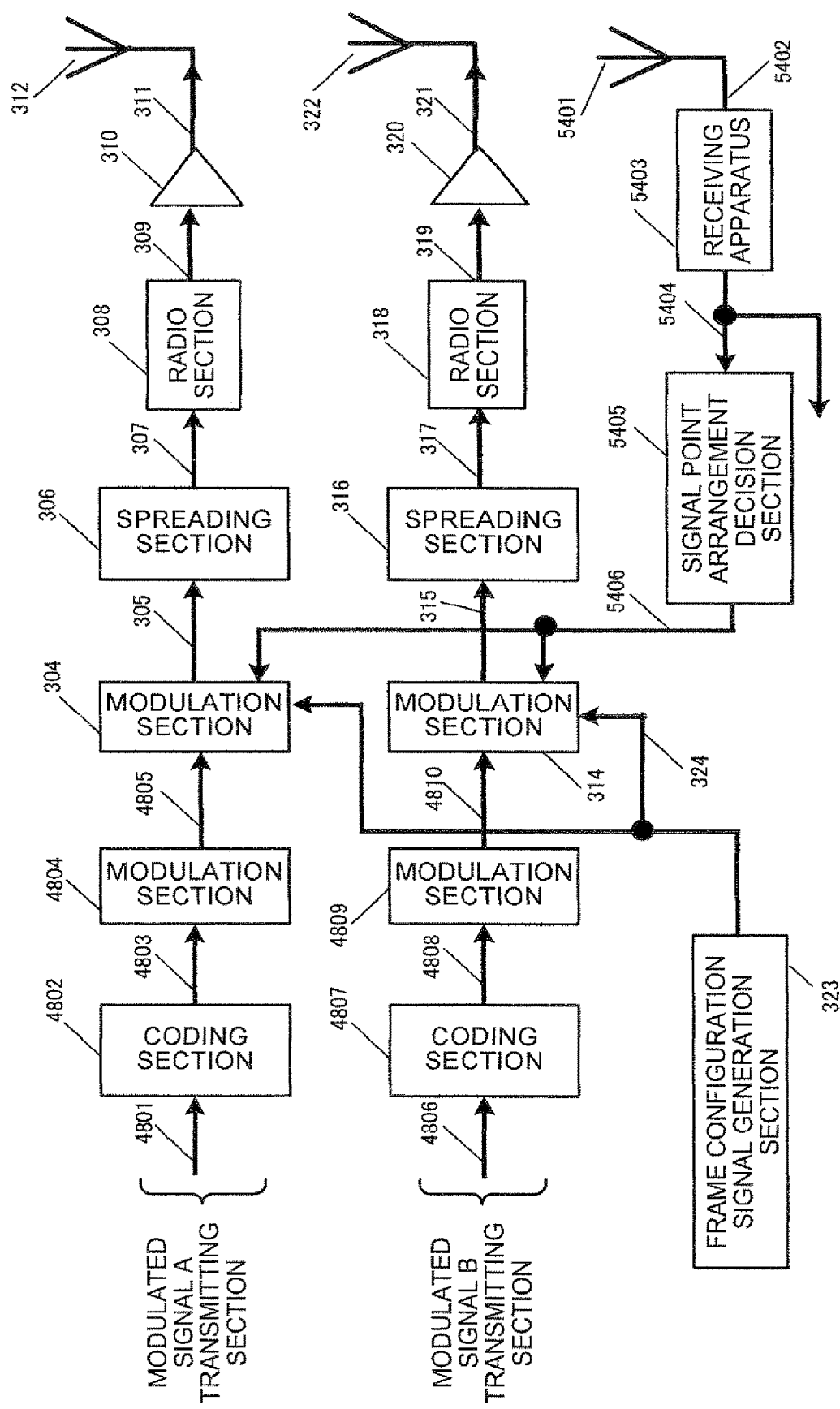
FIG. 55 is a block diagram showing a sample configuration of a base station according to Embodiment 5.

FIG. 55 shows a sample configuration of a base station according to this embodiment. Parts in FIG. 55 that operate in the same way as in FIG. 49 are assigned the same codes as in FIG. 49.

Base station 5400 receives a signal transmitted from a terminal at an antenna 5401. A receiving apparatus 5403 has the received signal 5402 received by antenna 5401 as input, demodulates this signal, and outputs a received digital signal 5404.

A signal point arrangement decision section 5405 has received digital signal 5404 as input, extracts feedback information from this received digital signal 5404, decides the signal point arrangement from this feedback information, and outputs a signal point arrangement control signal 5406.

Modulation sections 304 and 314 perform signal point arrangement based on this signal point arrangement control signal 5406.

Here, base station 5400 sends the terminal information on the signal point arrangement mode implemented by modulation sections 304 and 314. Specifically, base station 5400 includes information on the signal point arrangement mode implemented during modulation in the transmit signals. The feedback information, signal point arrangement control method, and terminal operation will be described in detail later herein.

Figure 56:
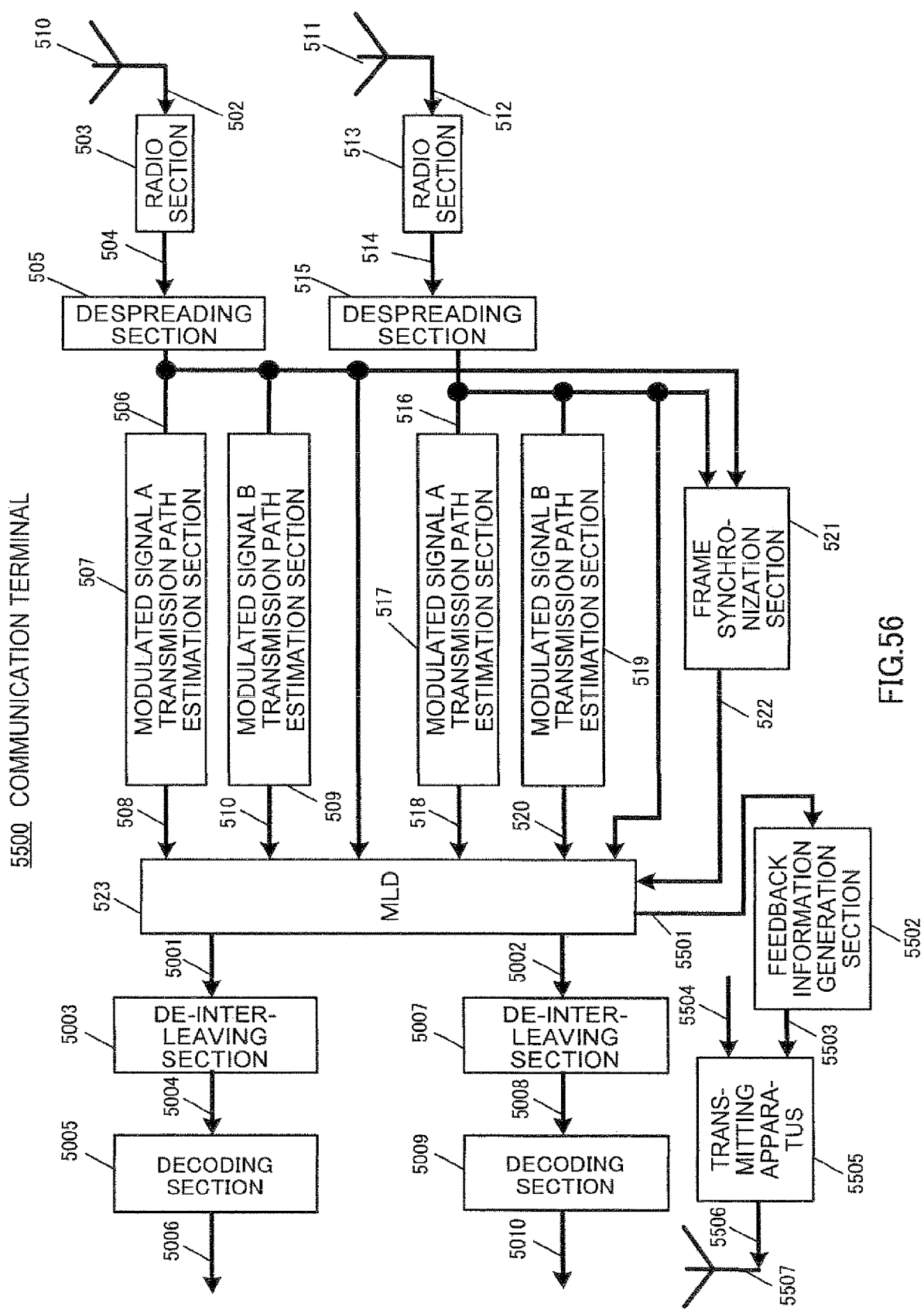
FIG. 56 is a block diagram showing a sample configuration of a communication terminal according to Embodiment 5.

FIG. 56 shows a sample configuration of a communication terminal according to this embodiment. Parts in FIG. 56 that operate in the same way as in FIG. 51 are assigned the same codes as in FIG. 51.

MLD section 523 outputs received signal point status information 5501 based on modulated signal A transmission path estimation signals 508 and 518, and modulated signal B transmission path estimation signals 510 and 520. Suitable items for received signal point status information 5501 include the minimum Euclidian distance or eigenvalue status, or modulated signal A and B transmission path estimation signals, but are not limited to these. For example, a signal indicating the presence or absence of an error, such as ACK/NACK information, may also be used as received signal point status information 5501.

A feedback information generation section 5502 has received signal point status information 5501 as input, and outputs feedback information 5503 based on this input. The base station 5400 signal point arrangement mode may also be decided in advance by feedback information generation section 5502, and transmitted as feedback information 5503. That is to say, the signal point arrangement mode may also be decided by communication terminal 5500.

A transmitting apparatus 5505 has feedback information 5503 and a transmit digital signal 5504 as input, performs predetermined radio processing on these, and outputs a transmit signal 5506. Transmit signal 5506 is output from a transmitting antenna 5507.

Next, the signal point arrangement control method will be explained. Assume, for example, that base station 5400 transmits modulated signals A and B as shown in FIG. 53A, and that communication terminal 5500 receives these modulated signals in the state shown in FIG. 52A. This state is known from received signal point status information 5501 comprising information such as the minimum Euclidian distance or eigenvalue status, or modulated signal A and B transmission path estimation signals, output from MLD section 523. A signal point arrangement mode such that the minimum Euclidian distance becomes large as in FIG. 52B is then decided by base station 5400 or communication terminal 5500, and base station 5400 performs modulation processing in accordance with the decided signal point arrangement. For example, base station 5400 may perform modulation while switching the signal point arrangement mode from that shown in FIG. 53A to that shown in FIG. 53B.

By receiving feedback information indicating the modulated signal reception state and changing the signal point arrangement based on the feedback information, as described above, the signal point arrangement mode can be changed according to the reception state, enabling the minimum Euclidian distance to be made significantly larger, and receive data error rate performances to be greatly improved. A particularly marked effect is obtained in an environment in which direct waves are predominant, in the same way as in Embodiment 4.

In this embodiment a case has been described in which spread spectrum communication is performed, but this is not a limitation, and implementation is also possible in the same way when there is no spreading section or despreading section—that is, for a single-carrier system. Moreover, implementation is also possible in the same way for a multicarrier system such as OFDM.

Phase rotation is not the only way of changing the signal point arrangement mode, and, as described in other embodiments, the same kind of effect can also be obtained by changing the transmission power. In this case, the transmission power alone may be changed, or both transmission power and phase rotation changes may be used.

The present invention also enables the same kind of effect as described above to be obtained when applied, for example, to a MIMO system in which transmit signals are transmitted in multi-beam form, such as described in "A MIMO Channel Eigenbeam Space Division Multiplexing (E-SDM) System," IEICE Technical Report RCS 2002-53, May 2002.

Figure 57:
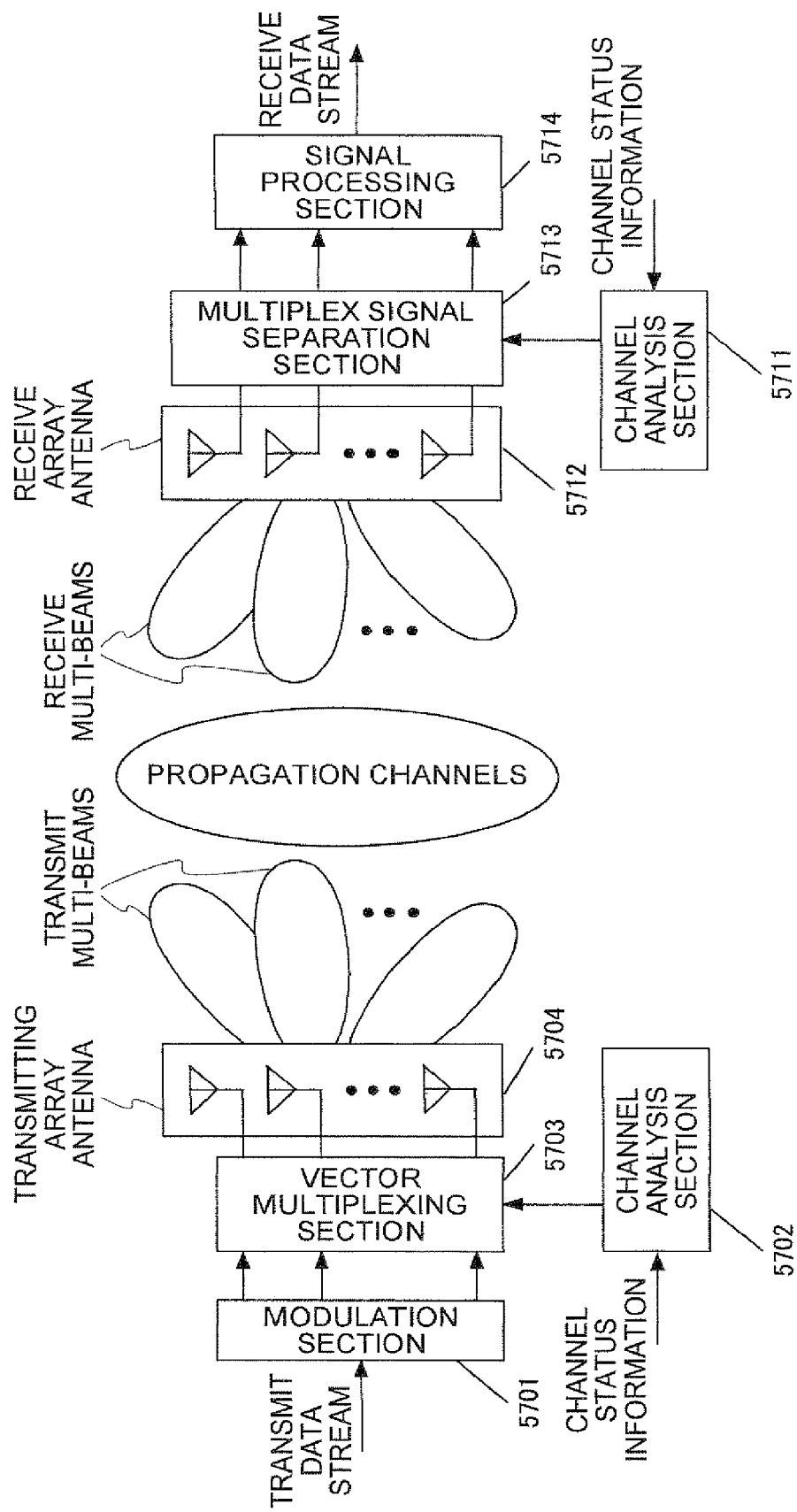
FIG. 57 is a block diagram showing a multi-beam MIMO system as a sample application of the present invention.

FIG. 57 shows the general configuration of this kind of MIMO system. On the transmitting side, a modulation section 5701 has a transmit data stream as input, and forms a plurality of modulated signals by modulating this transmit data stream. Here, modulation section 5701 performs modulation processing by changing the signal point arrangement mode in the time direction or in the frequency direction for at least one modulated signal, as described in above Embodiments 1 through 5.

A channel analysis section 5702 calculates a plurality of transmit channel signature vectors for forming a multiplex channel based on channel status information comprising propagation channel estimation results. A vector multiplexing section 5703 multiplies together and combines individual channel signature vectors and modulated signals, and sends signals after combining to a transmitting array antenna 5704. By this means, multi-beam signals are transmitted from transmitting array antenna 5704.

On the receiving side, a channel analysis section 5711 calculates a plurality of receive channel signature vectors for separating multiplexed modulated signals based on channel status information comprising propagation channel estimation results. A multiplex signal separation section 5713 has received signals from a receiving array antenna 5712 as input, and by multiplying received signals by the respective channel signature vectors, separates signals in which a plurality of received signals are multiplexed into a plurality of received modulated signals. A signal processing section 5714 obtains receive data by demodulating and decoding the separated received modulated signals.

The present invention is not limited to above-described Embodiments 1 through 5, and various variations and modifications may be possible without departing from the scope of the present invention. For example, in the above embodiments cases have been described in which the present invention is mainly implemented by means of hardware, but the present invention is not limited to this, and can also be implemented by means of software.

For example, it is also possible for a program that executes the above-described functions to be stored in ROM (Read Only Memory) beforehand, and for this program to be run by a CPU (Central Processing Unit).

As described above, according to the present invention a communication apparatus and method can be implemented that enable excellent reception quality to be obtained while suppressing a decrease in data transmission efficiency.

This application is based on Japanese Patent Application No. 2003-190683 filed on Jul. 2, 2003, and Japanese Patent Application No. 2004-173224 filed on May 14, 2004, the entire content of which is expressly incorporated by reference herein.

INDUSTRIAL APPLICABILITY

The present invention is widely applicable to radio systems that transmit different modulated signals from a plurality of antennas, and is suitable for application to an OFDM-MIMO communication system, for example.

The invention claimed is:

1. A communication apparatus comprising:
   a modulator, which in operation, modulates a first data sequence and a second data sequence to generate a first modulated symbol sequence and a second modulated symbol sequence, respectively, and applies phase rotation to the second modulated symbol sequence, wherein an amount of the phase rotation is periodically switched in a time axis or a frequency axis; and
   a transmitter, which in operation, multiplexes the first modulated symbol sequence and the phase hopped second modulated symbol and transmits the multiplexed symbol sequences.

2. The communication apparatus according to claim 1, wherein the phase rotation is not applied to the first modulated symbol sequence.

3. The communication apparatus according to claim 1, comprising
   an LDPC encoder which, in operation, performs LDPC encoding on a signal to generate the first data sequence and the second data sequence.

4. The communication apparatus according to claim 1, wherein the transmitter comprises a plurality of antennas, and the multiplexed symbol sequences are transmitted by using a directional beam.

5. A communication method comprising:
   modulating a first data sequence and a second data sequence to generate a first modulated symbol sequence and a second modulated symbol sequence, respectively, and applying phase rotation to the second modulated symbol sequence, wherein an amount of the phase rotation is periodically switched in a time axis or a frequency axis; and
   multiplexing the first modulated symbol sequence and the phase hopped second modulated symbol and transmitting the multiplexed symbol sequences.

6. The communication method according to claim 5, wherein the phase rotation is not applied to the first modulated symbol sequence.

7. The communication method according to claim 5, comprising
   Performing LDPC encoding on a signal to generate the first data sequence and the second data sequence.

8. The communication method according to claim 5, wherein the multiplexed symbol sequences are transmitted with a directional beam by using a plurality of antennas.

* * * * *